United States Patent
Yerli

(10) Patent No.: US 11,218,522 B1
(45) Date of Patent: Jan. 4, 2022

(54) DATA PROCESSING SYSTEM AND METHOD USING HYBRID SYSTEM ARCHITECTURE FOR IMAGE PROCESSING TASKS

(71) Applicant: TMRW FOUNDATION IP S. À R.L., Bettembourg (LU)

(72) Inventor: Cevat Yerli, Frankfurt am Main (DE)

(73) Assignee: TMRW Foundation IP S. À R.L., Luxembourg (LU)

( * ) Notice: Subject to any disclaimer, the term of this patent is extended or adjusted under 35 U.S.C. 154(b) by 0 days.

(21) Appl. No.: 17/060,459

(22) Filed: Oct. 1, 2020

Related U.S. Application Data

(62) Division of application No. 17/006,327, filed on Aug. 28, 2020.

(51) Int. Cl.
| | |
|---|---|
| H04L 29/06 | (2006.01) |
| G06T 19/00 | (2011.01) |
| G09B 5/12 | (2006.01) |
| G06F 3/01 | (2006.01) |

(52) U.S. Cl.
CPC .......... H04L 65/4053 (2013.01); G06F 3/011 (2013.01); G06T 19/003 (2013.01); H04L 65/4015 (2013.01); G09B 5/12 (2013.01)

(58) Field of Classification Search
CPC .......... H04N 7/15; H04N 7/147; H04N 7/152; H04N 21/4223; H04N 21/4788; H04N 21/2187; H04N 21/4307; H04N 5/272; H04N 13/239; H04L 65/4053; H04L 65/4084; H04L 65/4015; G06T 19/006; G06T 19/003; G06F 3/011; G09B 5/12
See application file for complete search history.

(56) References Cited

U.S. PATENT DOCUMENTS

| | | | |
|---|---|---|---|
| 6,409,599 | B1 | 6/2002 | Sprout et al. |
| 8,032,799 | B2 | 10/2011 | Hamilton, III et al. |
| 8,659,639 | B2 | 2/2014 | Baldino et al. |

(Continued)

FOREIGN PATENT DOCUMENTS

| | | |
|---|---|---|
| CN | 106027679 A | 10/2016 |
| EP | 2237200 A1 | 10/2010 |
| WO | 2010063100 A1 | 6/2010 |

OTHER PUBLICATIONS

Eleftheriadis, A., "SVC and Video Communications: Scalable Video Coding Technology for Real-Time Multi-party Video," Vidyo, May 2016, 15 pages.

(Continued)

*Primary Examiner* — Daniel Samwel
(74) *Attorney, Agent, or Firm* — Christensen O'Connor Johnson Kindness PLLC

(57) ABSTRACT

A data processing system includes one or more computing devices comprising at least one processor and memory storing data and instructions implementing image processing functions. The one or more computing devices include at least one cloud server computer. The one or more computing devices of the data processing system are configured to generate a user graphical representation from a live data feed by one or more image processing combinations of the at least one cloud server computer and two or more client devices in a hybrid system architecture, which may include a client-server side and a peer-to-peer side.

14 Claims, 29 Drawing Sheets

(56) References Cited

U.S. PATENT DOCUMENTS

| | | |
|---|---|---|
| 8,850,345 B1 | 8/2014 | Smith |
| 9,112,709 B1 | 8/2015 | Tofigh et al. |
| 9,204,096 B2 | 12/2015 | Baldino et al. |
| 9,730,017 B2 | 8/2017 | Belimpasakis et al. |
| 9,755,966 B2 | 9/2017 | Butler et al. |
| 10,057,707 B2 | 12/2018 | Cartwright et al. |
| 10,192,363 B2 | 1/2019 | Lanier et al. |
| 10,346,378 B1 | 7/2019 | Jones |
| 10,827,126 B2 | 11/2020 | Kwon et al. |
| 10,870,056 B2 | 12/2020 | Taylor et al. |
| 10,984,601 B2 | 4/2021 | Moroze et al. |
| 2003/0135576 A1 | 7/2003 | Bodin |
| 2007/0174429 A1 | 7/2007 | Mazzaferri et al. |
| 2008/0005237 A1 | 1/2008 | Borys et al. |
| 2009/0254843 A1 | 10/2009 | Van Wie |
| 2009/0288007 A1 | 11/2009 | Leacock et al. |
| 2010/0142542 A1* | 6/2010 | Van Wie ............... H04L 67/38 370/400 |
| 2010/0302345 A1 | 12/2010 | Baldino et al. |
| 2011/0274104 A1 | 11/2011 | Cozzi et al. |
| 2012/0216131 A1 | 8/2012 | Moyers et al. |
| 2013/0024756 A1 | 1/2013 | Basso |
| 2013/0046853 A1 | 2/2013 | Shuster et al. |
| 2013/0335509 A1* | 12/2013 | Cafferata ............... G06Q 30/02 348/14.08 |
| 2014/0125758 A1 | 5/2014 | Baldino et al. |
| 2015/0092008 A1 | 4/2015 | Manley |
| 2015/0288933 A1* | 10/2015 | Iversen ................. G06F 1/163 348/14.07 |
| 2016/0210602 A1 | 7/2016 | Siddique |
| 2016/0342303 A1 | 11/2016 | Van Wie et al. |
| 2017/0024100 A1* | 1/2017 | Pieper .................... H04L 65/80 |
| 2017/0108347 A1 | 4/2017 | Zhu et al. |
| 2017/0127023 A1 | 5/2017 | High |
| 2017/0337693 A1 | 11/2017 | Baruch |
| 2018/0007339 A1* | 1/2018 | Castleman ......... H04L 65/4084 |
| 2018/0027351 A1 | 1/2018 | Cartwright et al. |
| 2018/0047196 A1 | 2/2018 | Du |
| 2018/0068173 A1 | 3/2018 | Kolleri |
| 2018/0069937 A1 | 3/2018 | Kolleri |
| 2018/0174325 A1 | 6/2018 | Fu et al. |
| 2018/0239515 A1 | 8/2018 | Cooper et al. |
| 2018/0352303 A1 | 12/2018 | Siddique |
| 2018/0376072 A1 | 12/2018 | Kwon et al. |
| 2019/0126152 A1 | 5/2019 | Taylor et al. |
| 2019/0197785 A1 | 6/2019 | Tate-Gans et al. |
| 2019/0199671 A1 | 6/2019 | Avital et al. |
| 2019/0200049 A1 | 6/2019 | Yang et al. |
| 2019/0319472 A1 | 10/2019 | Lebreux |
| 2020/0065853 A1 | 2/2020 | Cvinar |
| 2020/0099891 A1* | 3/2020 | Valli ...................... H04N 7/147 |
| 2020/0126309 A1 | 4/2020 | Moroze et al. |
| 2020/0166991 A1 | 5/2020 | Aggarwal |
| 2020/0169694 A1 | 5/2020 | Yang et al. |
| 2020/0294317 A1 | 9/2020 | Segal |
| 2021/0117654 A1 | 4/2021 | Arankalle et al. |
| 2021/0146255 A1 | 5/2021 | Taylor et al. |
| 2021/0218590 A1 | 7/2021 | Akhoury et al. |
| 2021/0229673 A1 | 7/2021 | Singh et al. |

OTHER PUBLICATIONS

Office Action dated Dec. 24, 2020 issued in U.S. Appl. No. 17/006,327, filed Aug. 28, 2020, 31 pages.
Office Action dated Nov. 20, 2020 issued in U.S. Appl. No. 17/005,767, filed Aug. 28, 2020, 14 pages.
Office Action dated Feb. 4, 2021 issued in U.S. Appl. No. 17/060,623, filed Oct. 1, 2020, 31 pages.
Office Action dated Feb. 5, 2021 issued in U.S. Appl. No. 17/060,516, filed Oct. 1, 2020, 38 pages.
Office Action dated Feb. 4, 2021 issued in U.S. Appl. No. 17/060,555, filed Oct. 1, 2020, 36 pages.
Office Action dated Feb. 4, 2021 issued in U.S. Appl. No. 17/060,591, filed Oct. 1, 2020, 29 pages.
Office Action dated Feb. 8, 2021 issued in U.S. Appl. No. 17/060,485, filed Oct. 1, 2020, 23 pages.
Office Action dated Apr. 29, 2021 issued in U.S. Appl. No. 17/160,209, filed Jan. 27, 2021, 30 pages.
Supplemental Office Action dated May 3, 2021 issued in U.S. Appl. No. 17/160,209, filed Jan. 27, 2021, 20 pages.
Office Action dated Aug. 17, 2021 issued in U.S. Appl. No. 17/060,485, filed Oct. 1, 2020, 38 pages.
Office Action dated Aug. 19, 2021 issued in U.S. Appl. No. 17/060,516, filed Oct. 1, 2020, 50 pages.
Office Action dated Aug. 10, 2021 issued in U.S. Appl. No. 17/060,555, filed Oct. 1, 2020, 33 pages.
Office Action dated Aug. 18, 2021 issued in U.S. Appl. No. 17/060,591, filed Oct. 1, 2020, 14 pages.
Office Action dated Aug. 19, 2021 issued in U.S. Appl. No. 17/060,623, filed Oct. 1, 2020, 20 pages.
Office Action dated Jul. 27, 2021 issued in U.S. Appl. No. 17/006,327, filed Aug. 28, 2020, 44 pages.

* cited by examiner

DATA PROCESSING SYSTEM AND METHOD USING HYBRID SYSTEM ARCHITECTURE FOR IMAGE PROCESSING TASKS

CROSS-REFERENCE TO RELATED APPLICATIONS

This application is a division of U.S. patent application Ser. No. 17/006,327, filed Aug. 28, 2020, which is related to co-pending U.S. patent application Ser. No. 17/005,767, filed Aug. 28, 2020. Each of the aforementioned patent applications is incorporated herein by reference in its entirety.

BACKGROUND

As situations such as the novel coronavirus pandemic in the year 2020 have forced mobility restrictions worldwide, changing the way in which meeting, learning, shopping and working take place, remote collaboration, and interactions, including, and in particular, social interactions are gaining more importance. Various solutions are already available in the market to enable real-time communication and collaboration, ranging from chat applications to video telephony, such as Skype™ and Zoom™, or virtual offices for remote teams represented by 2D avatars, such as those provided by Pragli™.

Given the current state of development of wearable immersive technologies such as extended reality (e.g., augmented and/or virtual reality) and the relatively low technological appropriation rate, it is understandable that most solutions provide a flat, two-dimensional user interface where most interactions take place. However, the low levels of realism, lack of user presence, lack of shared space and the quality of interactions one can perform when comparing the real-life experience to these solutions contribute to a feeling of loneliness or boredom for many users, in turn resulting sometimes in a lower productivity than when performing the same activities in person.

What is required is a technological solution that provides users with a feeling of realism, feeling of presence of themselves and the participants, and feeling of interacting as if in real life, when remotely interacting without the need to purchase expensive equipment (e.g., as in head-mounted displays), and to implement new or costly infrastructures, all while using existing computing devices and cameras.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The current disclosure refers generally to computer systems, and more specifically to a system and method enabling interactions, in particular, social interactions, in virtual environments; an image processing-based virtual presence system and method; a user graphical representation-based user authentication system and method; a system and method for virtually broadcasting from within virtual environment; a system and method for delivering applications within a virtual environment; a system and method to provision cloud computing-based virtual computing resources within a virtual environment cloud server computer; and a system and method enabling ad hoc virtual communications between approaching user graphical representations.

A system of the current disclosure enabling interactions, including, in particular, social interactions, in virtual environments comprises one or more cloud server computers comprising at least one processor and memory storing data and instructions implementing a virtual environment platform comprising at least one virtual environment. The one or more cloud server computers are configured to insert a user graphical representation generated from a live data feed obtained by a camera at a three-dimensional coordinate position of the at least one virtual environment, update the user graphical representation in the at least one virtual environment, and enable real-time multi-user collaboration and interactions in the virtual environment.

In an embodiment, the system further comprises at least one camera obtaining live data feed from one or more users of a client device. Additionally, the system comprises a client device communicatively connected to the one or more cloud server computers and at least one camera. The system generates a user graphical representation from the live data feed, which is inserted into a three-dimensional coordinate of the virtual environment, and is therein updated using the live data feed. In described embodiments, inserting a user graphical representation into a virtual environment involves graphically combining the user graphical representation in the virtual environment such that the user graphical representation appears in the virtual environment (e.g., at a specified 3D coordinate position). The virtual environment platform serves the virtual environments to the one or more client devices. The system enables real-time multi-user collaboration and (social) interactions in the virtual environment by accessing a graphical user interface through the client device. Client or peer devices of the current disclosure may comprise, for example, computers, headsets, mobile phones, glasses, transparent screens, tablets and generally input devices with cameras built-in or which may connect to cameras and receive data feed from said cameras.

In some embodiments, the virtual environment is accessible by a client device via a downloadable client application or a web browser application.

In some embodiments, the user graphical representation comprises a user 3D virtual cutout with a removed background, or a user real-time 3D virtual cutout with a removed background, or a video with removed background, or video without a removed background. In some embodiments, the user graphical representation is a user 3D virtual cutout constructed from a user-uploaded or third-party-source photo with a removed background, or a user real-time 3D virtual cutout with a removed background generated based on the real-time 2D, stereo, depth data, or 3D live video stream data feed obtained from the camera, thus comprising the real-time video stream of the user, or a video without removed background, or a video with removed background and displayed utilizing a polygonal structure. Such polygonal structures can be a quad structure or more complex 3D structures used as a virtual frame to support the video. In yet other embodiments one or more of such user graphical representations are inserted into three dimensional coordinates within a virtual environment and are therein graphically combined.

A user 3D virtual cutout may include a virtual replica of a user constructed from a user-uploaded or third-party-source 2D photo. In an embodiment, the user 3D virtual cutout is created via a 3D virtual reconstruction process through machine vision techniques using the user-uploaded or third-party-source 2D photo as input data, generating a 3D mesh or 3D point cloud of the user with removed background. A user real-time 3D virtual cutout may include a virtual replica of a user based on the real-time 2D or 3D live video stream data feed obtained from the camera and after having the user background removed. In an embodiment, the user real-time 3D virtual cutout is created via a 3D virtual reconstruction process through machine vision techniques using the user live data feed as input data by generating a 3D mesh or 3D point cloud of the user with removed background. A video with removed background may include a video streamed to a client device, wherein a background removal process has been performed on the video so that only the user may be visible and then displayed utilizing a polygonal structure on the receiving client device. A video without removed background may include a video streamed to a client device, wherein the video is faithfully representing the camera capture, so that the user and his or her background are visible and then displayed utilizing a polygonal structure on the receiving client device.

In some embodiments, the data used as input data comprised in the live data feed and/or user-uploaded or third-party-source 2D photo comprises 2D or 3D image data, 3D geometries, video data, media data, audio data, textual data, haptic data, time data, 3D entities, 3D dynamic objects, textual data, time data, metadata, priority data, security data, positional data, lighting data, depth data, and infrared data, amongst others.

In some embodiments, the user graphical representation is associated with a top viewing perspective, or a third-person viewing perspective, or a first-person viewing perspective, or a self-viewing perspective. In an embodiment, the viewing perspective of the user when accessing the virtual environment through the user graphical representation is a top viewing perspective, or a third-person viewing perspective, or a first-person viewing perspective, or a self-viewing perspective, or a broadcasting camera perspective. A self-viewing perspective may include the user graphical representation as seen by another user graphical representation, and, optionally, the virtual background of the user graphical representation.

In yet further embodiments, the viewing perspective is updated as a user manually navigates through the virtual environment via the graphical user interface.

In yet further embodiments, the viewing perspective is established and updated automatically by using a virtual camera, wherein the viewing perspective of the live data feed is associated with the viewing perspective of the user graphical representation and the virtual camera, and wherein the virtual camera is updated automatically by tracking and analyzing user eye-and-head-tilting data, or head-rotation data, or a combination thereof. In an embodiment, the viewing perspective is established and updated automatically by using one or more virtual cameras that are placed virtually and aligned in front of the user graphical representation, e.g., in front of the video without removed background, or the video with removed background, or the user 3D virtual cutout or user real-time 3D virtual cutout. In one embodiment, the one or more virtual cameras may point outward from eye level. In another embodiment, two virtual cameras, one per eye, point outward from the two-eye level. In yet another embodiment, the one or more virtual cameras may point outward from the center of the head-position of the user graphical representation. In yet another embodiment, the one or more virtual cameras may point outward from the center of the user graphical representation. In yet another embodiment, the one or more virtual cameras may be placed in front of the user graphical representation at, e.g., the head-level of the user graphical representation, pointing toward the user graphical representation when in the self-viewing perspective. The viewing perspective of the user captured by the camera is associated to the viewing perspective of the user graphical representation and the associated virtual camera(s) using computer vision, accordingly steering the virtual camera(s). Furthermore, the virtual camera is established and updated automatically by tracking and analyzing user eye-and-head-tilting data, or head-rotation data, or a combination thereof.

In yet further embodiments, the self-viewing perspective comprises the graphical representation cutout as seen by another user graphical representation (e.g., as in a "selfie mode" of a phone camera) with the removed background. The self-viewing perspective comprises, alternatively, the virtual background of the virtual environment behind the user graphical representation for the understanding of the perception of him or herself as seen by the other participants. The self-viewing perspective, when including the virtual background of the user graphical representation, can be set as an area around the user graphical representation that may be captured by the virtual camera, may result in a circular, square, rectangular, or any other suitable shape for the framing of the self-viewing perspective.

In some embodiments, updating of the user graphical representation within the virtual environment comprises updating a user status. In an embodiment, available user statuses include being away, busy, available, offline, in a conference call, or in a meeting. The user status may be updated manually through the graphical user interface. In other embodiments, the user status is updated automatically via connecting to user calendar information comprising and synchronizing user status data. In yet other embodiments, the user status is updated automatically through detection of usage of specific programs like a programming development environment, 3D editor or other productivity software that designates busy status that may be synchronized on the user status. In yet further embodiments, the user status may be updated automatically through the machine vision algorithms based on data obtained from the camera feed.

In some embodiments, interactions between users through corresponding user graphical representations, including, in particular, social interactions, comprise chatting; screen sharing; host options; remote sensing; recording; voting; document sharing; emoticon sending; agenda sharing and editing; virtually hugging; hand-raising; hand-shaking; walking; content adding comprising interactive applications or static or interactive 3D assets, animations or 2D textures; meeting-summary preparation; object moving; content projecting; laser-pointing; game-playing; purchasing; engaging in an ad hoc virtual communication; and engaging in a private or group conversation.

In some embodiments, the virtual environment is a persistent virtual environment stored in persistent memory storage of the one or more cloud server computers or a temporary virtual environment stored in temporary memory storage of the one or more cloud server computers. In an embodiment, the virtual environment is a persistent virtual environment recording changes performed thereon comprising customizations which are stored in persistent memory storage of the at least one cloud server computer designated to the persistent virtual environment. In other embodiments, the virtual environment is a temporary virtual environment stored in temporary memory storage of the cloud server.

In some embodiments, the arrangement of the virtual environment is associated with a contextual theme of the virtual environment related to one or more virtual environment verticals selected from the virtual environment platform. In an embodiment, possible arrangements include arrangements for use in education, meetings, working, shopping, servicing, socializing or entertainment, or combinations thereof. A complex of virtual environments within one or more verticals may represent a virtual environment cluster.

In further embodiments the virtual environment cluster is one or more of a virtual school comprising at least a plurality of classrooms; or a virtual company comprising at least a plurality of working areas and meeting rooms, wherein some of the working areas are shared as a co-working or networking space for members of different organizations; or an event facility comprising at least one indoor or outdoor event area hosting a live event including the capture of live entertainment performers; or a virtual shopping mall comprising at least a plurality of stores; or a virtual casino comprising at least a plurality of playing areas; or a virtual bank comprising at least a plurality of service areas; or a virtual nightclub comprising at least a plurality of VIP and/or party areas including the capture of live disk-jockey (DJ) performer; or a virtual karaoke entertainment establishment comprising a plurality of private or public karaoke rooms; or a virtual cruise ship comprising a plurality of virtual areas within the cruise ship along with areas external to the cruise ship comprising landscapes, islands, towns and cities enabling users to get off the virtual cruise ship to visit those virtual areas; or an e-sports stadium or gymnasium.

In further embodiments, the virtual environment further comprises virtual computers including virtual resources. In an embodiment, the virtual resources are from the one or more cloud computer resources that are accessed through the client device and are assigned with administrative tools to said virtual computer resources.

In some embodiments, the virtual environment platform is configured to enable multi-casting or broadcasting of remote events to a plurality of instances of a virtual environment. This may be done, for example, to accommodate a large number of users from various parts of the world to experience the same live-event that is multi-casted.

In some embodiments, a clickable link redirecting to the virtual environment is embedded into one or more third party sources comprising third-party websites, applications or video-games.

In another aspect of the current disclosure, a method enabling interactions, including social interactions, in virtual environments comprises providing a virtual environment platform comprising at least one virtual environment in memory of one or more cloud server computers comprising at least one processor; receiving live data feed (e.g., of a user, as captured by at least one camera) from at least one corresponding client device; generating, from the live data feed, a user graphical representation; inserting the user graphical representation into a three-dimensional coordinate position of the virtual environment; updating, from the live data feed, the user graphical representation within the virtual environment; processing data generated from interactions in the virtual environment. Such interactions may include, in particular, social interactions in the virtual environment. For such interactions, the method may include serving the updated virtual environment to the client device by direct P2P communication or indirectly through the use of one or more cloud servers, enabling real-time multi-user collaborations, interactions in the virtual environment.

In some embodiments, the system (e.g., via a virtual environment platform) may further enable creating ad hoc virtual communications, which may comprise creating an ad hoc voice communication channel between user graphical representations without needing to change the current viewing perspective or location in the virtual environment. For example, a user graphical representation may approach another user graphical representation and engage in an ad hoc voice conversation at the place within the virtual environment where both user graphical representations area located. Such communication would be enabled by, for example, taking into account the distance, position and orientation between the user graphical representations, and or their current availability status (e.g., being available or unavailable) or status configuration for such ad hoc communications, or combinations thereof. The approaching user graphical representation would see a visual feedback on the other user graphical representation, signaling that an ad hoc communication is possible and hence setting the onset of a conversation between both user graphical representations, wherein the approaching user may speak and the other user may hear and respond back. In another embodiment, the virtual environment platform enables engaging in an ad hoc virtual communication in a virtual environment through processing data that is generated in response to steps performed by client devices, which may include the steps of approaching a user graphical representation; selecting and clicking on the user graphical representation; sending or receiving an ad hoc virtual communication engagement invitation to or from another user graphical representation; and accepting the received invitation. In such a scenario, the platform may open up an communication channel between the user client devices, wherein the user graphical representations hold the conversation in the virtual space of the virtual environment.

In some embodiments, the method further includes engaging one or more users in conversations, transitioning the user graphical representation from a user 3D virtual cutout into a user real-time 3D virtual cutout, or video with a removed background, or a video without a removed background; and opening up a peer-to-peer (P2P) communication channel between the user client devices. In an embodiment, steps that lead to engaging two or more users in conversations include approaching a user graphical representation; selecting and clicking on the user graphical representation; sending or receiving a conversation engagement invitation to or from another user graphical representation; and accepting the received invitation. The step of opening up a communication channel between the user client devices may be performed where the processing and rendering is performed by the client device, or the step of opening up an indirect communication channel through one or more cloud server computers may be performed when processing and rendering is performed on at least one cloud server computer or between at least one cloud server and the client devices. In further embodiments, the conversation comprises sending and receiving real-time audio from and to the user 3D virtual cutout of participants. In further embodiments, the conversation comprises sending and receiving real-time audio and video displayed from the user real-time 3D virtual cutout or video with removed background, or video without removed background of participants.

In some embodiments, the method enabling interactions in virtual environments further comprises embedding a clickable link redirecting to the virtual environment into one or more third party sources comprising third-party websites, applications or video-games.

In another aspect of the current disclosure, a data processing system comprises one or more computing devices including at least one cloud server computer, the one or more computing devices comprising at least one processor and memory storing data and instructions implementing image processing functions, wherein the one or more computing devices of the data processing system are configured to generate a user graphical representation from a live data feed by one or more image processing combinations of the at least one cloud server computer and two or more client devices in a hybrid system architecture. In an embodiment, the system comprises two or more client devices communicatively connected to each other and to one or more cloud server computers via a network, comprising at least one processor and memory storing data and instructions implementing image and media processing functions; and at least one camera obtaining live data feed from at least one user of at least one of the client devices and being connected to at least one client device and one or more cloud server computers. A user graphical representation is generated from the live data feed by one or more image and media processing combinations of the one or more cloud server computers and one or more client devices. The one or more cloud server computers and one or more client devices interact through a hybrid system architecture.

In some embodiments, the data used as input data for the data processing system comprises 2D or 3D image data, 3D geometries, video data, media data, audio data, textual data, haptic data, time data, 3D entities, 3D dynamic objects, textual data, time data, metadata, priority data, security data, positional data, lighting data, depth data, and infrared data, amongst others.

In some embodiments, the hybrid system architecture comprises a client-server side and a peer-to-peer (P2P) side. In an embodiment the client-server side comprises web or application servers. The client-server side may be further configured to include secure communication protocols; micro-services; a database management system; a database; and/or a distributed message and resource distribution platform. Server-side components may be provided along with the client devices that communicate to the servers through a network. The client-server side defines the interaction between the one or more clients and the server through the network, including any processing performed by a client side, a server side, or a receiving client side. In an embodiment, one or more of the corresponding clients and servers perform the necessary image and media processing according to various rule-based task allocation combinations. In an embodiment, the web or application servers are configured to receive client requests employing the secure communication protocols and process the client requests by requesting the micro-services or data corresponding to the requests from the database using a database management system. The micro-services are distributed utilizing a distributed message and resource distribution platform using the publish-subscribe model.

The P2P side comprises a P2P communication protocol enabling real-time communication between client devices in the virtual environment; and a rendering engine configured to enable the client device to perform real-time 3D rendering of a live session elements therein included (e.g., user graphical representations) in the virtual environment. In an embodiment, the P2P side further includes a computer vision library configured to enable the client device to perform real-time computer vision tasks in the virtual environment. Using such a hybrid model of communication may enable rapid P2P communications between users reducing latency problems while providing web services and resources to each session, enabling a plurality of interactions between users and with content in the virtual environment.

The P2P side defines interactions between client devices and any processing that one or the other client device from the P2P side may perform. In some embodiments, the P2P side is used for video and data processing tasks and synchronization between client devices, streaming and rendering. In other embodiments, the P2P side is used for video streaming, rendering and synchronization between client devices while the client-server side is used for data processing tasks. In further embodiments, the client-server side is used for video streaming along with data processing tasks while the P2P side is used for video rendering and synchronization between client devices. In yet further embodiments, the client-server side is used for video streaming, rendering and data processing tasks and synchronization.

In an embodiment, the data processing tasks comprise generating the user graphical representation and inserting the user graphical representation into a virtual environment. Generating the user graphical representation may include performing background removal or other processing or improvements.

In some embodiments, data in the P2P side is sent directly from one client device to the peer client device and vice versa or is relayed through a server through the client-server side.

In some embodiments, the at least one cloud server may be an intermediary server, meaning that the server is used to facilitate and/or optimize the exchange of data between client devices. In such embodiments, the at least one cloud server may manage, analyze process and optimize incoming image and multimedia streams and manage, assess, optimize the forwarding of the outbound streams as a router topology (for example but not limited to SFU (Selective Forwarding Units), SAMS (Spatially Analyzed Media Server), multimedia server routers, or an image and media processing (for example but not limited to decoding, combining, improving, mixing, enhancing, augmenting, computing, manipulating, encoding) and forwarding server topology (for example but not limited to Multipoint Control Units—MCU, cloud media mixers, cloud 3D renderer, and the like), or other server topologies.

In such embodiments, where the intermediary server is a SAMS, such media server manages, analyze and processes incoming data of sending each client device (e.g., including but not limited to meta-data, priority data, data classes, spatial structure data, three dimensional positional, orientation or locomotion information, image, media, scalable video codec based video) and in such analysis optimizes the forwarding of the outbound data streams to each receiving client device by modifying, upscaling or downscaling the media for temporal (varying frame rate), spatial (e.g., different image size), quality (e.g., different compression or encoding based qualities) and color (e.g., color resolution and range) based on the specific receiving client device user's spatial, three dimensional orientation, distance and priority relationship to such incoming data achieving optimal bandwidths and computing resource utilizations for receiving one or more user client devices.

In some embodiments, a plurality of image processing tasks are classified based on whether they are performed by the client device, cloud server and/or receiving client device, and are thus classified as client device image processing, server image processing, and receiving client device image processing. The plurality of image processing tasks may be performed on the client-server side, P2P side, or combinations thereof of a hybrid architecture. The image processing tasks comprise background removal, further processing or improvements, and insertion into and combination with a virtual environment. A combination of the three image processing tasks may be used in the generation, improvement and insertion/combination of a user graphical representation into a virtual environment. The image processing combination and corresponding level of usage of the client device processing, server image processing, and receiving client device processing depend on the amount of data to be processed, the latency permitted to sustain a smooth user experience, the desired quality of service (QOS), the services required, and the like. Below are eight such image processing combinations performed at the client-server side.

In some embodiments, at least one of the client devices is configured to, in an image processing combination in the client-server side, generate the user graphical representation, perform background removal, and send the user graphical representation with removed background to the at least one cloud server for further processing. In a first illustrative image processing combination, the client device generates the user graphical representation, comprising the background removal, and sends the user graphical representation with removed background to the at least one cloud server for further processing or improvements, generating an enhanced user graphical representation with removed background. The at least one cloud server sends the enhanced user graphical representation with removed background to the receiving client device, which inserts into and combines the enhanced user graphical representation with removed background with a virtual environment.

In a second illustrative image processing combination, the client device generates the user graphical representation, comprising the background removal, and performs further processing thereon, generating an enhanced user graphical representation with removed background before sending to the at least one cloud server. The at least one cloud server sends the enhanced user graphical representation with removed background to the receiving client device, which inserts into and combines the enhanced user graphical representation with removed background a virtual environment.

In a third illustrative image processing combination, the client device generates the user graphical representation, comprising the background removal, performs further processing thereon, generating an enhanced user graphical representation with removed background, and inserts into and combines the enhanced user graphical representation with removed background with a virtual environment. The client device then sends the enhanced user graphical representation with removed background inserted into and combined with the virtual environment to the cloud server for relaying to the receiving client device.

In a fourth illustrative image processing combination, the client device generates the user graphical representation, comprising the background removal, and sends the user graphical representation with removed background to the at least one cloud server for performing further processing, generating an enhanced user graphical representation with removed background. The at least one cloud server then inserts into and combines the enhanced user graphical representation with removed background with a virtual environment before sending to the receiving client device.

In a fifth illustrative image processing combination, the client device generates the user graphical representation, comprising the background removal, and sends the user graphical representation with removed background to the at least one cloud server for relaying to the receiving client device. The receiving client device performs further processing on the user graphical representation with removed background, generating an enhanced user graphical representation with removed background that the receiving client device inserts into and combines with a virtual environment.

In a sixth illustrative image processing combination, the client device sends the camera live data feed received from the at least one camera and sends the unprocessed data to the at least one cloud server, which performs the generation of the user graphical representation, comprising the background removal, and performs further processing on the user graphical representation with removed background, generating an enhanced user graphical representation with removed background that is sent to the receiving client device. The receiving client device inserts into and combines the enhanced user graphical representation with removed background with a virtual environment.

In a seventh illustrative image processing combination, the client device sends the camera live data feed received from the at least one camera and sends the unprocessed data to the at least one cloud server. The at least one cloud server generates the user graphical representation, comprising the background removal, performs further processing on the user graphical representation with removed background, generating an enhanced user graphical representation with removed background before inserting into and combining the enhanced user graphical representation with removed background with a virtual environment that is sent to the receiving client device.

In an eighth illustrative image processing combination, the client device sends the camera live data feed received from the at least one camera and sends the unprocessed data to the at least one cloud server for relaying to the receiving client device. The receiving client device uses the data to generate the user graphical representation, comprising the background removal, and performs further processing on the user graphical representation with removed background, generating an enhanced user graphical representation with removed background before inserting into and combining the enhanced user graphical representation with removed background with a virtual environment.

In some embodiments, when the data in the client-server side is relayed through the at least one cloud server, the at least one cloud server is configured as a Traversal Using Relay NAT (TURN) server. TURN may be used in the case of symmetric NAT (Network Address Translation), and may remain in the media path after the connection has been established while the processed and/or unprocessed data is being relayed between client devices.

Below are descriptions of three illustrative image processing combinations performed at the P2P side, performed by either or both of a first and a second peer device.

In a first image processing combination, the first peer device generates the user graphical representation, comprising the background removal, performs further processing thereon, generating an enhanced user graphical representation with removed background, and inserts into and combines the enhanced user graphical representation with removed background with a virtual environment. The first peer device then sends the enhanced user graphical representation with removed background inserted into and combined with the virtual environment to the second peer device.

In a second image processing combination, the first peer device generates the user graphical representation, comprising the background removal, and sends the user graphical representation with removed background to the second peer device. The second peer device performs further processing on the user graphical representation with removed background, generating an enhanced user graphical representation with removed background that the second peer device inserts into and combines with a virtual environment.

In a third image processing combination, the first peer device sends the camera live data feed received from the at least one camera and sends the unprocessed data to the second peer device. The second peer device uses the data to generate the user graphical representation, comprising the background removal, and performs further processing on the user graphical representation with removed background, generating an enhanced user graphical representation with removed background before inserting into and combining the enhanced user graphical representation with removed background with a virtual environment.

In some embodiments, the three image processing combinations in the P2P side may further comprise relaying the data through the at least one cloud server. In these embodiments, the at least one cloud server may be configured as a STUN server, which allows the peer devices to discover their public IP address and the type of NAT they are behind, information which may be used to establish a data connection and data exchange between the peer devices. In another embodiment, the at least one cloud server computer may be configured for signaling, which may be used for the peer devices to locate and connect to each other as well as to exchange data through communication coordination performed by the at least one cloud server.

In some embodiments, the media, video and/or data processing tasks comprise one or more of encoding, transcoding, decoding spatial or 3D analysis and processing comprising one or more of image filtering, computer vision processing, image sharpening, background improvements, background removal, foreground blurring, eye covering, pixilation of faces, voice-distortion, image uprezzing, image cleansing, bone structure analysis, face or head counting, object recognition, marker or QR code-tracking, eye tracking, feature analysis, 3D mesh or volume generation, feature tracking, facial recognition, SLAM tracking and facial expression recognition or other modular plugins in form of micro-services running on such media router or servers.

In some embodiments, the background removal comprises employing image segmentation through one or more of instance segmentation or semantic segmentation and usage of deep neural networks.

In some embodiments, one or more computing devices of the data processing system are further configured to insert the user graphical representation into a virtual environment by generating a virtual camera, wherein generating the virtual camera comprises associating captured viewing perspective data with a viewing perspective of the user graphical representation within the virtual environment. In an embodiment, inserting into and combining the user graphical representation with the virtual environment comprises generating one or more virtual cameras that are placed virtually and aligned in front of the user graphical representation, e.g., in front of the video with removed background, or the video without removed background, or the user 3D virtual cutout or user real-time 3D virtual cutout. In one embodiment, the one or more virtual cameras may point outward from eye level. In another embodiment, two virtual cameras, one per eye, may point outward from the two-eye level. In yet another embodiment, the one or more virtual cameras may point outward from the center of the head-position of the user graphical representation. In yet another embodiment, the one or more virtual cameras may point outward from the center of the user graphical representation. In yet another embodiment, the one or more virtual cameras may be placed in front of the user graphical representation at, e.g., the head level of the user graphical representation, pointing toward the user graphical representation when in the self-viewing perspective.

In an embodiment, one or more virtual cameras are created at least by associating the captured viewing perspective data of the user to the viewing perspective of the user graphical representation within the virtual environment using computer vision.

In another aspect of the current disclosure, an image processing method comprises providing in memory of at least one cloud server computer data and instructions implementing image processing functions; and generating, by one or more image processing combinations of the at least one cloud server computer and at least one client device, a user graphical representation in a virtual environment based on a live data feed from the at least one client device, wherein the at least one cloud server computer interacts with the at least one client device through a hybrid system architecture. In an embodiment, the method includes obtaining, from at least one camera, the live data feed from at least one user of at least one corresponding client devices; and generating, by one or more image processing combinations of the one or more cloud server computers and at least one client devices, a user graphical representation. The one or more cloud server computers and at least one client device may interact through a hybrid system architecture of the current disclosure comprising a P2P side and a client-server side.

In some embodiments, the method comprises performing, by the P2P side, video and data processing and synchronization between client devices, streaming and rendering. In further embodiments, the method comprises performing, by the P2P side, video streaming, rendering and synchronization between client devices while the client-server side is used for data processing. In further embodiments, the method comprises performing, by the client-server side, video streaming along with data processing while the P2P side is used for video rendering and synchronization between client devices. In yet further embodiments, the method comprises performing, by the client-server side, video streaming, rendering and data processing and synchronization.

In some embodiments, the data processing tasks comprise generating the user graphical representation and inserting the user graphical representation into the virtual environment. In an embodiment, the data processing tasks comprise first generating the user graphical representation comprising performing background removal, then performing further processing, and subsequently inserting into and combining with a virtual environment. In yet further embodiments, the image processing tasks are performed through a plurality of image processing combinations of the client devices and cloud server computers in the client-server side or in the P2P side.

In some embodiments, inserting the user graphical representation into the virtual environment comprises generating a virtual camera, wherein generating the virtual camera comprises associating captured viewing perspective data with a viewing perspective of the user graphical representation within the virtual environment. In an embodiment, inserting into and combining the user graphical representation with the virtual environment comprises generating one or more virtual cameras that are placed virtually and aligned in front of the user graphical representation, e.g., in front of the video with removed background, or video without remove background, or the user 3D virtual cutout or user real-time 3D virtual cutout. In one embodiment, the one or more virtual cameras may point outward from eye level. In another embodiment, two virtual cameras, one per eye, may point outward from the two-eye level. In yet another embodiment, the one or more virtual cameras may point outward from the center of the head-position of the user graphical representation. In yet another embodiment, the one or more virtual cameras may point outward from the center of the user graphical representation. In yet another embodiment, the one or more virtual cameras may be placed in front of the user graphical representation at, e.g., at the head level of the user, pointing toward the user graphical representation when in the self-viewing perspective. The virtual camera is created at least by associating the captured viewing perspective data of the user to the viewing perspective of the user graphical representation within the virtual environment using computer vision.

In some embodiments, the method further comprises embedding, on the user graphical representation, a clickable link embedded thereon which, in response to clicking, directs to third-party sources comprising profile information about the corresponding user.

In another aspect of the current disclosure, a user graphical representation-based user authentication system comprises one or more cloud server computers comprising at least one processor and memory storing data and instructions comprising a user database storing user data associated with a user account and one or more corresponding user graphical representations, and a facial scanning and authentication module connected to the database; wherein the one or more cloud server computers are configured to perform steps comprising: authenticating a user by performing a facial scanning of the user through the facial scanning and authentication module, wherein the facial scanning comprises extracting facial feature data from camera data received from a client device and checking the extracted facial feature data for a match against a user graphical representation associated with the user account in the user database; if a matching user graphical representation is found in the checking step, providing the user with access to the corresponding user account; and if a matching user graphical representation is not found in the checking step, generating, from the camera data, a new user graphical representation along with a new user account stored in the user database, and access to the user account.

In an embodiment, the system includes at least one camera configured to obtain data from a user of at least one client device requesting access to the user account, wherein the at least one camera is connected to the at least one client device and one or more cloud server computers. The one or more cloud server computers authenticate the user by performing a facial scanning of the user through the facial scanning and authentication module, checking the user database for a match against a user graphical representation, and if a user account is confirmed and available, by providing the user with the corresponding user graphical representation along with access to the user account; and, if a user account is not available, by generating, from the data, a new user graphical representation along with a new user account stored in the user database along with access to the user account.

The user account may be, for example, employed for accessing virtual environment platform or any other application (e.g., applications that may be linked to the environment platform), such as any interactive application, game, email account, university profile account, work account, etc. The user graphical representation-based user authentication system of the current disclosure, given, amongst others, the additional authentication step of generating a user graphical representation or retrieving from the user database an existing user graphical representation, provides a higher security level than standard camera-based face detection authentication systems.

In some embodiments, the user graphical representation is a user 3D virtual cutout, or a user real-time 3D virtual cutout with a removed background, or a video with removed background, or a video without removed background. In an embodiment, the user graphical representation is a user 3D virtual cutout constructed from a user-uploaded or third-party-source photo, or a user real-time 3D virtual cutout with a removed background generated based on the real-time 2D or 3D live video stream data feed obtained from the camera, or a video with removed background, or a video without removed background. In some embodiments, the one or more cloud server computers are further configured to animate the matching user graphical representation or the new user graphical representation. Animating the matching user graphical representation comprises applying machine vision algorithms by the client device or the at least one cloud server computer on the respective user graphical representation for recognizing facial expressions of the user and graphically simulating the facial expressions on the user graphical representation. In further embodiments, updating of the user 3D virtual cutout constructed from a user-uploaded or third-party-source photo comprises applying machine vision algorithms by the client device or the at least one cloud server computer on the generated user 3D virtual cutout for recognizing facial expressions of the user and graphically simulating the facial expressions on the user 3D virtual cutout.

In some embodiments, the one or more cloud server computers are further configured to check a date of the matching user graphical representation and determine whether an update of the matching user graphical representation is required. In an embodiment, if a user account is available, and in response to the one or more cloud server computers checking the date of the available user graphical representation, the one or more cloud server computers determine whether an update of the existing user graphical representation is required by comparing to corresponding threshold values or security requirements. For example, if there were to be a system security update, it could be that all user graphical representations may need to be updated, or at least those that were created before a specified date. If a user graphical representation is required, the one or more cloud server computers generate a user graphical representation update request to the corresponding client device. If the user approves the request, the one or more cloud server computers or client devices proceed to generate the user graphical representation based on the live camera feed. If an update is not required, the one or more cloud server computers proceed to retrieve the existing user graphical representation from the user database.

In some embodiments, the user graphical representation is inserted into a two-or-three dimensional virtual environment, or on a third-party source linked to a virtual environment (e.g., by being overlaid on the screen of a third-party application or website integrated with or coupled to the system of the current disclosure) and graphically combined with the two-or-three dimensional virtual environment.

In some embodiments, the generation process of the user graphical representation takes place asynchronously from user access to the user account. For example, if the system determines that the user has already authenticated after performing the user graphical representation-based facial scanning and detection, the system may enable the user to access the user account while a new user graphical representation is being generated for providing to the user once ready and then inserting into and combining with the virtual environment.

In some embodiments, the one or more cloud server computers are further configured to authenticate the user through login authentication credentials comprising a personal identification number (PIN), or username and password, or a combination thereof.

In some embodiments, the authenticating is triggered in response to activation of an invitation link or a deep link sent from one client device to another client device. In an embodiment, clicking on the invitation link or deep link triggers the at least one cloud server computer to request the user to authenticate. For example, the invitation link or deep link may be for a phone call, conference or video game session invitation, wherein the invited user may be authenticated through the user graphical representation-based authentication system of the current disclosure.

In another embodiment, the facial scanning uses 3D authentication comprising guiding a user to perform a head movement pattern and extracting 3D face data based on the head movement pattern. This may be done using application instructions stored in the at least one server computer, which implements the 3D authentication by guiding a user to perform a head movement pattern, for example, to perform one or more head gestures, to tilt or rotate the head horizontally or vertically, in a circular motion, to perform a user-generated gesture pattern, or a specific head movement pattern, or a combination thereof. The 3D authentication recognizes further features from the data obtained from the camera live video data feed, contrary to just comparing and analyzing one view or image. In this 3D authentication embodiment, the facial scanning process may recognize further features from the data, which may comprise face data including head movement patterns, facial volume, heights, depths of facial features, facial scars, tattoos, eye colors, facial skin parameters (e.g., skin color, wrinkles, pore structure, etc.), reflectance parameters, besides, e.g., just location of such features on the face topology, as may be the case with other types of facial detection systems. Capturing such face data may thus increase the capture of a realistic face that may serve in the generation of a realistic user graphical representation. The facial scanning using 3D authentication may be performed using high-resolution 3D cameras, depth cameras (e.g., LIDARs), light-field cameras, and the like. The facial scanning process and 3D authentication may use deep neural networks, convolution-neural networks and other deep learning techniques to retrieve, process, assess an authenticate the user by using the face data.

In another aspect of the current disclosure, a user graphical representation-based user authentication method comprises providing in memory of one or more cloud server computers a user database storing user data associated with a user account and one or more corresponding user graphical representations and a facial scanning and authentication module connected to the user database; receiving, from a client device, a request to access the user account; performing a facial scanning of a user of the client device through the facial scanning and authentication module by extracting facial feature data from camera data captured by at least one camera in communication with the client device; checking the extracted facial feature data for a match against a user graphical representation associated with the user account in the user database; if a matching user graphical representation is found in the checking step, providing the user with access to the user account; and if a matching user graphical representation is not found in the checking step, generating, from the camera data, a new user graphical representation along with a new user account stored in the user database, and providing access to the user account.

In an embodiment, the method includes performing a facial scanning of a user of the at least one client device through the facial scanning and authentication module by using image and/or media data received from at least one camera connected to the at least one client device and one or more cloud server computers; checking the user database for a match of the user face data associated to the user account; if a user account is available, providing the user with the corresponding user graphical representation along with access to the user account; and, if a user account is not available, generating, from the face data, a new user graphical representation along with a new user account stored in the user database and access to the user account.

In some embodiments, the user graphical representation is a user 3D virtual cutout constructed from a user-uploaded or third-party-source photo, or a user real-time 3D virtual cutout comprising the real-time video stream of the user with a removed background generated based on the real-time 2D or 3D live video stream data feed obtained from the camera, or a video with removed background, or a video without removed background. In further embodiments, the method includes animating the matching user graphical representation or the new user graphical representation, which may include applying machine vision algorithms by the client device or the at least one cloud server computer on the respective user graphical representation for recognizing facial expressions of the user and graphically simulating the facial expressions on the user graphical representation. In an embodiment, updating of a user 3D virtual cutout comprises applying machine vision algorithms by the client device or the at least one cloud server computer on the generated user 3D virtual cutout for recognizing facial expressions of the user and graphically simulating the facial expressions on the user 3D virtual cutout.

In some embodiments, the method further comprises, if a matching user graphical representation is found in the checking step, checking a date of the matching user graphical representation; determining, based at least in part on the date, whether an update of the matching user graphical representation is required; and in a positive case where an update of the matching user graphical representation is required, generating a user graphical representation update request. In an embodiment, the method includes, if a user account is available, checking the date of the available user graphical representation; determining whether an update of the existing user graphical representation is required by comparing to corresponding threshold values or security requirements; and, in a positive case where a user graphical representation is required, generating and transmitting a user graphical representation update request to the corresponding client device. If the user approves the request, the one or more cloud server computers or client devices proceed by generating the user graphical representation based on the live camera feed. If an update is not required, the one or more cloud server computers proceed by retrieving the existing user graphical representation from the user database.

In some embodiments, the method further comprises inserting the user graphical representation into a two-or-three dimensional virtual environment or on a third-party source linked to a virtual environment (e.g., by being overlaid on the screen of a third-party application or website integrated with or coupled to the system of the current disclosure), and combining the user graphical representation with the two-or-three dimensional virtual environment.

In some embodiments, the generation process of the new user graphical representation takes place asynchronously from user access to the user account.

In some embodiments, the method further comprises authenticating the user through login authentication credentials comprising at least username and password.

In some embodiments, the authenticating is triggered in response to activation of an invitation link. In an embodiment, the method further comprises providing an invitation link or deep link by one client device to another client device, wherein clicking on the invitation link triggers the at least one cloud server to request the user to authenticate.

In another aspect of the current disclosure, a system for virtually broadcasting from within a virtual environment is provided. The system comprises a server computer system comprising one or more server computers, each server computer comprising at least one processor and memory, the server computer system including data and instructions implementing a data exchange management module configured to manage data exchange between client devices; and at least one virtual environment comprising a virtual broadcasting camera positioned within the at least one virtual environment and being configured to capture multimedia streams from within the at least one virtual environment. The server computer system is configured to receive live feed data captured by at least one camera from at least one client device and broadcast the multimedia streams to the at least one client device based on data exchange management, wherein the broadcasted multimedia streams are configured to be displayed to corresponding user graphical representations generated from a user live data feed from at least one client device. The data exchange management between client devices by the data exchange management module comprises analyzing the incoming multimedia streams and assessing the forwarding outbound multimedia streams based on the analyzing of the incoming media streams.

In an embodiment, multimedia streams are sent to at least one media server computer for broadcasting to at least one client device. In an embodiment, the system includes at least one camera obtaining live feed data from a user of the at least one client device and sending the live feed data from the user to the at least one media computer via the at least one client device; wherein the multimedia streams are broadcast to the at least one client device based on the data exchange management from the at least one media server computer and are displayed to corresponding user graphical representations generated from the user live data feed through the least one client device, and wherein the data exchange management between client devices by the data exchange management module comprises analyzing and optimizing the incoming multimedia streams and assessing and optimizing the forwarding of the outbound multimedia streams.

In some embodiments, the server computer system, when forwarding the outbound multimedia streams, utilizes a routing topology comprising a Selective Forwarding Unit (SFU), a Traversal Using Relay NAT (TURN), a SAMS, or other suitable multimedia server routing topologies, or a media processing and forwarding server topology, or other suitable server topologies.

In some embodiments, the server computer system uses a media processing topology to process the outbound multimedia streams for viewing by the user graphical representations within the at least one virtual environment through the client devices. In an embodiment, at least one media server computer, when utilizing media processing topology, is configured for decoding, combining, improving, mixing, enhancing, augmenting, computing, manipulating, and encoding multimedia streams to relevant client devices for viewing by the user graphical representations within the at least one virtual environment through the client devices.

In some embodiments, the server computer system, when utilizing a forwarding server topology, utilizes one or more of MCUs, cloud media mixers, and cloud 3D renderers.

In some embodiments, the incoming multimedia streams comprise user priority data and distance relationship data, and the user priority data comprises a higher priority score to user graphical representations closer to an incoming multimedia stream's source and a lower priority score to user graphical representations farther from the incoming multimedia stream's source. In an embodiment, the multimedia streams comprise data related to user priority and the distance relationship between the corresponding user graphical representation and multimedia streams, comprising meta-data, or priority data, or data classes, or spatial structure data, or three dimensional positional, or orientation or locomotion information, or image data, or media data, and scalable video codec based video data, or a combination thereof. In further embodiments, the priority data comprises a higher priority score to users closer to the multimedia stream source and a lower priority score to users farther from the multimedia stream source. In yet further embodiments, the forwarding of the outbound multimedia streams is based on the user priority data and the distance relationship data. In an embodiment, the forwarding of the outbound multimedia streams implemented by the media server based on the user priority and distance relationship data comprises optimizing bandwidth and computing resource utilization for the one or more receiving client devices. In yet further embodiments, the forwarding of the outbound multimedia streams further comprises modifying, upscaling or downscaling the multimedia streams for temporal, spatial, quality and/or color features.

In some embodiments, the virtual broadcasting camera is managed through a client device accessing the virtual environment. In an embodiment, the virtual broadcasting camera is configured to steer the point of view of the camera that is updated in the virtual environment, broadcasting the updated point of view to the at least one client device.

In some embodiments, the at least one virtual environment comprises a plurality of virtual broadcasting cameras, each virtual broadcasting camera providing multimedia streams from a corresponding point of view within the at least one virtual environment. In an embodiment, each virtual broadcasting camera provides multimedia streams from a corresponding point of view within the virtual environment that can be selected and alternated between each other by users of the at least one client device, providing a corresponding point of view to the corresponding at least one user graphical representation.

In some embodiments, the at least one virtual environment is hosted by at least one dedicated server computer connected via a network to the at least one media server computer, or is hosted in a peer-to-peer infrastructure and is relayed through the at least one media server computer.

In another aspect of the current disclosure, a method for virtually broadcasting from within a virtual environment comprises providing, in memory of at least one media server, data and instructions implementing a client devices data exchange management module managing data exchange between client devices; capturing multimedia streams by a virtual broadcasting camera positioned within the at least one virtual environment connected to the at least one media server, sending the multimedia streams to the at least one media server for broadcasting to at least one client device; obtaining (e.g., from at least one camera via the at least one client device) live feed data from the at least one client device; performing data exchange management comprising analyzing the incoming multimedia streams from within the at least one virtual environment and live feed data and assessing the forwarding of the outbound multimedia streams; and broadcasting the corresponding multimedia streams to client devices based on the data exchange management, wherein the multimedia streams are displayed to user graphical representations of users of the at least one client device. In this context, this refers to what the user graphical representations could "see" based on their positions in the virtual environment, which corresponds to what would be displayed to a user (via a client device) when viewing the virtual environment from the perspective of his or her user graphical representation.

In some embodiments, when forwarding the outbound multimedia streams, the method utilizes a routing topology comprising SFU, a TURN, SAMS, or other suitable multimedia server routing topologies, or a media processing and forwarding server topology, or other suitable server topologies.

In some embodiments, the method further comprises decoding, combining, improving, mixing, enhancing, augmenting, computing, manipulating, and encoding multimedia streams when utilizing a media processing topology.

In some embodiments, the method further comprises, when utilizing a forwarding server topology, utilizing one or more of Multipoint Control Units (MCUs), cloud media mixers, and cloud 3D renderers.

In some embodiments, the incoming multimedia streams comprise user priority data and distance relationship data, and the user priority data comprises a higher priority score to user graphical representations closer to an incoming multimedia streams' source and a lower priority score to user graphical representations farther from the incoming multimedia stream's source. In an embodiment, the method further comprises optimizing the forwarding of the outbound multimedia streams implemented by the media server based on the user priority and distance relationship data, which may include optimizing bandwidth and computing resource utilization for the one or more receiving client devices. In further embodiments, optimizing the forwarding of the outbound multimedia streams implemented by the media server further comprises modifying, upscaling or downscaling the multimedia streams for temporal, spatial, quality and/or color features.

In some embodiments, the at least one virtual environment comprises a plurality of virtual broadcasting cameras, each virtual broadcasting camera providing multimedia streams from a corresponding point of view within the at least one virtual environment. In an embodiment, the method further comprises providing a plurality of virtual broadcasting cameras, each providing multimedia streams from a corresponding point of view within the virtual environment that can be selected and alternated between each other by users of the at least one client device, providing a corresponding point of view to the corresponding at least one user graphical representation.

In another aspect of the current disclosure, a system for delivering applications within a virtual environment is provided, comprising at least one cloud server computer comprising at least one processor and memory including data and instructions implementing at least one virtual environment linked to an application module including one or more installed applications and corresponding application rules for multi-user interactions; wherein, responsive to selection by a virtual environment host through a client device, the one or more installed applications are displayed and activated during a session of the virtual environment, enabling a user graphical representation of the virtual environment host and any participant user graphical representations within the virtual environment to interact with the one or more installed applications through corresponding client devices, and wherein the at least one cloud server computer manages and processes received user interactions with the one or more installed applications according to the application rules for multi-user interactions in the application module, and forwards the processed interactions accordingly (e.g., to each of the client devices) to establish a multi-user session enabling shared experiences according to the multi-user interaction application rules.

In some embodiments, the application rules for multi-user interactions are stored and managed in one or more separate application servers.

In some embodiments, the one or more applications are installed from an application installation package available from an application library, provisioning the application services through corresponding application programming interfaces.

In some embodiments, the application library is contextually filtered. In an embodiment, the contextual filtering is designed to provide relevant applications for particular contexts.

In some embodiments, the one or more installed applications are shared with and viewed through virtual display applications installed in the corresponding client devices. In an embodiment, upon installation and activation, the one or more installed applications are shared with and viewed through virtual display applications installed in the corresponding client devices, wherein the virtual display applications are configured to receive the one or more installed applications from the application library and publish the one or more selected applications to display to the meeting host user graphical representation and other participant user graphical representations in the virtual environment through their corresponding client devices. In further embodiments, the application module is represented as a 2D screen or 3D volume application module graphical representation displaying content from the installed application to the user graphical representations in the virtual environment, and wherein the virtual display applications are represented as 2D screens or 3D volumes displaying content from the installed application to the user graphical representations in the virtual environment.

In some embodiments, the one or more applications are installed directly inside the virtual environment previously or at the same time as the multi-user session is taking place.

In some embodiments, the one or more applications are installed through the use of a virtual environment setup tool prior to starting the multi-user session.

In some embodiments, one or more of the application rules for multi-user interactions define synchronous interactions, or asynchronous interactions, or a combination thereof. In an embodiment, such rules are accordingly used for updating user interactions and the respective updated view of the one or more applications.

In some embodiments, the asynchronous interactions are enabled through the at least one server computer, or through separate server computers dedicated to processing individual user interactions with the at least one installed application.

In some embodiments, the virtual environment is a classroom, or an office space, or a conference room, or a meeting room, or an auditorium, or a theater.

In another aspect of the current disclosure, a method for delivering applications within a virtual environment is provided, comprising providing in memory of at least one cloud server computer at least one virtual environment, and an application module including one or more installed applications and corresponding application rules for multi-user interactions, wherein the application module is linked to and visible within the virtual environment; receiving a selection instruction from a virtual environment host; displaying and activating the one or more installed applications during a session of the virtual environment, enabling a user graphical representation of the virtual environment host and one or more participant user graphical representations within the virtual environment to interact with the one or more installed applications through corresponding client devices; receiving user interactions with the one or more installed applications; managing and processing the user interactions with the one or more installed applications according to the application rules for multi-user interactions in the application module; and forwarding the processed interactions the client devices to establish a multi-user session enabling shared experiences according to the application rules.

In some embodiments, the method further comprises storing and managing the application rules for multi-user interactions in one or more separate application servers.

In some embodiments, the method further comprises installing the one or more applications from an application installation package available from an application library; and provisioning the application services through corresponding application programming interfaces. In yet further embodiments, the application library is contextually filtered to provide relevant applications. In yet further embodiments, the one or more installed applications are shared with and viewed through virtual display applications installed in the corresponding client devices. In an embodiment the method includes, upon activation, sharing with and viewing the one or more installed applications through virtual display applications installed in the corresponding client devices, the virtual display applications are configured to receive the one or more installed applications from the application library and publish the one or more selected applications to display to the meeting host user graphical representation and other participant user graphical representations in the virtual environment through their corresponding client devices.

In some embodiments, the method further comprises installing the one or more applications directly inside the virtual environment previously or at the same time as the multi-user session is taking place. In other embodiments, the method further comprises installing the one or more applications through the use of a virtual environment setup tool previous to starting the multi-user session.

In some embodiments, the method further comprises defining one or more of the application rules for multi-user interactions to comprise synchronous interactions, or asynchronous interactions, or a combination thereof. In an embodiment, the method further includes accordingly updating user interactions and the respective updated view of the one or more applications.

In another aspect of the current disclosure, a system to provision virtual computing resources within a virtual environment comprises a server computer system comprising one or more server computers, including at least one cloud server computer comprising at least one processor and memory including data and instructions implementing at least one virtual environment, and at least one virtual computer associated with the at least one virtual environment, wherein the at least one virtual computer receives virtual computing resources from the server computer system. The association may include connecting the virtual computer to the virtual environment. In an embodiment, the at least one virtual computer has a corresponding graphical representation in the virtual environment. The graphical representation may provide further benefits such as facilitating the interaction of a user with the virtual computer and increasing the realism of the user experience (e.g., for a home office experience). Thus, in an embodiment, the at least one virtual computer comprises at least one corresponding associated graphical representation positioned within the virtual environment, wherein the virtual computers receive virtual computing resources from the at least one cloud server computer; and at least one client device connecting to the at least one server computer through a network; wherein, responsive to the at least one client device accessing the one or more virtual computers (e.g., by interacting with corresponding graphical representations), the at least one cloud server computer provisions the at least one client device with at least one portion of the available virtual computing resources.

In some embodiments, the server computer system is configured to provision the at least one client device with the at least one portion of the virtual computing resources responsive to a user graphical representation interacting with at least one corresponding graphical representation of the at least one virtual computer within the at least one virtual environment. In further embodiments, the one or more virtual computer graphical representations are spatially positioned within the virtual environment for access by the user graphical representation. In an embodiment, the arrangement of the virtual environment is associated with a contextual theme of the virtual environment, such as arrangements of virtual items, furniture, floorplans, or the like for use in education, meeting, working, shopping, servicing, socializing or entertainment, respectively. In further embodiments, the one or more virtual computer graphical representations are positioned within the arrangement of the virtual environment for access by the one or more user graphical representations. For example, a virtual computer may be positioned in a virtual room that a user graphical representation will access when engaging in an activity (such as working on a project in a virtual classroom, laboratory, or office) that may require or benefit from an ability to use resources associated with the virtual computer.

In some embodiments, the server computer system is configured to provision the at least one client device with the at least one portion of the virtual computing resources responsive to a user accessing the at least one cloud server computer by logging into the at least one client device without accessing the virtual environment. In an illustrative scenario, the virtual computing resources are accessed by a user accessing the at least one cloud server computer by physically logging into the client device connecting through the network to the at least one cloud server computer, triggering the provisioning of the virtual computing resources to the client device without accessing the virtual environment.

In some embodiments, the at least one portion of virtual computing resources is assigned with administrative tools to the client devices. In further embodiments, the provisioning of the at least one portion of the virtual computing resources is performed based on a stored user profile. In an embodiment, the assignment of resources is performed based on a stored user profile comprising one or more of parameters associated with and assigned to the user profile, comprising priority data, security data, QOS, bandwidth, memory space, or computing power, or a combination thereof.

In some embodiments, the at least one virtual computer comprises a downloadable application available from an application library. In an illustrative scenario involving multiple virtual computers, each virtual computer is a downloadable application available from an application library.

In another aspect of the current disclosure, a method to provision virtual computing resources within a virtual environment comprises providing in memory of at least one cloud server computer at least one virtual computer, and a virtual environment associated with the at least one virtual computer; associating virtual computing resources with the at least one virtual computer; receiving, from at least one client device, an access request to access the one or more virtual computers; and provisioning the at least one client device with a portion of the available virtual computing resources associated with the at least one virtual computer responsive to the access request received from the at least one client device. In an embodiment, the associating of the virtual computing resources with the at least one virtual computer may include receiving, by the virtual computers, the virtual computing resources from the at least one cloud server computer.

In some embodiments, the access request comprises a request to allow a user graphical representation to interact with one or more graphical representations representing the at least one virtual computer. In an embodiment, the method further comprises receiving, from a user graphical representation, an access request to access the one or more graphical representations of the virtual computers within the at least one virtual environment; and providing the at least one portion of the available virtual computing resources to the corresponding client device. In further embodiments, the arrangement of the virtual environment is associated to a contextual theme of the virtual environment, comprising arrangements for use in education, meeting, working, shopping, servicing, socializing or entertainment, respectively, and wherein the one or more virtual computers are positioned within the arrangement of the virtual environment for access by the one or more user graphical representations.

In some embodiments, the access request is triggered by a user logging into the at least one client device. In an embodiment, the method further comprises receiving an access request from a user physically logging into the client device connecting through the network to the at least one cloud server computer; and provisioning the virtual computing resources to the client device without accessing the virtual environment.

In some embodiments, the method further comprises assigning the at least one portion of virtual computing resources with administrative tools to the client devices. In yet further embodiments, said assignment is performed based on a stored user profile comprising one or more of parameters associated with and assigned to the user profile, comprising priority data, security data, QOS, bandwidth, memory space, computing power, or a combination thereof.

In another aspect of the current disclosure, a system enabling ad hoc virtual communications between user graphical representations comprises one or more cloud server computers comprising at least one processor and memory storing data and instructions implementing a virtual environment. The virtual environment is configured to enable at least one approaching user graphical representation and at least one target user graphical representation in the virtual environment to open an ad hoc communication channel, and to enable an ad hoc conversation via the ad hoc communication channel between the user graphical representations within the virtual environment. In an embodiment, the system further comprises two or more client devices accessing the at least one virtual environment through corresponding user graphical representations and being connected to the one or more cloud server computers via a network; wherein the virtual environment enables at least one approaching user graphical representation and at least one target user graphical representation to open an ad hoc communication channel, enabling an ad hoc conversation between the user graphical representations within the virtual environment.

In some embodiments, opening the ad hoc communication channel is performed based on distance, position and orientation between the user graphical representations, or current availability status, privacy settings, or status configuration for the ad hoc communications, or combinations thereof.

In some embodiments, the ad hoc conversation is performed at the place within the virtual environment where both user graphical representations area located. In other embodiments, the ad hoc conversation is performed using the current viewing perspective in the virtual environment.

In some embodiments, the ad hoc conversation enables an optional change of viewing perspective, location, or combinations thereof within the same or another connected virtual environment where the ad hoc conversation takes place.

In some embodiments, the one or more cloud server computers are further configured to generate visual feedback in the virtual environment signaling that an ad hoc communication is possible. In an embodiment, the user graphical representations receive a visual feedback signaling that an ad hoc communication is possible, thereby triggering the opening of the ad hoc communication channel, signaling the onset of the ad hoc conversation between the user graphical representations.

In some embodiments, the ad hoc conversation comprises sending and receiving real-time audio and video. In an illustrative scenario, such video may be displayed from the user graphical representations.

In some embodiments, the user corresponding to an approaching user graphical representation selects and clicks on the target user graphical representation before opening the ad hoc communication channel. In yet further embodiments, the one or more cloud server computers are further configured to open the ad hoc communication channel in response to an accepted invitation. For example, the user corresponding to an approaching user graphical representation sends an ad hoc communication engagement invitation to the target user graphical representation, and receives an invitation approval from the target user graphical representation before opening the ad hoc communication channel.

In some embodiments, the ad hoc communication channel is enabled through the at least one cloud server computer or as a P2P communication channel.

In another aspect of the current disclosure, a method enabling ad hoc virtual communications between user graphical representations comprises providing a virtual environment in memory of one or more cloud server computers comprising at least one processor; detecting two or more client devices accessing the at least one virtual environment through corresponding graphical representations, wherein the client devices are connected to the one or more cloud server computers via a network; and responsive to at least one user graphical representation approaching another user graphical representation, opening up an ad hoc communication channel, enabling an ad hoc conversation between the user graphical representations in the virtual environment.

In some embodiments, the method further comprises detecting and assessing one or more of a distance, position and orientation between the user graphical representations, or current availability status, privacy settings, or status configuration for the ad hoc communications, or combinations thereof before opening the ad hoc communication channel.

In some embodiments, the method enables the ad hoc conversation to be performed at the place within the virtual environment where both user graphical representations area located. In other embodiments, the ad hoc conversation is performed using the current viewing perspective in the virtual environment.

In some embodiments, the method comprises enabling an optional change of viewing perspective, location, or combinations thereof within the same or another connected virtual environment where the ad hoc conversation can take place.

In some embodiments, the method further comprises generating visual feedback in the virtual environment signaling that an ad hoc communication is possible. The method may further include sending visual feedback to the target user graphical representation, signaling that an ad hoc communication is possible, thereby triggering the opening of the ad hoc communication channel, signaling the onset of the conversation between the user graphical representations.

In some embodiments, the conversation comprises sending and receiving real-time audio and video displayed from the user graphical representations.

In some embodiments, the method further comprises selecting and clicking on a target user graphical representation by an approaching a user graphical representation from the user graphical representations. In yet further embodiments, the ad hoc communication channel is opened in response to an accepted invitation. In an embodiment, the method further comprises sending or receiving an ad hoc virtual communication engagement invitation to or from another user graphical representation before opening the ad hoc communication channel.

Computer-readable media having stored thereon instructions configured to cause one or more computers to perform any of the methods described herein are also described.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

Figure 1:
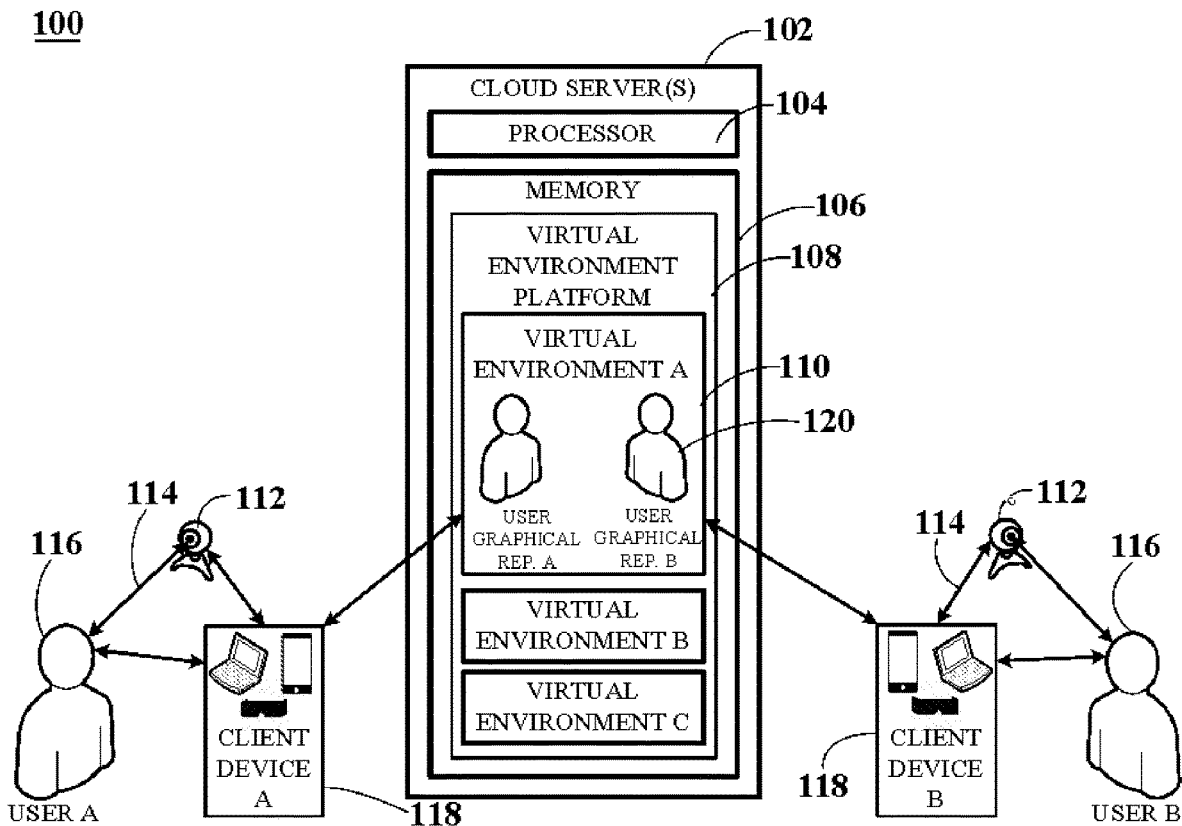
FIG. 1 depicts a schematic representation of a system enabling interactions, including social interactions, in virtual environments, according to an embodiment.

In the following description, reference is made to drawings which show by way of illustration various embodiments. Also, various embodiments will be described below by referring to several examples. It is to be understood that the embodiments may include changes in design and structure without departing from the scope of the claimed subject matter.

Systems and methods of the current disclosure solve at least some of the aforementioned drawbacks by providing a virtual environment platform comprising one or more virtual environments enabling real-time multi-user collaborations and interactions similar to those available in real life, which may be used for meetings, working, education, shopping, and servicing amongst others. The virtual environment may be selected from a plurality of virtual environments in different verticals available at the virtual environment platform. A combination of virtual environments from the same and/or different verticals may form a virtual environment cluster, which may comprise hundreds or even thousands of virtual environments. The virtual environment may be a 2D or 3D virtual environment comprising an arrangement and visual appearance associated to the vertical of the virtual environment, which may be customized by the users depending on their preferences or needs. The users may access the virtual environment through a graphical representation that may be inserted into the virtual environment and graphically combined with the two-or-three dimensional virtual environment.

The user graphical representation may be a user 3D virtual cutout constructed from a user-uploaded or third-party-source photo with a removed background, or a user real-time 3D virtual cutout, or a video with removed background, or video without removed background, any of which may be switched amongst each other at any time, as desired by the user. The user graphical representations may comprise user statuses providing further details about the current availability or other data relevant to other users. Interactions such as conversation and collaboration between users in the virtual environments along with interactions with objects within the virtual environment are enabled. The present disclosure further provides a data processing system and method comprising a plurality of image processing combinations that may be used in the generation of the user graphical representation. The present disclosure further provides a user graphical representation-based user authentication system and method that may be used to access the virtual environment platform or other applications linked to a virtual environment from the virtual environment platform; a system and method for virtually broadcasting from within virtual environment; a system and method for delivering applications within a virtual environment; a system and method to provision cloud computing-based virtual computing resources within a virtual environment cloud server computer; and a system and method enabling ad hoc virtual communications between approaching user graphical representations.

Enabling virtual presence and realistic interactions and collaborations between users in said virtual environments may increase realism of remote activity, such as required in, for example, pandemics or other mobility-restraining situations. The systems and methods of the current disclosure further enable the access of the various virtual environments on client devices such as mobile devices or computers, without the need of more costly immersive devices such as extended reality head-mounted displays or costly novel system infrastructures. Client or peer devices of the current disclosure may comprise, for example, computers, headsets, mobile phones, glasses, transparent screens, tablets and generally input devices with cameras built-in or which may connect to cameras and receive data feed from said cameras.

FIG. 1 depicts a schematic representation of a system 100 enabling social interactions in virtual environments, according to an embodiment.

A system 100 of the current disclosure enabling interactions in virtual environments comprises one or more cloud server computers 102 comprising at least one processor 104 and memory 106 storing data and instructions implementing a virtual environment platform 108 comprising at least one virtual environment 110, such as virtual environments A-C. The one or more cloud server computers are configured to insert a user graphical representation generated from a live data feed obtained by a camera at a three-dimensional coordinate position of the at least one virtual environment, update the user graphical representation in the at least one virtual environment, and enable real-time multi-user collaboration and interactions in the virtual environment. In described embodiments, inserting a user graphical representation into a virtual environment involves graphically combining the user graphical representation in the virtual environment such that the user graphical representation appears in the virtual environment (e.g., at a specified 3D coordinate position). In the example shown in FIG. 1, the system 100 further comprises at least one camera 112 obtaining live data feed 114 from a user 116 of a client device 118. The one or more client devices 118 communicatively connect to the one or more cloud server computers 102 and at least one camera 112 via a network. A user graphical representation 120 generated from the live data feed 114 is inserted into a three-dimensional coordinate position of the virtual environment 110 (e.g., virtual environment A) and is graphically combined with the virtual environment as well as updated using the live data feed 114. The updated virtual environment is served to the client device by direct P2P communication or indirectly through the use of one or more cloud servers 102. The system 100 enables real-time multi-user collaboration and interactions in the virtual environment 110 by accessing a graphical user interface through the client device 118.

In FIG. 1, two users 116 (e.g., users A and B, respectively) are accessing virtual environment A and are interacting with elements therein and with each other through their corresponding user graphical representations 120 (e.g., user graphical representations A and B, respectively) accessed through corresponding client devices 118 (client devices A and B, respectively). Although only two users 116, client devices 118 and user graphical representations 120 are depicted in FIG. 1, those skilled in the art might appreciate that the system may enable a plurality of users 116 interacting with each other through their corresponding graphical representations 120 via corresponding client devices 118.

In some embodiments, the virtual environment platform 108 and corresponding virtual environments 110 may enable sharing in real-time a plurality of experiences, such as live performances, concerts, webinars, keynotes, and the like, to a plurality (e.g., thousands or even millions) of user graphical representations 120. These virtual performances may be presented by and or multi-casted to a plurality of instances of a virtual environment 110 to accommodate a large number of users 116 from various parts of the world.

In some embodiments, the client devices 118 may be one or more of mobile devices, personal computers, game consoles, media centers, and head-mounted displays, amongst others. The cameras 110 may be one or more of a 2D or 3D camera, 360 degree camera, web-camera, RGBD camera, CCTV camera, professional camera, mobile phone camera, depth camera (e.g., LIDAR), or a light-field camera, amongst others.

In some embodiments, a virtual environment 110 refers to a virtual construct (e.g., a virtual model) designed through any suitable 3D modelling technique through computer assisted drawing (CAD) methods. In further embodiments, the virtual environment 110 refers to a virtual construct that is scanned from a real construct (e.g., a physical room) through any suitable scanning tools, comprising image-scanning pipelines input through a variety of photo, video, depth measurements, and/or simultaneous location and mapping (SLAM) scanning in order to generate the virtual environment 110. For example, radar-imaging, such as synthetic-aperture radars, real-aperture radars, Light Detection and Ranging (LIDAR), inverse aperture radars, monopulse radars, and other types of imaging techniques may be used to map and model real-world constructs and turn them into a virtual environment 110. In other embodiments, the virtual environment 110 is a virtual construct that is modelled after a real construct (e.g., a room, building or facility in the real world).

In some embodiments, the client devices 118 and at least one cloud server computer 102 connect through a wired or wireless network. In some embodiments, the network may include millimeter-wave (mmW) or combinations of mmW and sub 6 GHz communication systems, such as $5^{th}$ generation wireless systems communication (5G). In other embodiments, the system may connect through wireless local area networking (Wi-Fi). In other embodiments, the system may communicatively connect through $4^{th}$ generation wireless systems communication (4G), may be supported by 4G communication systems, or may include other wired or wireless communication systems.

In some embodiments, processing and rendering comprised in the generation, updating and insertion of the user graphical representation 120 into the selected virtual environment 110 and combination therewith is performed by at least one processor of the client device 118 upon receiving the live data feed 114 of the user 116. The one or more cloud server computers 102 may receive the client-rendered user graphical representation 120, insert the client-rendered user graphical representation 120 into a three-dimensional coordinate of the virtual environment 110, combine the inserted user graphical representation 120 with a the virtual environment 110 and then proceed to transmit the client-rendered user graphical representation 120 to receiving client devices. For example, as viewed in FIG. 1, client device A may receive the live data feed 114 from the respective camera 112, may process and render the data from the live data feed 114, generating the user graphical representation A, and may then transmit the client-rendered user graphical representation A to the at least one cloud server computer 102, which may position the user graphical representation A in a three-dimensional coordinate of the virtual environment 118 before transmitting the user graphical representation A to client device B. A similar process applies to the client device B and the user graphical representation B from user B. Both user graphical representations A and B may thus view each other in the virtual environment A and interact.

However, various other image processing combinations may be enabled through systems and methods of the current disclosure, as illustrated and described with respect to FIGS. 6A-7C.

In some embodiments, processing and rendering comprised in the generation, updating and insertion of the user graphical representation 120 and combination with the virtual environment is performed by the at least one processor 104 of the one or more cloud server computers 102 upon the client device 118 sending the unprocessed live data feed 114 of the user 116. The one or more cloud server computers 102 thus receive the unprocessed live data feed 114 of the user 116 from the client device 118 and then generate, process and render from the unprocessed live data feed, a user graphical representation 120 that is positioned within a three-dimensional coordinate of the virtual environment 110 before transmitting the cloud-rendered user graphical representation within the virtual environment to other client devices 118. For example, as viewed in FIG. 1, client device A may receive the live data feed 114 from the respective camera 112 and may then transmit the unprocessed user live data feed 114 to the at least one cloud server computer 102, which may generate, process and render the user graphical representation A and position the user graphical representation A in a three-dimensional coordinate of the virtual environment 118 before transmitting the user graphical representation A to client device B. A similar process applies to the client device B and the user graphical representation B from user B. Both user graphical representations A and B may thus view each other in the virtual environment A and interact.

In some embodiments, the virtual environment platform 108 is configured to enable embedding a clickable link redirecting to the virtual environment into one or more third party sources comprising third-party websites, applications or video-games. The link may be, for example, an HTML link. The linked virtual environment 110 may be associated to the content of the website where the link is embedded. For example, the link may be embedded on a car dealer or manufacturer website, wherein the clickable link redirects to a virtual environment 110 representing a car dealer showroom that a user may visit through the user graphical representation 120.

In some embodiments, the user graphical representation 120 comprises a clickable link embedded thereon, such as a link directing to third-party sources comprising profile information about the corresponding user. For example, the clickable link may be an HTML link embedded on the source code of the user graphical representation 120 that may grant access to a social media (e.g., a professional social media website, such as LinkedIn™) providing further information about the corresponding user. In some embodiments, if allowed by the user, at least some of the basic information of the user may be displayed when other users click on or hover a cursor on the corresponding user graphical representation, which may be done by accessing and retrieving user data from a database or from the third-party source.

In some embodiments, the user graphical representation is a user 3D virtual cutout constructed from a user-uploaded or third-party-source (e.g., from a social media website) photo, or a user real-time 3D virtual cutout comprising the real-time video stream of the user 116 with a removed background, or a video with removed background, or a video without removed background. In further embodiments, the client device 118 generates the user graphical representation 120 by processing and analyzing the live camera feed 114 of the user 116, generating animation data that is sent to other peer client devices 118 via a peer-to-peer (P2P) system architecture or a hybrid system architecture, as will be further described with reference to FIG. 3. The receiving peer client devices 118 use the animation data to locally construct and update the user graphical representation.

A user 3D virtual cutout may include a virtual replica of a user constructed from a user-uploaded or third-party-source 2D photo. In an embodiment, the user 3D virtual cutout is created via a 3D virtual reconstruction process through machine vision techniques using the user-uploaded or third-party-source 2D photo as input data, generating a 3D mesh or 3D point cloud of the user with removed background. In one embodiment, the user 3D virtual cutout may have static facial expressions. In another embodiment, the user 3D virtual cutout may comprise facial expressions updated through the camera feed. In yet another embodiment, the user 3D virtual cutout may comprise expressions that may be changed through buttons on the user graphical interface, such as buttons that permit the user 3D virtual cutout to smile, frown, be serious, and the like. In yet a further embodiment, the user 3D virtual cutout uses combinations of aforementioned techniques to display facial expressions. After generating the user 3D virtual cutout, the status and/or facial expressions of the user 3D virtual cutout may be continuously updated by, e.g., processing the camera feed from the user. However, if the camera is not turned on, the user 3D virtual cutout may still be visible to other users with an unavailable status and static facial expressions. For example, the user may be currently focused on a task and may not want to be disturbed (e.g., having a "do not disturb" or "busy" status), therefore having his or her camera off. At this moment, the user 3D virtual cutout may simply be sitting on his or her desk and may either be still or may perform pre-configured moves such as typing. However, when the user camera is again turned on, the user 3D virtual cutout may be again updated in real-time with respect to the user facial expressions and/or movements. Standard 3D face model reconstruction (e.g., 3D face fitting and texture fusion) techniques for the creation of the user 3D virtual cutout may be used so that the resulting user graphical representation is clearly recognizable as being the user.

A user real-time 3D virtual cutout may include a virtual replica of a user based on the real-time 2D or 3D live video stream data feed obtained from the camera and after having the user background removed. In an embodiment, the user real-time 3D virtual cutout is created via a 3D virtual reconstruction process through machine vision techniques using the user live data feed as input data by generating a 3D mesh or 3D point cloud of the user with removed background. For example, the user real-time 3D virtual cutout may be generated from 2D video from a camera (e.g., a webcam) that may be processed to create a holographic 3D mesh or 3D point cloud. In another example, the user real-time 3D virtual cutout may be generated from 3D video from depth cameras (e.g., LIDARs or any depth camera) that may be processed to create a holographic 3D mesh or 3D point cloud. Thus, the user real-time 3D virtual cutout represents the user graphically in three dimensions and in real time.

A video with removed background may include a video streamed to a client device, wherein a background removal process has been performed so that only the user may be visible and then displayed utilizing a polygonal structure on the receiving client device. Video without removed background may include a video streamed to a client device, wherein the video is faithfully representing the camera capture, so that the user and his or her background are visible and then displayed utilizing a polygonal structure on the receiving client device. The polygonal structure can be a quad structure or more complex 3D structures used as a virtual frame to support the video.

A video without removed background may include a video streamed to a client device, wherein the video is faithfully representing the camera capture, so that the user and his or her background are visible and then displayed utilizing a polygonal structure on the receiving client device. The polygonal structure can be a quad structure or more complex 3D structures used as a virtual frame to support the video.

In some embodiments, the data used as input data comprised in the live data feed and/or user-uploaded or third-party-source 2D photo comprises 2D or 3D image data, 3D geometries, video data, media data, audio data, textual data, haptic data, time data, 3D entities, 3D dynamic objects, textual data, time data, metadata, priority data, security data, positional data, lighting data, depth data, and infrared data, amongst others.

In some embodiments, the background removal process required to enable the user real-time 3D virtual cutout is performed through image segmentation and usage of deep neural networks, which may be enabled through implementation of instructions by the one or more processors of the client device 118 or the at least one cloud server computer 102. Image segmentation is a process of partitioning a digital image into multiple objects, which may help to locate objects and boundaries that can separate the foreground (e.g., the user real-time 3D virtual cutout) obtained from the live data feed 114 of the user 116 from the background. A sample image segmentation that may be used in embodiments of the current disclosure may comprise the Watershed transformation algorithm available, for example, from OpenCV.

A suitable process of image segmentation that may be used for background removal in the current disclosure uses artificial intelligence (AI) techniques such as computer vision to enable such a background removal, and may comprise instance segmentation and/or semantic segmentation. Instance segmentation gives each individual instance of one or more multiple object classes a distinct label. In some examples, instance segmentation is performed through Mask R-CNN, which detects objects in an image, such as from the user live data feed 114 while simultaneously generating a high-quality segmentation mask for each instance, in addition to adding a branch for predicting an object mask in parallel with the existing branch for bounding box recognition. The segmented masks created for the user and for the background are then extracted and the background may be removed. Semantic segmentation uses deep learning or deep neural networks (DNN) techniques, enabling an automated background removal process. Semantic segmentation partitions images into semantically meaningful parts by giving each pixel a class label from one or more categories, such as by color, texture and smoothness, depending on predefined rules. In some examples, semantic segmentation may utilize fully convolutional networks (FCN) trained end-to-end, pixels-to-pixels on semantic segmentation, as disclosed in the document "Fully Convolutional Networks for Semantic Segmentation," by Evan Shelhamer, Jonathan Long, and Trevor Darrell, in *IEEE Transactions on Pattern Analysis and Machine Intelligence*, Vol. 39, No. 4 (April 2017), which is incorporated herein by reference. After the aforementioned background removal process, a point cloud within the face and body boundary of the user may remain, which the one or more processors of the client device 118 or the at least one cloud server computer 102 may process to generate a 3D mesh or 3D point cloud of the user that may be used in the construction of the user real-time 3D virtual cutout. The user real-time 3D virtual cutout is then updated from the live data feed 114 from camera 112.

In some embodiments, updating of the user graphical representation 120 comprises applying machine vision algorithms by the client device 118 or the at least one cloud server computer 102 on the generated user graphical representation 120 for recognizing facial expressions of the user 116 and graphically simulating the facial expressions on the user graphical representation 120 within the virtual environment 110. In general, such a facial expression recognition may be performed through principles of affective computing, which deals with the recognition, interpretation, processing and simulation of human affects. A review of conventional Facial Expression Recognition (FER) techniques is provided in "Facial Expression Recognition Using Computer Vision: A Systematic Review," by Daniel Canedo and António J. R. Neves, in *Applied Sciences*, Vol. 9, No. 21 (2019) which is incorporated herein by reference.

Conventional FER techniques include the steps of image acquisition, pre-processing, feature extraction and classification or regression. In some embodiments of the current disclosure, image acquisition is performed by feeding the one or more processors with image data from the camera feed 114. The step of pre-processing may be necessary to provide the feature classifier with the most relevant data, and usually comprises face detection techniques, which are able to create bounding boxes delimiting the target user face, which are desired regions of interest (ROI). The ROIs are pre-processed through intensity normalization for illumination changes, noise filters for image smoothing, data augmentation to increase the training data, rotation correction for the rotated faces, image resizing for different ROI sizes, and image cropping for a better background filtering, amongst others. After the pre-processing, the algorithm retrieves the relevant features from the pre-processed ROIs, comprising Actions Units (AUs), motion of certain facial landmarks, distance between facial landmarks, facial texture, gradient features, and the like. These features may then be fed into the classifier, which may be, for example, a Support Machine Vector (SVMs) or a Convolutional Neural Network (CNNs). After training the classifier, the emotions may be detected in the user in real-time and constructed in the user graphical representation 120 by, for example, concatenating all facial feature relations.

In some embodiments, the user graphical representation is associated with a top viewing perspective, or a third-person viewing perspective, or a first-person viewing perspective, or a self-viewing perspective. In an embodiment, the viewing perspective of the user 116 when accessing the virtual environment through the user graphical representation is a top viewing perspective, or a third-person viewing perspective, or a first-person viewing perspective, or a self-viewing perspective, or a broadcasting camera perspective. A self-viewing perspective may include the user graphical representation as seen by another user graphical representation, and, optionally, the virtual background of the user graphical representation.

In some embodiments, the viewing perspective is updated as a user 116 manually navigates through the virtual environment 110 via the graphical user interface.

In yet further embodiments, the viewing perspective is established and updated automatically by using a virtual camera, wherein the viewing perspective of the live data feed is associated with the viewing perspective of the user graphical representation and the virtual camera, and wherein the virtual camera is updated automatically by tracking and analyzing user eye-and-head-tilting data, or head-rotation data, or a combination thereof. In an embodiment, the viewing perspective is established and updated automatically by using one or more virtual cameras that are placed virtually and aligned in front of the user graphical representation 120, e.g., in front of the video with removed background, or video without removed background, or the user 3D virtual cutout, or user real-time 3D virtual cutout. In one embodiment, the one or more virtual cameras may point outward from eye level. In another embodiment, two virtual cameras, one per eye, may point outward from two-eye level. In yet another embodiment, the one or more virtual cameras may point outward from the center of the head-position of the user graphical representation. The viewing perspective of the user 116 captured by the camera 112 is associated to the viewing perspective of the user graphical representation 120 and the associated virtual camera(s) using computer vision, accordingly steering the virtual camera(s).

The virtual camera provides a virtual representation of the viewing perspective of the user graphical representation 120 as associated to the viewing perspective of the user 116, enabling the user 116 to view in one of many viewing perspectives the area of the virtual environment 110 that the user graphical representation 120 may be looking at. The virtual camera is updated automatically by tracking and analyzing user eye-and-head-tilting data, or head-rotation data, or a combination thereof. The virtual camera location may also be manually changed by the user 116 depending on the viewing perspective selected by the user 116.

The self-viewing perspective is a viewing perspective of the user graphical representation 120 as seen by another user graphical representation 120 (e.g., as in a "selfie mode" of a phone camera) with the removed background. The self-viewing perspective may, alternatively, comprises the virtual background of the user graphical representation 120 for the understanding of the perception of the user 116 as seen by the other participants. The self-viewing perspective, when including the virtual background of the user graphical representation, can be set as an area around the user graphical representation that may be captured by the virtual camera, may result in a circular, square, rectangular, or any other suitable shape for the framing of the self-viewing perspective. For example, in a scenario where a user graphical representation 120 is virtually located in a house where, behind the user, there may be a window from where trees may be seen, the self-viewing perspective display the user graphical representation and, alternatively, the background comprising the window and trees.

In yet further embodiments, the tracking and analysis of user eye and head-tilting data, or head-rotation data, or a combination thereof, comprises capturing and analyzing a viewing position and orientation captured by the at least one camera 112 using computer vision, accordingly steering the virtual camera in the virtual environment 110. For example, such a steering may comprise receiving and processing, through computer vision methods, eye and head-tilting data captured by the at least one camera; extracting a viewing position and orientation from the eye and head-tilting data; identifying one or more coordinates of the virtual environment comprised within the position and orientation from the eye-tilting data; and steering the virtual camera based on the identified coordinates.

In some embodiments, the instructions in memory 106 of the at least one cloud server computer 102 further enable performing data analytics of user activity within the at least one virtual environment 110. The data analytics may be used on interactions including engaging in conversations with other users, interactions with objects within the virtual environment 110, purchases, downloads, engagement with content, and the like. The data analytics may utilize a plurality of known machine learning techniques for collecting and analyzing the data from the interactions in order to perform recommendations, optimizations, predictions and automations. For example, the data analytics may be used for marketing purposes.

In some embodiments, the at least one processor 104 of the one or more cloud server computers 102 is further configured to enable trading and monetizing of content added in the at least one virtual environment 110. The at least one cloud server computer 102 may communicatively connect to application and object libraries where users may find, select and insert content in the at least one virtual environment through suitable application programming interfaces (APIs). The one or more cloud server computers 102 may further connect to one or more payment gateways enabling performing corresponding transactions. Content may comprise, for example, interactive applications or static or interactive 3D assets, animations or 2D textures, and the like.

Figure 2A:
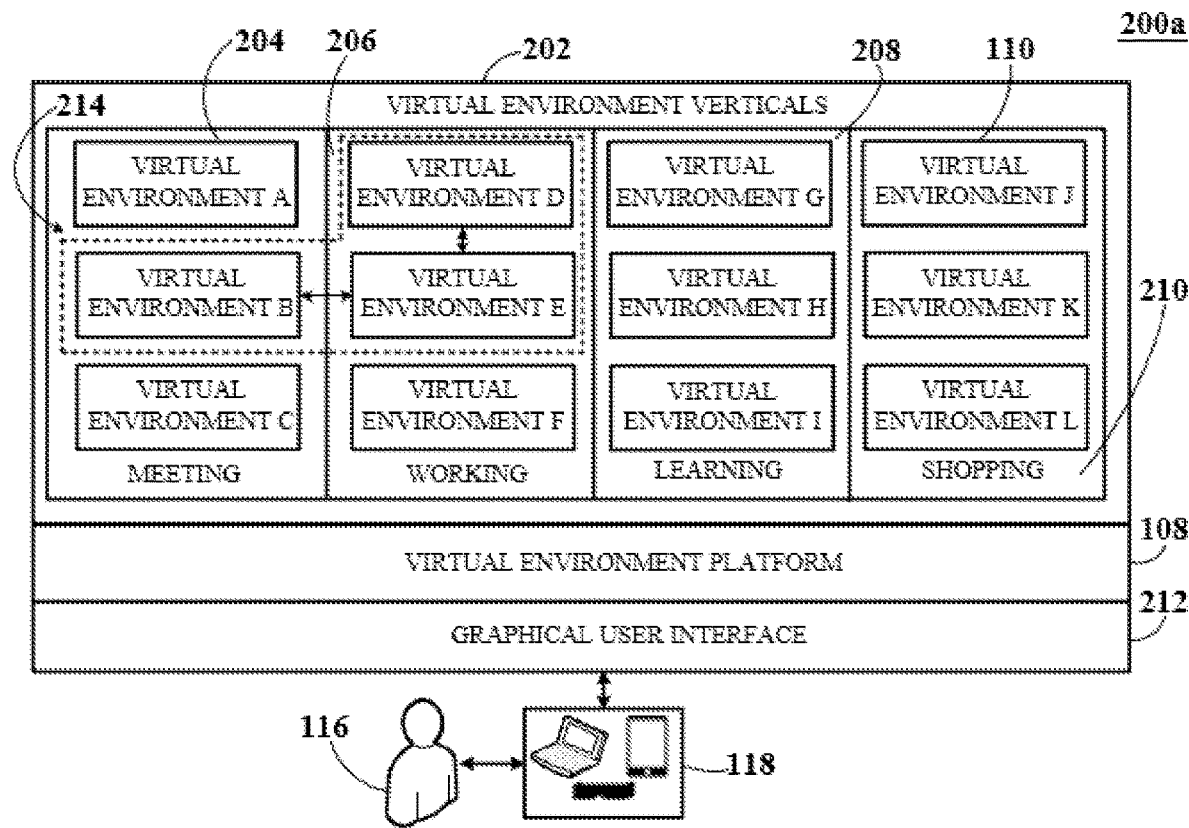
FIGS. 2A-2B depicts schematic representations of deployments of the system enabling interactions, including social interactions in virtual environments comprising a plurality of verticals of a virtual environment platform.
Figure 2B:
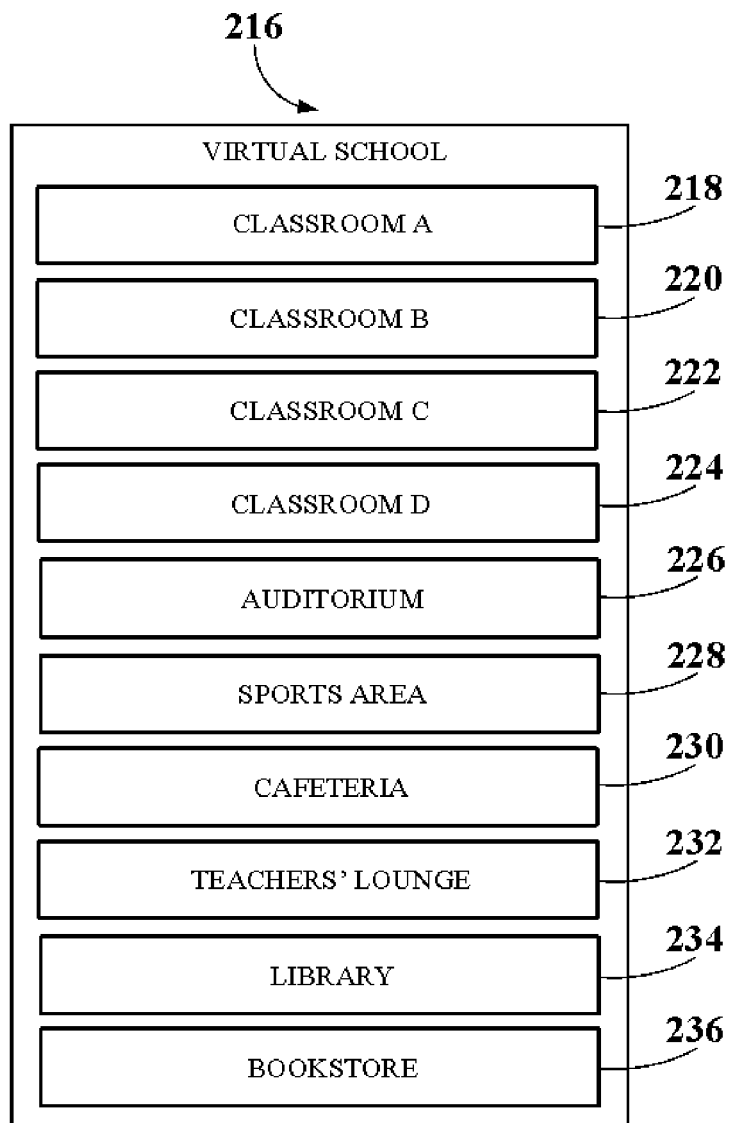

FIGS. 2A-2B depicts schematic representations of deployments 200a and 200b of a system enabling interactions in virtual environments comprising a plurality of verticals of a virtual environment platform.

FIG. 2A depicts a schematic representation of a deployment 200a of a system enabling interactions in virtual environments comprising a plurality of verticals 202 of a virtual environment platform 108, according to an embodiment. Some elements of FIG. 2A may refer to the same or similar elements of FIG. 1, and therefore may utilize the same reference numbers.

The verticals 202 are associated with a contextual theme of the virtual environment, comprising, for example, contextual themes related to usage in meetings 204 as, e.g., a virtual conference room, working 206 as, e.g., virtual office space, learning 208 as, e.g., a virtual classroom, and shopping 210 as, e.g., a virtual shop. Other verticals not represented in FIG. 2A may comprise, for example, services such as in banking, booking (e.g., hotels, tour agencies, or restaurants), and government agency services (e.g., inquiries for opening a new company for a fee); and entertainment (e.g., karaokes, event halls or arenas, theaters, nightclubs, sports fields, museums, cruise ships, etc.) amongst others.

Each of the virtual environment verticals 202 may comprise a plurality of available virtual environments 110 (e.g., virtual environments A-L), each with one or more available arrangements and visual appearance associated to the context of the corresponding vertical 202. For example, a virtual environment A of the meeting 204 vertical 202 may comprise a conference desk with seats, a whiteboard, and a projector. Each of the virtual environments 110 may be provided corresponding resources (e.g., memory, network and computing power) by the at least one cloud server computer. The verticals 202 may be available from the virtual environment platform 108, which may be accessed by one or more users 116 through a graphical user interface 212 via a client device 118. The graphical user interface 212 may be comprised in a downloadable client application or a web browser application, providing the application data and instructions required to execute the selected virtual environment 110 and therein enable a plurality of interactions. Furthermore, each of the virtual environments 110 may include one or more human or artificial intelligence (AI) hosts or assistants that may assist users within the virtual environment by providing required data and/or services through their corresponding user graphical representation. For example, a human or AI bank service clerk may assist a user of a virtual bank by providing required information in the form of presentations, forms, lists, etc., as required by the user.

In some embodiments, each virtual environment 110 is a persistent virtual environment recording changes performed thereon comprising customizations, wherein the changes are stored in persistent memory storage of the at least one cloud server computer 102. For example, returning to the example of the virtual environment A, the arrangement of the seats around the desk, the colors of the walls, or even the size and capacity of the room may be modified to fit the needs or preferences of the users. The changes performed may be saved in persistent memory and be thereafter available during a subsequent session in the same virtual environment A. In some examples, enabling persistent storage of modifications in a virtual environment 110 may require payment of a subscription fee to a room host or owner (e.g., through the virtual environment platform 108 connecting to a payment gateway).

In other embodiments, the virtual environment 110 is a temporary virtual environment stored in temporary memory storage of the at least one cloud server computer 102. In these embodiments, changes performed on a virtual environment 110 may not be stored, and therefore may not be available on a future session. For example, the temporary virtual environment may be selected from the virtual environment platform 108 out of predefined available virtual environments from the different verticals 202. Changes such as decorations or modifications in the arrangement may or may not be enabled, but in the case where the changes are enabled, the changes may be lost after ending the session.

In some embodiments, a complex of virtual environments 110 within one or more verticals 202 may represent a virtual environment cluster 214. For example, some virtual environment clusters 214 may comprise hundreds or even thousands of virtual environments 110. For users, a virtual environment cluster 214 may look as a part of the same system, where the users may interact with each other or may seamlessly access other virtual environments within the same virtual environment cluster 214. For example, virtual environments D and E from the working virtual environment vertical 206 plus virtual environment B from the meeting virtual environment vertical 204 may form virtual environment cluster 214 representing a company. Users in this example may have two different working areas, for example, a game development room and a business development room, along with a meeting room for video conferences. Users from any of the game development room and business development room may meet at the meeting room and have a private virtual meeting while the rest of the staff may remain performing their current activities in their original working areas.

In other examples, a virtual environment cluster 214 may represent a theater or event facility wherein each virtual environment 110 represents an indoor or outdoor event area (e.g., an auditorium or event arena) where a live performance is being held by one or more performers through their corresponding user graphical representations. For example, an orchestra and/or singer may be holding a musical concert through a live recording of their performance via a camera and through their user graphical representations, e.g., through their user live 3D virtual cutout. The user graphical representation of each performer may be inserted into a corresponding three-dimensional coordinate of the stage from where they may perform. The audience may watch the performance from the auditorium through their corresponding user graphical representations, and may implement a plurality of interactions, such as virtually clapping, singing along the songs, virtually dancing, virtually jumping or cheering, etc.

In other examples, a virtual environment cluster 214 may represent a casino comprising a plurality of playing areas (e.g., a blackjack area, a poker area, a roulette area, and a slot machine area), a token purchasing area, and an event room. Machines in each of the playing areas may be configured as casino applications configured to provide a user experience related to each game. Casino operators may comprise corresponding user graphical representations 120 such s or user real-time 3D virtual cutouts. Casino operators represented by s may be real human operators or artificial intelligence programs assisting the users in the virtual casino. Each of the casino games may be coupled to a payment gateway from the casino company operating the virtual casino, enabling payments to and from users.

In other examples, a virtual environment cluster 214 may represent a shopping mall comprising a plurality of floors, each floor comprising a plurality of virtual environments, such as stores, showrooms, common areas, food courts, and the like. Each virtual room may be managed by corresponding virtual room administrators. For example, each store may be managed by corresponding store admins. Sales clerks may be available in each area as 3D live virtual avatars or user real-time 3D virtual cutouts, and may be real humans or AI assistants. In the current example, each virtual store and restaurant in the sample food court may be configured to enable online purchases and delivery of the goods to the user's address through corresponding payment gateways and delivery systems.

In another example, a virtual environment cluster 214 comprises a plurality of virtual party areas of a virtual nightclub where users may meet and socialize through their corresponding user graphical representations. For example, each virtual party area may comprise a different theme and associated music and/or decoration. Apart from speaking and texting, some other interactions in the virtual nightclub may comprise, for example, virtually dancing or drinking, sitting down at the different sitting areas (e.g., lounge or bar), etc. Further in this example, an indoor music concert may be held in the virtual night club. For instance, an electronic music concert may be played by a disk jockey (DJ) performing behind a virtual table on a stage, where the DJ may be represented by a 3D live virtual avatar or user real-time 3D virtual cutout. If the DJ is represented by the user real-time 3D virtual cutout, the real-time movements of the DJ playing the audio mixing console may be projected onto the real-time 3D virtual cutout from the live data feed obtained by a camera capturing images from the DJ at the DJ location (e.g., from the DJ's house or a recording studio). Furthermore, each member of the audience may also be represented by their own user graphical representations, where some of the users may be represented by 3D live virtual avatars and others by user real-time 3D virtual cutouts depending on the user preferences.

In other examples, a virtual environment cluster 214 may represent a virtual karaoke entertainment establishment comprising a plurality of private or public karaoke rooms. Each private karaoke room may comprise a virtual karaoke machine, virtual screen, stage, microphone, speakers, decoration, couches, tables, and drinks and/or food. User may select songs through the virtual karaoke machine, which may connect to a song database, triggering the system to play the song for users and to project the lyrics on the virtual screen for users to sing along through their user graphical representations. The public karaoke rooms may further comprise a human or AI DJ selecting songs for users, calling in users to the stage and muting or unmuting users as necessary to listen to the performance. Users may sing remotely from their client devices through a microphone.

In other examples, a virtual environment cluster 214 may represent a virtual cruise-ship comprising a plurality of areas, such as bedrooms, engine room, event rooms, bow, stern, port, starboard, bridge, and a plurality of decks. Some of the areas may have human or AI assistants attending users through corresponding user graphical representations, such as providing further information or services. If available, virtual environments or simple graphical representations external to the cruise ship may be available, such as required to portray the landscape of islands, towns or cities that may be visited when arriving at a specific destination. Users may thus experience, through their user graphical representations, traveling in open sea and discovering new places, all while being able to virtually interact with each other.

In other examples, a virtual environment cluster 214 may represent an e-sports stadium or gymnasium comprising a plurality of virtual environments representing sports fields, courts or rooms where users may play through suitable input/output devices (e.g., computer keyboards, game controllers, etc.) via their user graphical representations. Mechanics of each e-sports may depend on the sport to be played. The e-sports stadium or gymnasium may comprise common areas where users may select the sports area to access. Available sports schedules may also be available, notifying users which sports activities may be available at which times.

FIG. 2B represents a deployment 200*b* of a virtual school 216 combining a plurality of virtual environments from various verticals 202. The virtual school 216 comprises four classrooms (e.g., classrooms A-D 218-224), an auditorium 226, a sports area 228, a cafeteria 230, a teachers' lounge 232, a library 234 and a bookstore 236. Each of the virtual environments may comprise virtual objects, represented by corresponding graphical representations, associated to the corresponding environment.

For example, a virtual classroom (e.g., any of virtual classrooms A-D 218-224) may enable students to attend a lecture and may be configured to enable the students to participate in the class through various interactions (e.g., hand-raising, content-projecting, presenting, expressing a doubt or contribution orally or in through text, etc.) and may provide the teacher with special administrative rights (e.g. giving someone the floor, muting one or more students during the lecture, sharing content through a digital whiteboard, etc.). The auditorium may enable a speaker to give a speech or may host a plurality of events. The sports area 228 may be configured to enable students to play a plurality of e-sports through their corresponding user graphical representations. The cafeteria 230 may enable students to order food online and to socialize through the user graphical representations. The teachers' lounge 232 may be configured for teachers to meet and discuss agendas, progress of students, and the like through the corresponding teacher user graphical representations. The library 234 may enable students to a borrow e-books for their coursework or leisure reading. Finally, the bookstore 236 may be configured to enable students to purchase books (e.g., e-books or physical books) and/or other school material.

Figure 3:
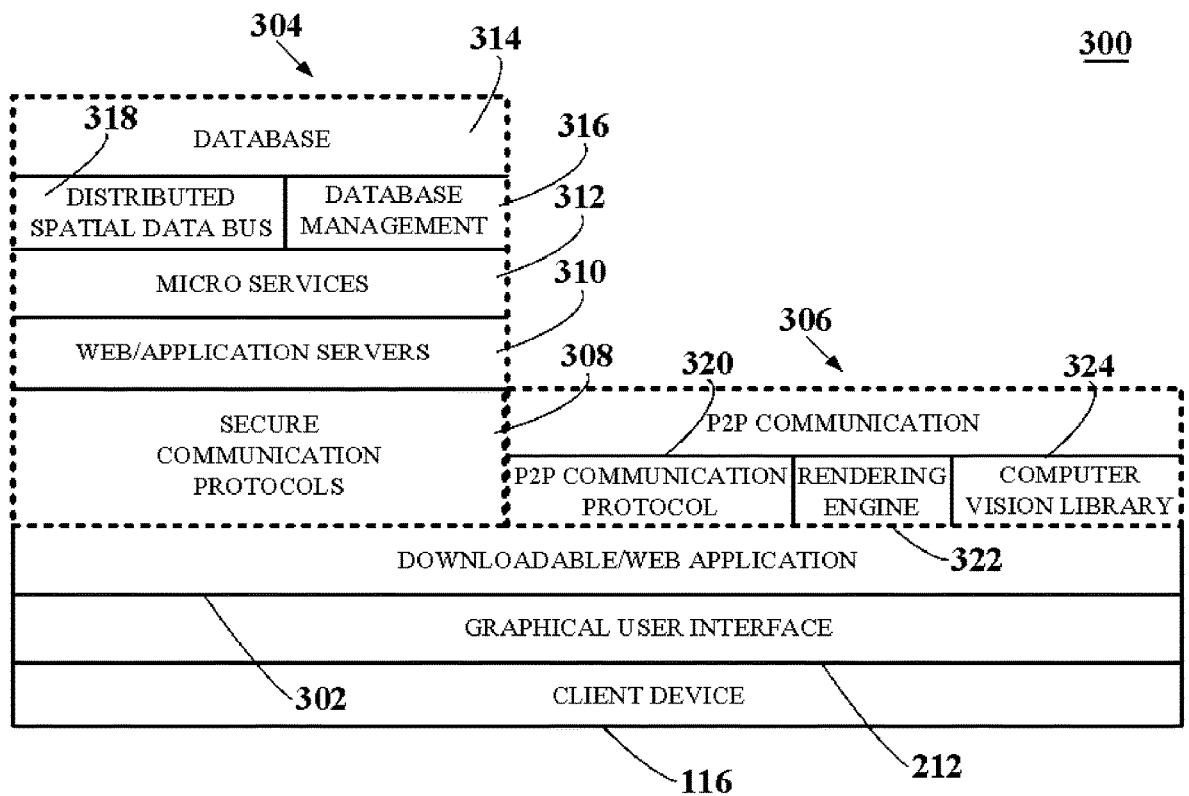
FIG. 3 depicts a schematic representation of a hybrid system architecture employed in a system enabling interactions in virtual environments, according to an embodiment.

FIG. 3 depicts a schematic representation of a sample hybrid system architecture 300 that may be employed in a system enabling interactions in virtual environments, according to an embodiment. The hybrid system architecture 300 is, in some embodiments, a hybrid model of communication for interacting with other peer clients (e.g., other attendees of a virtual meeting, classroom, etc.), comprising a client-server side 304 and a P2P side 306, each delimited in FIG. 3 by a dotted area. Using such a hybrid model of communication may enable rapid P2P communications between users reducing latency problems while providing web services, data and resources to each session, enabling a plurality of interactions between users and with content in the virtual environment. Some elements of FIG. 3 may refer to the same or similar elements of FIGS. 1-2A, and therefore may utilize the same reference numbers.

In various embodiments, the level and ratio of usage of the client-server side 304 with respect to the P2P side 306 depend on the amount of data to be processed, the latency permitted to sustain a smooth user experience, the desired quality of service (QOS), the services required, and the like. In one embodiment, the P2P side 306 is used for video and data processing, streaming and rendering. This mode of employing the hybrid system architecture 300 may be suitable, for example, when a low latency and low amounts of data need to be processed, and when in the presence of "heavy" clients, meaning that the client devices comprise sufficient computing power to perform such operations. In another embodiment, a combination of the client-server side 304 and P2P side 306 is employed, such as the P2P side 306 being used for video streaming and rendering while the client-server side 304 is used for data processing. This mode of employing the hybrid system architecture 300 may be suitable, for example, when there is a high amount of data to be processed or when other micro-services may be required. In yet further embodiments, the client-server side 304 may be used for video streaming along with data processing while the P2P side 306 is used for video rendering. This mode of employing the hybrid system architecture 300 may be suitable, for example, when there is an even higher amount of data to be processed and/or when only a thin client is available. In yet further embodiments, the client-server side 304 may be used for video streaming, rendering and data processing. This mode of employing the hybrid system architecture 300 may be suitable when a very thin client is available. The hybrid system architecture 300 may be configured for enabling alternating between the different modalities of usage of both the client-server side 304 and the P2P side 306 within the same session, as required.

In some embodiments, the at least one cloud server from the client-server side 304 may be an intermediary server, meaning that the server is used to facilitate and or optimize the exchange of data between client devices. In such embodiments, the at least one cloud server may manage, analyze, process and optimize incoming image and multimedia streams and manage, assess, and/or optimize the forwarding of the outbound streams as a router topology (for example but not limited to SFU (Selective Forwarding Units), SAMS (Spatially Analyzed Media Server), multimedia routers, and the like), or may use an image and media processing server topology (e.g., for tasks including but not limited to decoding, combining, improving, mixing, enhancing, augmenting, computing, manipulating, encoding) or a forwarding server topology (including but not limited to MCU, cloud media mixers, cloud 3D renderer, media server), or other server topologies.

In such embodiments, where the intermediary server is a SAMS, such media server manages, analyze and processes incoming data of sending each client device (e.g., meta-data, priority data, data classes, spatial structure data, three dimensional positional, orientation or locomotion information, image, media, scalable video codec based video, or a combination thereof), and in such analysis manages and/or optimizes the forwarding of the outbound data streams to each receiving client device. This may include modifying, upscaling or downscaling the media for temporal (e.g., varying frame rate), spatial (e.g., different image size), quality (e.g., different compression or encoding based qualities) and color (e.g., color resolution and range), and may be based on factors such as the specific receiving client device user's spatial, three dimensional orientation, distance and priority relationship to such incoming data achieving optimal bandwidths and computing resource utilizations for receiving one or more user client devices.

In some embodiments, the media, video and/or data processing tasks comprise one or more of encoding, transcoding, decoding spatial or 3D analysis and processing comprising one or more of image filtering, computer vision processing, image sharpening, background improvements, background removal, foreground blurring, eye covering, pixilation of faces, voice-distortion, image uprezzing, image cleansing, bone structure analysis, face or head counting, object recognition, marker or QR code-tracking, eye tracking, feature analysis, 3D mesh or volume generation, feature tracking, facial recognition, SLAM tracking and facial expression recognition or other modular plugins in form of micro-services running on such media router or servers.

The client-server side 304 employs secure communication protocols 308 to enable a secure end-to-end communication between the client device 118 and web/application servers 310 over a network. Sample suitable secure communication protocols 306 may comprise, for example, Datagram Transport Layer Security (DTLS) which is a secure user datagram protocol (UDP) in itself, Secure Realtime Transport Protocol (SRTP), Hypertext Transfer Protocol Secure (https://) and WebSocket Secure (wss://), which are compatible with each other and may provide full duplex authenticated application access, protection of privacy and integrity of exchanged data in transit. Suitable web/application servers 310 may comprise, for example, Jetty web application servers, which are Java HTTP web servers and Java Servlet containers, enabling machine to machine communications and a proper deployment of web application services.

Although the web/application servers 310 are depicted as a single element in FIG. 3, those skilled in the art may appreciate that the web servers and application servers may be separate elements. For example, the web servers may be configured to receive client requests through the secure communication protocols 306 and route the requests to the application servers. The web/application servers 310 may thus receive the client requests using the secure communication protocols 306 and process the requests, which may comprise requesting one or more micro-services 312 (e.g., Java-based micro-services) and/or looking data up from a database 314 using a corresponding database management system 316. The application/web servers 310 may provide session management and numerous other services such as 3D content and application logic as well as state persistence of sessions (e.g., for persistently storing shared documents, synchronizing interactions and changes in the virtual environment, or persisting the visual state and modifications of a virtual environment). A suitable database management system 316 may be, for example, an object-relational mapping (ORM) database management system, which may be appropriate for database management using open-source and commercial (e.g., proprietary) services given ORM's capability for converting data between incompatible type systems using object-oriented programming languages. In further embodiments, a distributed spatial data bus 318 may further be utilized as a distributed message and resource distribution platform between micro-services and client devices by using a publish-subscribe model.

The P2P side 306 may use a suitable P2P communication protocol 320 enabling real-time communication between peer client devices 118 in the virtual environment through suitable application programming interfaces (APIs), enabling real-time interactions and synchronizations thereof, allowing for a multi-user collaborative environment. For example, through the P2P side 306, contributions of one or more users may be directly transmitted to other users, which may observe, in real-time, the changes performed. An example of a suitable P2P communication protocol 320 may be a Web Real-Time Communication (WebRTC) communication protocol, which is collection of standards, protocols, and JavaScript APIs, which, in combination, enable P2P audio, video, and data sharing between peer client devices 118. Client devices 118 in the P2P side 306 may perform real-time 3D rendering of the live session employing one or more rendering engines 322. An example of a suitable rendering engine 322 may be 3d engines based on WebGL, which is a JavaScript API for rendering 2D and 3D graphics within any compatible web browser without the use of plug-ins, allowing accelerated usage of physics and image processing and effects by one or more processors of the client device 118 (e.g., one or more graphic processing units (GPUs)). Furthermore, client devices 118 in the P2P side 306 may perform image and video-processing and machine-learning computer vision techniques through one or more suitable computer vision libraries 324. In one embodiment, the image and video-processing performed by the client devices in the P2P side 306 comprises the background removal process used in the creation of the user graphical representation previous to the insertion of the user graphical representation into a virtual environment, which may be performed either in real-time or almost real-time on received media streams or in non-real-time on, for example, a photo. An example of a suitable computer vision library 324 may be OpenCV, which is a library of programming functions configured mainly for real-time computer vision tasks.

Figure 4:
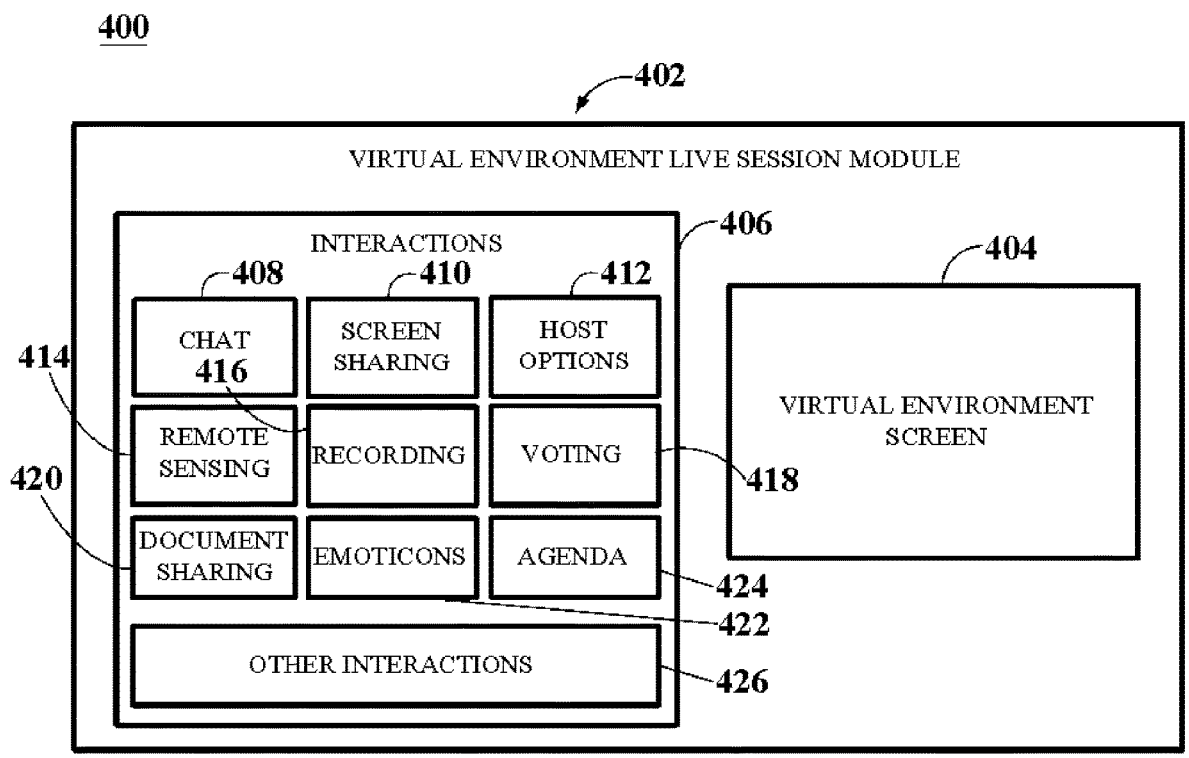
FIG. 4 depicts a schematic representation of a graphical user interface whereby users may interact in the virtual environment, according to an embodiment.

FIG. 4 depicts a schematic representation of a graphical user interface 400 of a virtual environment live session module 402 whereby users may interact in the virtual environment, according to an embodiment.

Before a user may have access to the graphical user interface 400 of the virtual environment live session module 402, the user may first receive an invitation from a peer client device to engage in a conversation with a peer user, which may open up a P2P communication channel between the user client devices when the processing and rendering is performed by the client device, or may alternatively open up an indirect communication channel through the cloud server computer when processing and rendering is performed by the at least one cloud server computer. Furthermore, a transition from a user 3D virtual cutout to a user real-time 3D virtual cutout, or video with removed background, or video without removed background may take place, as illustrated later in the description with reference to FIG. 5.

The virtual environment live session module 402 may comprise a virtual environment screen 404 including a graphical user interface showing the selected virtual environment, which may include an arrangement of the virtual environment associated with the context of a selected vertical of the virtual environment, and corresponding virtual objects, applications, other user graphical representations, and the like. The graphical user interface 400 of the virtual environment live session module 402 may enable and display a plurality of interactions 406 configured for users to engage with each other, e.g., through their user real-time 3D virtual cutouts. The virtual environment live session module 402 may comprise one or more data models associated with the corresponding tasks enabling each interaction 406, plus the computer instructions required to implement said tasks. Each interaction 406 may be represented in different ways; in the example shown in FIG. 4, individual interactions 406 are each represented as a button on the graphical user interface 400 from the virtual environment live session module 402, wherein clicking on each interaction button may request corresponding services to perform a task associated to the interaction 406. The virtual environment live session module 402 may, for example, be enabled through the hybrid system architecture 300 disclosed with reference to FIG. 3.

The interactions 406 may comprise, for example, chatting 408, screen sharing 410, host options 412, remote sensing 414, recording 416, voting 418, document sharing 420, emoticon sending 422, agenda sharing and editing 424, or other interactions 426. The other interactions 426 may comprise, for example virtually hugging, hand-raising, hand-shaking, walking, content adding, meeting-summary preparation, object moving, projecting, laser-pointing, game-playing, purchasing and other social interactions facilitating exchange, competition, cooperation, resolution of conflict between users. The various interactions 406 are described in more detail below.

Chatting 408 may open up a chat window enabling sending and receiving textual comments and on-the-fly resources.

Screen sharing 410 may enable to share in real-time the screen of a user to any other participants.

Host options 412 are configured to provide further options to a conversation host, such as muting one or more users, inviting or removing one or more users, ending the conversation, and the like.

Remote sensing 414 enables viewing the current status of a user, such as being away, busy, available, offline, in a conference call, or in a meeting. The user status may be updated manually through the graphical user interface or automatically through machine vision algorithms based on data obtained from the camera feed.

Recording 416 enables recording audio and/or video from the conversation.

Voting 418 enables to provide a vote for one or more proposals posted by any other participant. Through voting 418, a voting session can be initiated at any time by the host or other participant with such a permission. The subject and choices may be displayed for each participant. Depending on the configuration of the voting 418 interaction, at the end of a timeout period or at the end of everyone's response the results may be shown to all the attendees.

Document sharing 420 enables to share documents in any suitable format with other participants. These documents may also be persisted permanently by storing them in persistent memory of the one or more cloud server computers and may be associated with the virtual environment where the virtual communication takes place.

Emoticon sending 422 enables sending emoticons to other participants.

Agenda sharing and editing 424 enables sharing and editing an agenda that may have been prepared by any of the participants. In some embodiments, a check-list of agenda items may be configured by the host ahead of the meeting. The agenda may be brought to the foreground at any time by the host or other participants with such a permission. Through the agenda-editing option, items can be checked off as a consensus is reached or may be put off.

The other interactions 426 provide a non-exhaustive list of possible interactions that may be provided in the virtual environment depending on the virtual environment vertical. Hand-raising enables raising the hand during a virtual communication or meeting so that the host or other participants with such an entitlement may enable the user to speak. Walking enables moving around the virtual environment through the user real-time 3D virtual cutout. Content adding enables users to add interactive applications or static or interactive 3D assets, animations or 2D textures to the virtual environment. Meeting-summary preparation enables an automatic preparation of outcomes of a virtual meeting and distributing such outcomes to participants at the end of the session. Object moving enables moving objects around within the virtual environment. Projecting enables projecting content to a screen or wall available in the virtual environment from an attendee's screen. Laser-pointing enables pointing a laser in order to highlight desired content on a presentation. Game-playing enables playing one or more games or other types of applications that may be shared during a live session. Purchasing enables making in-session purchases of content. Other interactions not herein mentioned may also be configured depending on the specific use of the virtual environment platform.

In some embodiments, the system may further enable creating ad hoc virtual communications, which may comprise creating an ad hoc voice communication channel between user graphical representations without needing to change the current viewing perspective or location in the virtual environment. For example, a user graphical representation may approach another user graphical representation and engage in an ad hoc voice conversation at the place within the virtual environment where both user graphical representations area located. Such communication would be enabled by, for example, taking into account the distance, position and orientation between the user graphical representations, and/or their current availability status (e.g., being available or unavailable) or status configuration for such ad hoc communications, or combinations thereof. The approaching user graphical representation would, in this example, see visual feedback on the other user graphical representation, signaling that an ad hoc communication is possible and hence setting the onset of a conversation between both user graphical representations, wherein the approaching user may speak and the other user may hear and respond back. In another example, a user graphical representation may approach another user graphical representation, click on the user graphical representation, send a conversation invitation, and after approval by the invitee, engage in an ad hoc voice conversation at the place within the virtual environment where both user graphical representations area located. Other users may view the interactions, expressions, hand movements, etc., between the user graphical representations with or without being able to listen to the conversation—as per privacy settings between the two user graphical representations. Any of the aforementioned interactions of 406 or other interactions 426 may be performed also directly within the virtual environment screen 404.

Figure 5:
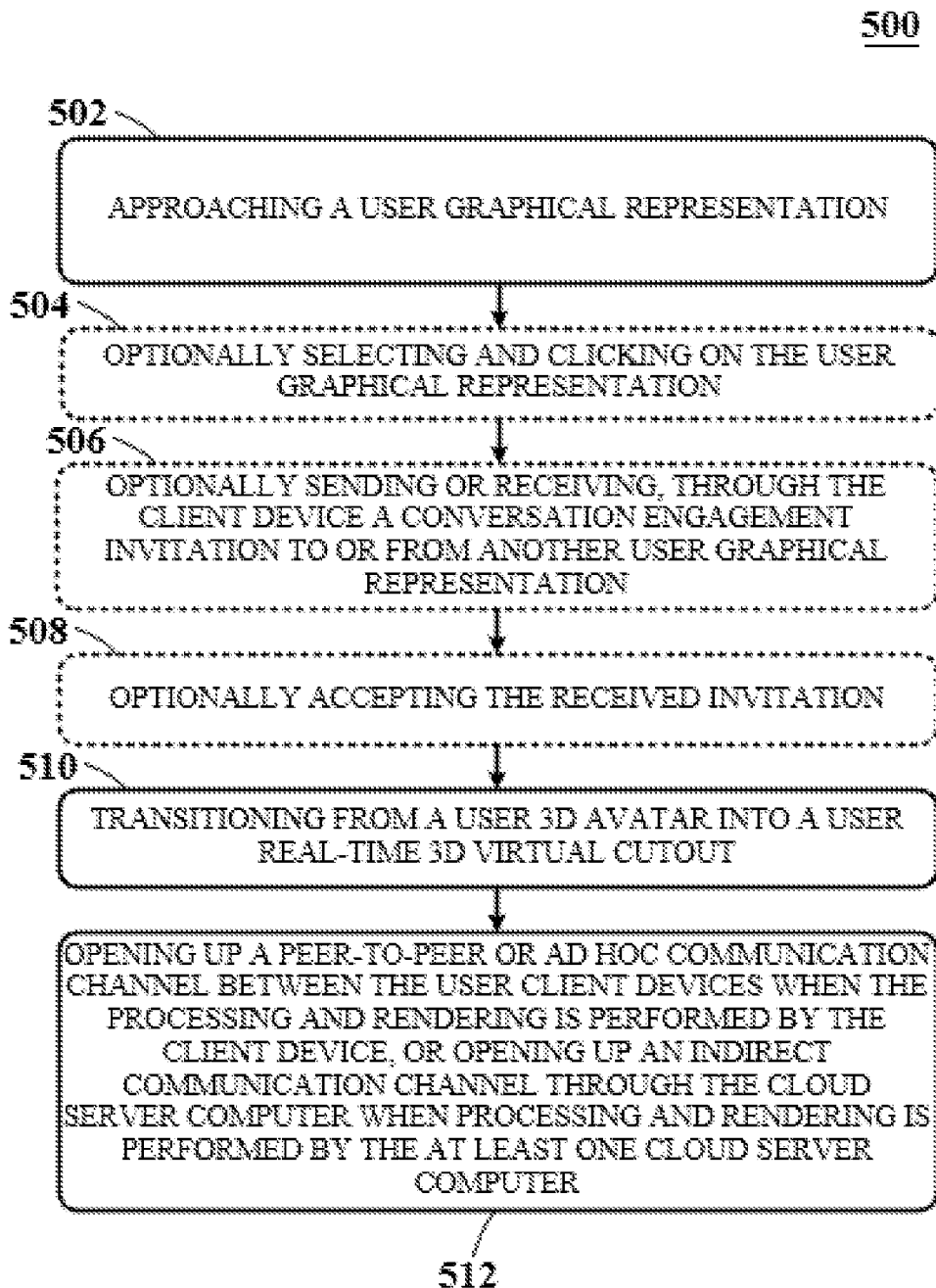
FIG. 5 depicts a block diagram of method to transition from user 3D virtual cutout into a user real-time 3D virtual cutout, or video with removed background, or video without removed background, according to an embodiment.

FIG. 5 depicts a method 500 enabling a transition from one type of user graphical representation to another, e.g., from a user 3D virtual cutout to a user real-time 3D virtual cutout, or to a video with removed background, or video without removed background, according to an embodiment.

The transition may be enabled when a user engages in conversation with other user graphical representations. For example, a user may be currently sitting in an office chair and working with a computer in a virtual office. The user's current graphical representation may be that of a user 3D virtual cutout. At that moment, the camera may not be turned on because no live data feed may be needed from the user. However, if the user decides to turn on the camera, the user 3D virtual cutout may comprise facial expressions provided through facial analytics of the user captured from the live data feed of the user, as explained in more detail herein.

As a user engages in conversation with another user graphical representation and initiates a live session, if the user camera was not activated, the camera may then be activated and may initiate live data feed capture that may provide a live stream of the user, transitioning the user 3D virtual cutout into a user real-time 3D virtual cutout or video with removed background, or video without removed background. Further as described in FIG. 1, the live stream of the user real-time 3D virtual cutout 504 may be client-or-server processed and rendered, or may be sent in a P2P system architecture or hybrid system architecture to other peer client devices for their own processing and rendering in real-time (e.g., through a hybrid system architecture 300 described with reference to FIG. 3.)

The method 500 of FIG. 5 may begin in step 502 by approaching a user graphical representation. Then, in step 504, the method 500 may continue by selecting and clicking on the user graphical representation. In step 506, the method 500 may continue by sending or receiving, through the client device a conversation engagement invitation to or from another user graphical representation. In step 508, the method 500 continues by accepting, by the corresponding client device, the received invitation. Then, the method 500 continues in step 510 by transitioning from a user 3D virtual cutout into a user real-time 3D virtual cutout or a video with removed background, or a video without removed background. Finally, in step 512, the method 500 ends by opening up a P2P communication channel between the user client devices when the processing and rendering is performed by the client device, or opening up an indirect communication channel through the cloud server computer when processing and rendering is performed by the at least one cloud server computer. In some embodiments, the conversation comprises sending and receiving real-time audio and video displayed from the user real-time 3D virtual cutout of participants.

Figure 6A:
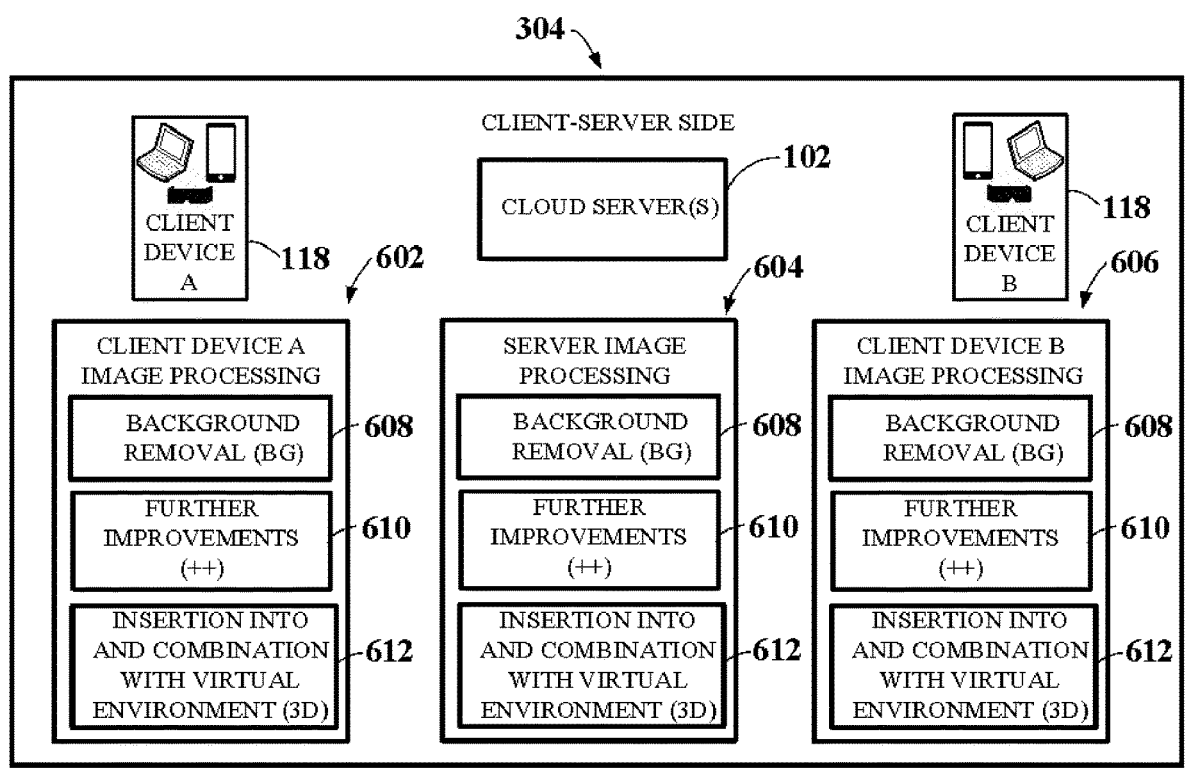
FIGS. 6A-6C depict schematic representations of a plurality of image processing combinations performed in a client-server side by corresponding client devices and cloud servers.
Figure 6B:
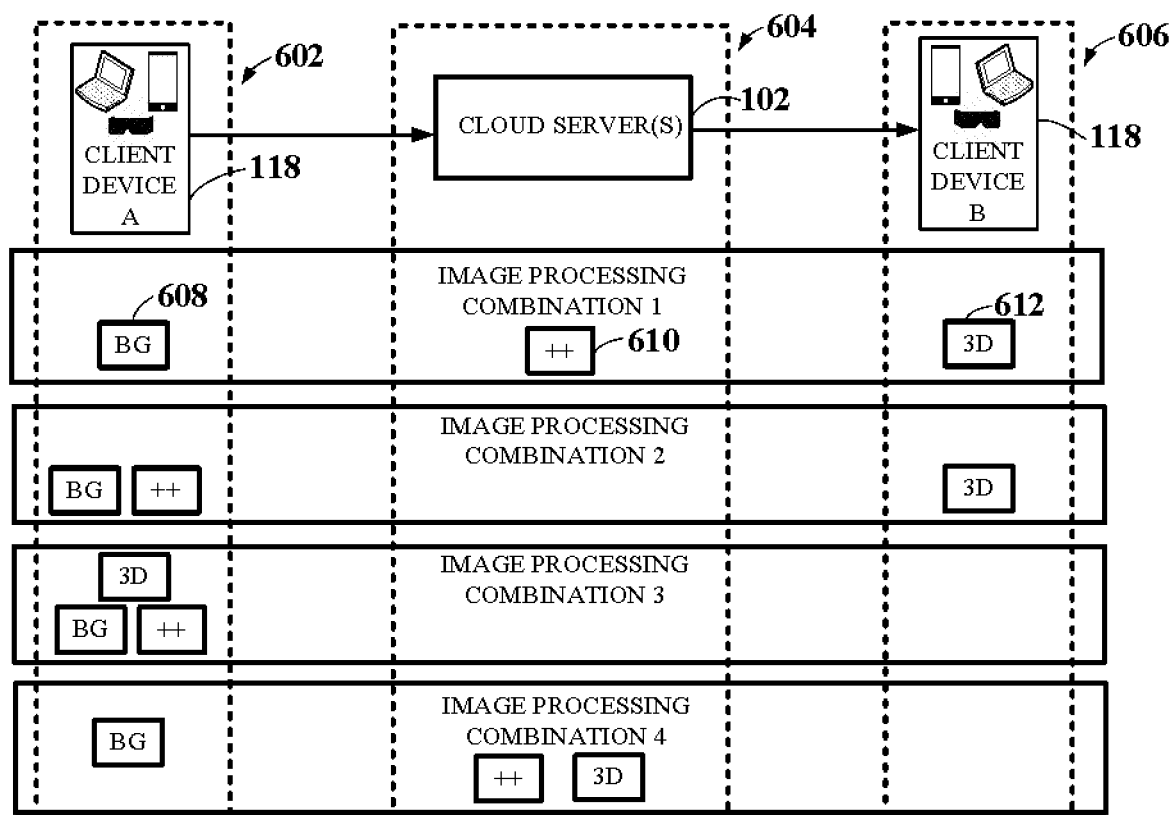
Figure 6C:
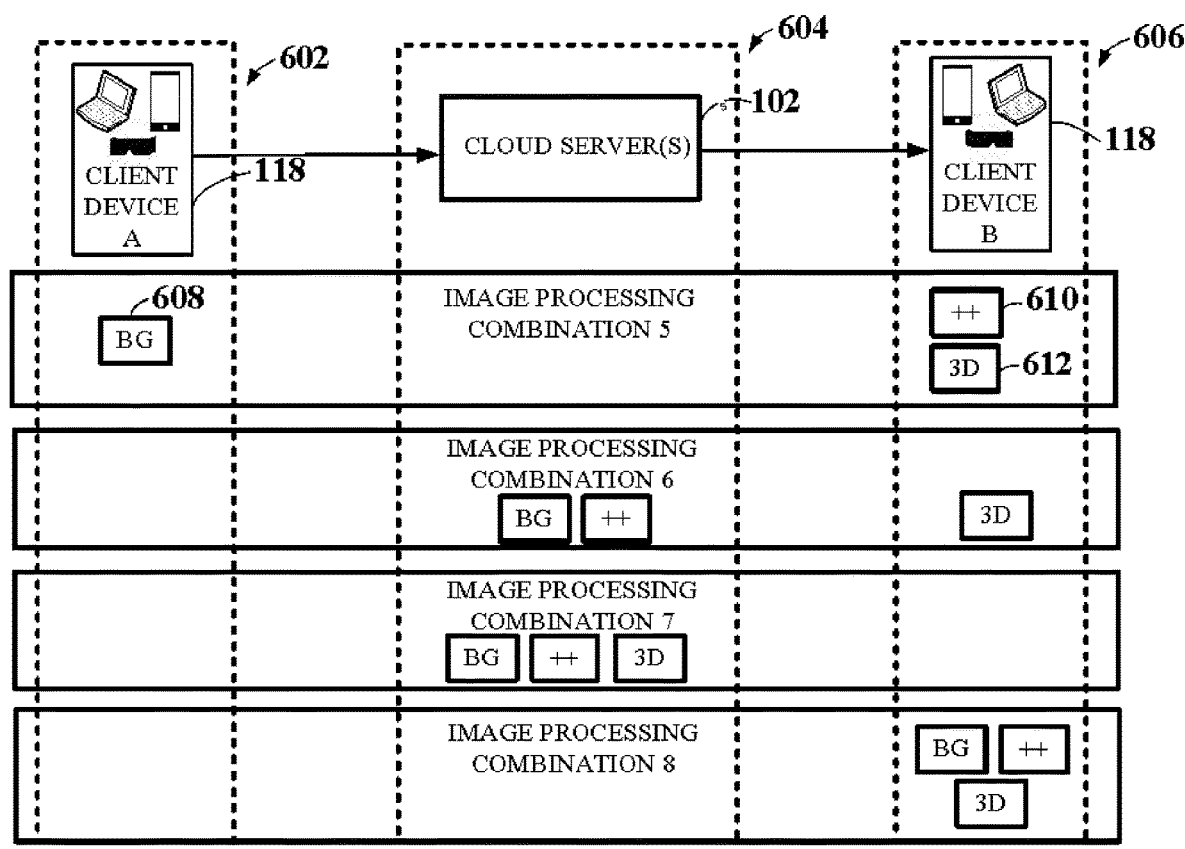

FIGS. 6A-6C depict schematic representations of a plurality of image processing combinations performed in a client-server side 304 by corresponding client devices 118 and cloud servers 102. The client-server side may be part of, for example, a hybrid system architecture, such as the hybrid system architecture 300 as depicted in FIG. 3.

In one embodiment of FIGS. 6A-6C, the at least one cloud server 102 may be configured as a Traversal Using Relay Network Address Translation (NAT) (sometimes referred to as TURN) server, which may be suitable in situations where the server cannot establish a connection between the client devices 118. TURN is an extension of Session Traversal Utilities for NAT (STUN).

NAT is a method of remapping an Internet Protocol (IP) address space into another by modifying network address information in the IP header of packets while they are in transit across a traffic routing device. Thus, NAT can give private IP addresses access to a network such as the Internet, and allows single devices, such as routing devices, to act as an agent between the Internet and a private network. NAT can be symmetric or asymmetric. A framework called Interactive Connectivity Establishment (ICE), which is configured to find the best path to connect client devices, may determine whether symmetric or asymmetric NAT may be required. Symmetric NAT not only does the job of translating the IP address from private to public, and vice-versa, but also translates ports. Asymmetric NAT, on the other hand, uses STUN servers to allow clients to discover their public IP address and the type of NAT they are behind, which may be used to establish a connection. In many cases, STUN may be used only during the connection setup and once that session has been established, data may start flowing between client devices.

TURN may be used in the case of symmetric NAT, and may remain in the media path after the connection has been established while the processed and/or unprocessed data is being relayed between client devices.

FIG. 6A depicts the client-server side 304 comprising a client device A, a cloud server 102 and a client device B. In FIG. 6A, the client device A is the sender of data to be processed, and the client device B is the receiver of the data. A plurality of image processing tasks are depicted and classified based on whether they are performed by the client device A, cloud server 102 and/or client device B, and are thus classified as client device A processing 602, server image processing 604, and client device B processing 606.

The image processing tasks comprise background removal 608, further processing or improvements 610, and insertion into and combination with a virtual environment 612. As will become apparent from FIGS. 6B and 6C and also from FIG. 7B, a combination of the three image processing tasks herein illustrated may be used in the generation, improvement and insertion/combination of a user graphical representation into a virtual environment. Furthermore, for the purpose of simplicity, in FIGS. 6B-6C and FIGS. 7B-7C, the background removal 608 is depicted as "BG" 608, the further processing or improvements 610 as "++" 610, and the insertion into and combination with a virtual environment 612 is depicted as "3D" 612.

In some embodiments, inserting into and combining the user graphical representation with the virtual environment comprises generating one or more virtual cameras that are placed virtually and aligned in front of the user graphical representation, e.g., in front of the video with removed background, or video without removed background, or the user 3D virtual cutout, or user real-time 3D virtual cutout. In one embodiment, the one or more virtual cameras may point outward from eye level. In another embodiment, two virtual cameras, one per eye, may point outward from two-eye level. In yet another embodiment, the one or more virtual cameras may point outward from the center of the head-position of the user graphical representation. In yet another embodiment, the one or more virtual cameras may point outward from the center of the user graphical representation. In yet another embodiment, the one or more virtual cameras may be placed in front of the user graphical representation at, e.g., the head level of the user graphical representation, pointing at the user graphical representation when in the self-viewing perspective. The one or more virtual cameras are created at least by associating the captured viewing perspective data of the user to the viewing perspective of the user graphical representation within the virtual environment using computer vision. The one or more virtual cameras are updated automatically by tracking and analyzing user eye-and-head-tilting data, or head-rotation data, or a combination thereof, and may also be manually changed by the user depending on the viewing perspective selected by the user.

The image processing combination and corresponding level of usage of the client device A processing 602, server image processing 604, and client device B processing 606 depend on the amount of data to be processed, the latency permitted to sustain a smooth user experience, the desired quality of service (QOS), the services required, or the like.

FIG. 6B depicts image processing combinations 1-4.

In image processing combination 1, the client device A generates the user graphical representation, comprising the background removal 608, and sends the user graphical representation with removed background to the at least one cloud server 102 for further processing or improvements 610, generating an enhanced user graphical representation with removed background. The at least one cloud server sends the enhanced user graphical representation with removed background to the client device B, which inserts into and combines the enhanced user graphical representation with removed background with a virtual environment.

In image processing combination 2, the client device A generates the user graphical representation, comprising the background removal 608, and performs further processing or improvements 610 thereon, generating an enhanced user graphical representation with removed background before sending to the at least one cloud server 102. The at least one cloud server 102 sends the enhanced user graphical representation with removed background to the client device B, which inserts into and combines the enhanced user graphical representation with removed background a virtual environment.

In image processing combination 3, the client device A generates the user graphical representation, comprising the background removal 608, performs further processing or improvements 610 thereon, generating an enhanced user graphical representation with removed background, and inserts into and combines the enhanced user graphical representation with removed background with a virtual environment. The client device A then sends the enhanced user graphical representation with removed background inserted into and combined with the virtual environment to the cloud server for relaying to the client device B.

In image processing combination 4, the client device A generates the user graphical representation, comprising the background removal 608, and sends the user graphical representation with removed background to the at least one cloud server 102 for performing further processing or improvements 610, generating an enhanced user graphical representation with removed background. The at least one cloud server then inserts into and combines the enhanced user graphical representation with removed background with a virtual environment before sending to the client device B.

FIG. 6C depicts image processing combinations 5-8.

In image processing combination 5, the client device A generates the user graphical representation, comprising the background removal 608, and sends the user graphical representation with removed background to the at least one cloud server 102 for relaying to the client device B. The client device B performs further processing or improvements 610 on the user graphical representation with removed background, generating an enhanced user graphical representation with removed background that the client device B inserts into and combines with a virtual environment.

In image processing combination 6, the client device A sends the camera live data feed received from the at least one camera and sends the unprocessed data to the at least one cloud server 102, which performs the generation of the user graphical representation, comprising the background removal 608, and performs further processing or improvements 610 on the user graphical representation with removed background, generating an enhanced user graphical representation with removed background that is sent to the client device B. The client device B inserts into and combines the enhanced user graphical representation with removed background with a virtual environment.

In image processing combination 7, the client device sends the camera live data feed received from the at least one camera and sends the unprocessed data to the at least one cloud server 102. The at least one cloud server 102 generates the user graphical representation, comprising the background removal 608, performs further processing or improvements 610 on the user graphical representation with removed background, generating an enhanced user graphical representation with removed background before inserting into and combining the enhanced user graphical representation with removed background with a virtual environment that is sent to the client device B.

In image processing combination 8, the client device A sends the camera live data feed received from the at least one camera and sends the unprocessed data to the at least one cloud server 102 for relaying to the client device B. The client device B uses the data to generate the user graphical representation, comprising the background removal 608, and performs further processing or improvements 610 on the user graphical representation with removed background, generating an enhanced user graphical representation with removed background before inserting into and combining the enhanced user graphical representation with removed background with a virtual environment. As may be appreciated, in some embodiments, the at least one cloud server 102 may be an intermediary server, meaning that the server uses intermediary server topologies to facilitate and/or optimize the exchange of data between client devices.

In such embodiments, the at least one cloud server may be an intermediary server, meaning that the server is used to facilitate and or optimize the exchange of data between client devices. In such embodiments, the at least one cloud server may manage, analyze and optimize incoming multimedia streams and manage, assess, optimize the forwarding of the outbound streams as a router topology (e.g., SFU, SAMS, multimedia server routers, or the like), or media processing (for example, performing tasks including decoding, combining, improving, mixing, enhancing, augmenting, computing, manipulating, or encoding) and forwarding server topology (for example but not limited to multipoint control units, cloud media mixers, cloud 3D renderer), or other server topologies.

In such embodiments, where the intermediary server is a SAMS, such media server manages, analyzes and processes incoming data of sending client devices (e.g., meta-data, priority data, data classes, spatial structure data, three dimensional positional, orientation or locomotion information, image, media, or scalable video codec based video), and, in such analysis, manages or optimizes the forwarding of the outbound data streams to receiving client devices. This may include modifying, upscaling or downscaling the media for temporal (e.g., varying frame rate), spatial (e.g., different image size), quality (e.g., different compression or encoding based qualities) and color (e.g., color resolution and range) based on one or more factors such as the specific receiving client device user's spatial, three dimensional orientation, distance and priority relationship to such incoming data achieving optimal bandwidths and computing resource utilizations for receiving one or more user client devices.

Intermediary server topologies may be suitable, for example, for image processing combinations 1-8, where the at least one cloud server 102 is processing between the client devices A and B as in FIGS. 6A-6C.

Figure 7A:
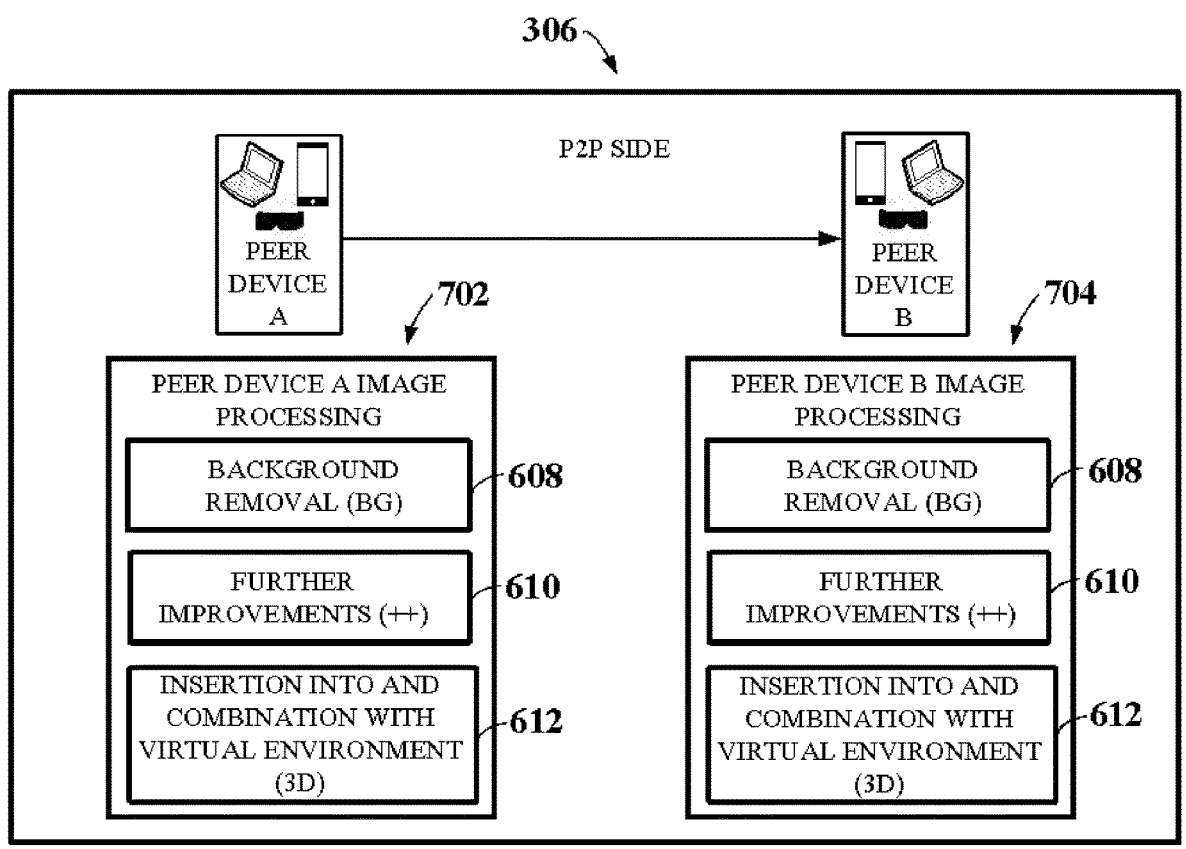
FIGS. 7A-7C depict schematic representations of a plurality of image processing combinations performed in a P2P side by corresponding peer client.
Figure 7B:
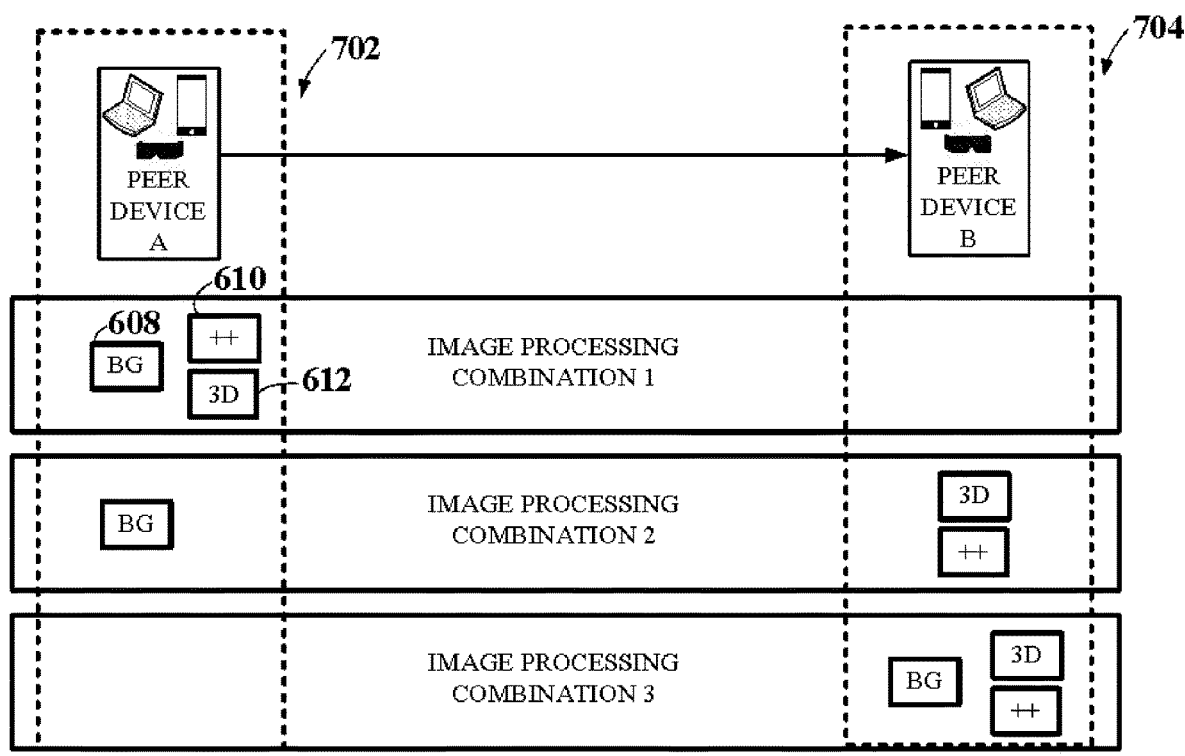
Figure 7C:
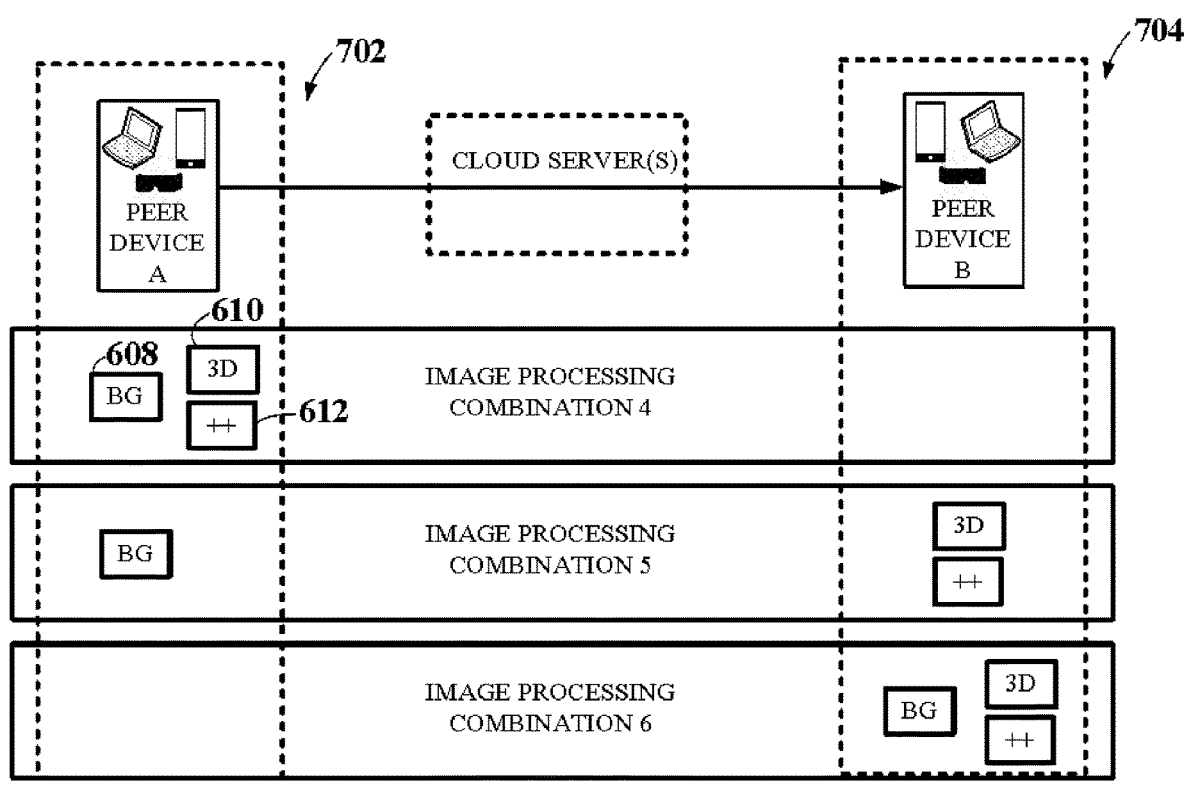

FIGS. 7A-7C depict schematic representations of a plurality of image processing combinations performed in a P2P side 306 by corresponding client devices, depicted in FIGS. 7A-7B as peer devices A-B to differentiate from cases in which communication and processing takes place through the client-server side. The P2P side 306 may be part of, for example, a hybrid system architecture, such as the hybrid system architecture 300 as depicted in FIG. 3.

FIG. 7A depicts the P2P side 306 comprising a peer device A and a peer device B, wherein the peer device A is the sender of data to be processed, and the peer device B is the receiver of the data. A plurality of image and media processing tasks are depicted and classified based on whether they are performed by the peer device A or peer device B, and are thus classified as peer device A processing 702 and peer device B processing 704. The image and media processing tasks may include, but are not limited to background removal 608, further processing or improvements 610, and insertion into and combination with a virtual environment 612.

FIG. 7B depicts image processing combinations 1-3.

In image processing combination 1, the peer device A generates the user graphical representation, comprising the background removal 608, performs further processing or improvements 610 thereon, generating an enhanced user graphical representation with removed background, and inserts into and combines the enhanced user graphical representation with removed background with a virtual environment with three dimensional coordinates. The peer device A then sends the enhanced user graphical representation with removed background inserted into and combined with the virtual environment to the peer device B.

In image processing combination 2, the peer device A generates the user graphical representation, comprising the background removal 608, and sends the user graphical representation with removed background to peer device B. The peer device B performs further processing or improvements 610 on the user graphical representation with removed background, generating an enhanced user graphical representation with removed background that the peer device B inserts into and combines with a virtual environment.

In image processing combination 3, the peer device A sends the camera live data feed received from the at least one camera and sends the encoded data to the peer device B. The peer device B decodes and uses the data to generate the user graphical representation, comprising the background removal 608, and performs further processing or improvements 610 on the user graphical representation with removed background, generating an enhanced user graphical representation with removed background before inserting into and combining the enhanced user graphical representation with removed background with a virtual environment.

FIG. 7C depicts image processing combinations 4-6.

In one embodiment of FIG. 7C, the at least one cloud server 102 may be configured as a STUN server, which allows the peer devices to discover their public IP address and the type of NAT they are behind, information which may be used to establish a data connection and data exchange between the peer devices. In another embodiment of FIG. 7C, the at least one cloud server 102 may be configured for signaling, which may be used for the peer devices to locate and connect to each other as well as to exchange data through communication coordination performed by the at least one cloud server.

In all of image and processing combinations 4-6, the at least one cloud server 102 may use an SAMS, SFU, MCU, or other functional server topologies, because the at least one cloud server 102 is serving between the peer devices A and B.

In image processing combination 4, the peer device A generates the user graphical representation, comprising the background removal 608, performs further processing or improvements 610 thereon, generating an enhanced user graphical representation with removed background, and inserts into and combines the enhanced user graphical representation with removed background with a virtual environment. The peer device A then sends the enhanced user graphical representation with removed background inserted into and combined with the virtual environment to the peer device B through the at least one cloud server acting as a STUN or signaling server.

In image processing combination 5, the peer device A generates the user graphical representation, comprising the background removal 608, and sends the user graphical representation with removed background to peer device B through the at least one cloud server acting as a media router server. The peer device B performs further processing or improvements 610 on the user graphical representation with removed background, generating an enhanced user graphical representation with removed background that the client device B inserts into and combines with a virtual environment.

In image processing combination 6, the peer device A sends the camera live data feed received from the at least one camera and sends the unprocessed data to the peer device B through the at least one cloud server acting as a STUN or signaling server. The peer device B uses the data to generate the user graphical representation, comprising the background removal 608, performs further processing or improvements 610 on the user graphical representation with removed background, generating an enhanced user graphical representation with removed background before inserting into and combining the enhanced user graphical representation with removed background with a virtual environment.

Figure 8:
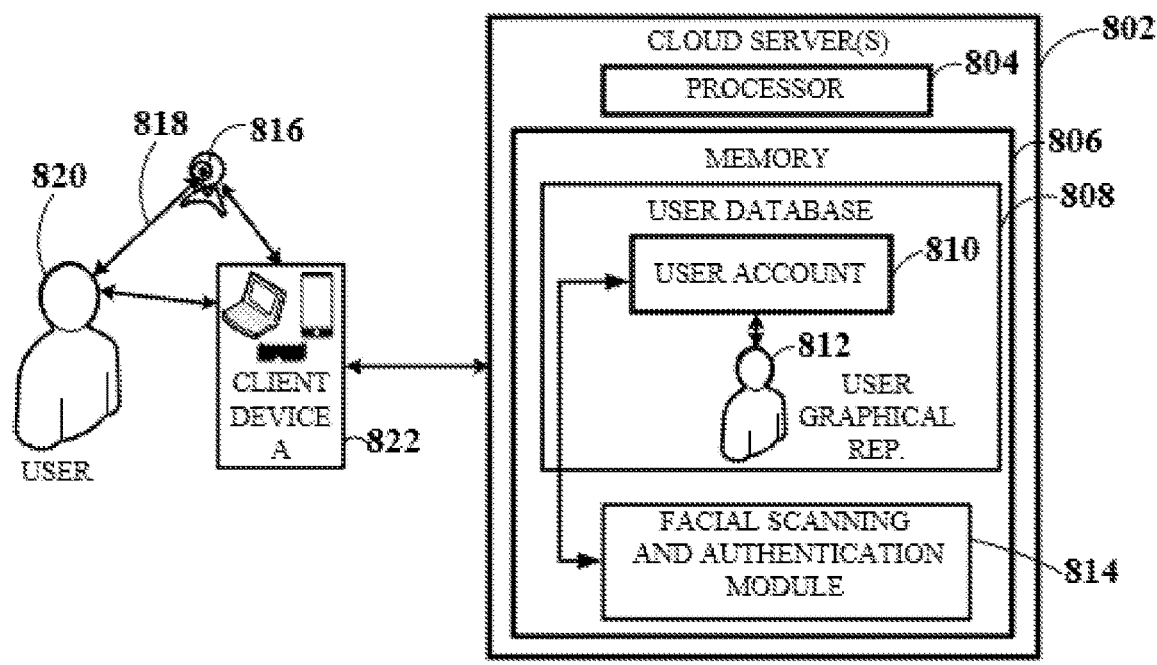
FIG. 8 depicts a schematic representation of a user graphical representation-based user authentication system, according to an embodiment.

FIG. 8 shows a user graphical representation-based user authentication system 800 that may be used in embodiments of the current disclosure. For example, the user graphical representation-based user authentication system 800 may be used to access a user account that may grant access to a virtual environment platform, such as the virtual environment platform 108 of FIGS. 1 and 2A.

The user graphical representation-based user authentication system 800 comprises one or more cloud server computers 802 comprising at least one processor 804 and memory 806 storing data and instructions comprising a user database 808 storing user data associated with a user account 810 and one or more corresponding user graphical representations 812. The user graphical representation-based user authentication system 800 further comprises a facial scanning and authentication module 814 connected to the database 808 storing data associated with the user account 810. The one or more cloud server computers 802 are configured to authenticate a user by performing a facial scanning of the user through the facial scanning and authentication module 814. The facial scanning comprises extracting facial feature data from camera data received from a client device 822 and checking the extracted facial feature data for a match against a user graphical representation in the user database 808.

In the example shown in FIG. 8, the system 800 further includes at least one camera 816 configured to obtain image data 818 from a user 820 of at least one client device 822 requesting access to the user account 810. The at least one camera 816 is connected to the at least one client device 822, which is configured transmit data captured by the camera 516 to the one or more cloud server computers 802 for further processing. Alternatively, the camera 516 may have a direct connection the one or more cloud server computers 802. The one or more cloud server computers 802 are configured to authenticate the user by performing a facial scanning of the user through the facial scanning and authentication module 814, checking the user database 808 for a match against an existing user graphical representation, and if a user account 810 is confirmed and available, by providing the user with the corresponding user graphical representation 812 along with access to the user account 810. Alternatively, if a user account 810 is not available, the one or more cloud server computers 802 are configured to authenticate the user by generating, from the data 818 obtained from the live data feed a new user graphical representation 812 along with a new user account 810 stored in the user database 808.

The user account 810 may be, for example, employed for accessing a virtual environment platform, or any other application (e.g., applications that may be linked to the environment platform), such as any interactive application, game, email account, university profile account, work account, etc. The graphical representation-based user authentication system 800 of the current disclosure, given, for example, the step of generating a user graphical representation 812 or retrieving from the user database 808 an existing user graphical representation 812, provides a higher convenience and security level than standard camera-based faced detection authentication systems.

In some embodiments, the one or more cloud server computers are further configured to check a date of the matching user graphical representation and determine whether an update of the matching user graphical representation is required. In an embodiment, if a user account 810 is available, and in response to the one or more cloud server computers 802 checking the date of the available user graphical representation 812, the one or more cloud server computers 802 determine whether an update of the existing user graphical representation 814 is required by comparing to corresponding threshold values or security requirements. For example, if there were to be a system security update, it could be that all user graphical representations may need to be updated, or at least those that were created before a specified date. If a user graphical representation 814 is required, the one or more cloud server computers 802 generate a user graphical representation update request to the corresponding client device 822. If the user 820 approves the request, the one or more cloud server computers 802 or client devices 822 proceed to generate the user graphical representation 814 based on the data 818 from the live camera feed. If an update is not required, the one or more cloud server computers 802 proceed to retrieve the existing user graphical representation 812 from the user database 808 after the authentication.

In some embodiments, the user graphical representation 812 is inserted into a two-or-three dimensional virtual environment, or on a third-party source linked to a virtual environment, and is combined with the two-or-three dimensional virtual environment. For example, the user graphical representation 812 may be inserted on a third-party source linked to a virtual environment by being overlaid on the screen of a third-party application or website integrated with or coupled to the system of the current disclosure).

In one example, overlaying the user graphical representation 812 on the screen of a third-party source is done on top of a 2D website or application linked to a virtual environment. For example, two or more friends going to a shopping web site together, may have their user graphical representations overlaid on the shopping website to explore and/or interact with the content of the website. In another example, overlaying the user graphical representation 812 on the screen of a third-party source is done on top of a 3D game session linked to a virtual environment. For instance, a user may access an e-sports game session linked to a virtual environment through his or her user graphical representation 812, which may be overlaid on top of the e-sports game session along with the user graphical representations 812 of other team members. In these examples, such an overlay of the user graphical representation 812 may enable a coherent and multi-casted view of all users' expressions and communications during the visit of the 2D website or experience of the 3D game session.

In some embodiments, the generation process of the user graphical representation 812 takes place asynchronously from user 820 access to the user account 810. For example, if the user graphical representation-based authentication system 800 determines that the user 820 has already authenticated after performing the facial scanning, the user graphical representation-based authentication system 800 may enable the user 820 to access the user account 810 while the new user graphical representation 812 is being generated for providing to the user 812 once ready and then inserting into and combining with the virtual environment.

In some embodiments, the one or more cloud server computers 802 further authenticate the user 802 through login authentication credentials comprising a personal identification number (PIN), or username and password or the combination of camera authentication and with PIN, or username and password.

In some embodiments, the user graphical representation-based authentication system 800 the authentication is triggered in response to activation of an invitation link or a deep link sent from one client device 822 to another. Clicking on the invitation link or deep link triggers the at least one cloud server computer 802 to request the user to authenticate. For example, the invitation link or deep link may be for a phone call, conference or video game session invitation, wherein the invited user may be authenticated through the user graphical representation-based authentication system 800.

In another embodiment, the facial scanning uses 3D authentication comprising guiding a user to perform a head movement pattern and extracting 3D face data based on the head movement pattern. This may be done using application instructions stored in the at least one server computer, which implements the 3D authentication by guiding a user to perform a head movement pattern, for example, to perform one or more head gestures, to tilt or rotate the head horizontally or vertically, in a circular motion, to perform a user-generated gesture pattern, or a specific head movement pattern, or a combination thereof. The 3D authentication recognizes further features from the data obtained from the camera live video data feed, contrary to just comparing and analyzing one view or image. In this 3D authentication embodiment, the facial scanning process may recognize further features from the data, which may comprise face data including head movement patterns, facial volume, heights, depths of facial features, facial scars, tattoos, eye colors, facial skin parameters (e.g., skin color, wrinkles, pore structure, etc.), reflectance parameters, besides, e.g., just location of such features on the face topology, as may be the case with other types of facial detection systems. Capturing such face data may thus increase the capture of a realistic face that may serve in the generation of a realistic user graphical representation. The facial scanning using 3D authentication may be performed using high-resolution 3D cameras, depth cameras (e.g., LIDARs), light-field cameras, and the like. The facial scanning process and 3D authentication may use deep neural networks, convolution-neural networks and other deep learning techniques to retrieve, process, assess an authenticate the user by using the face data.

Figure 9:
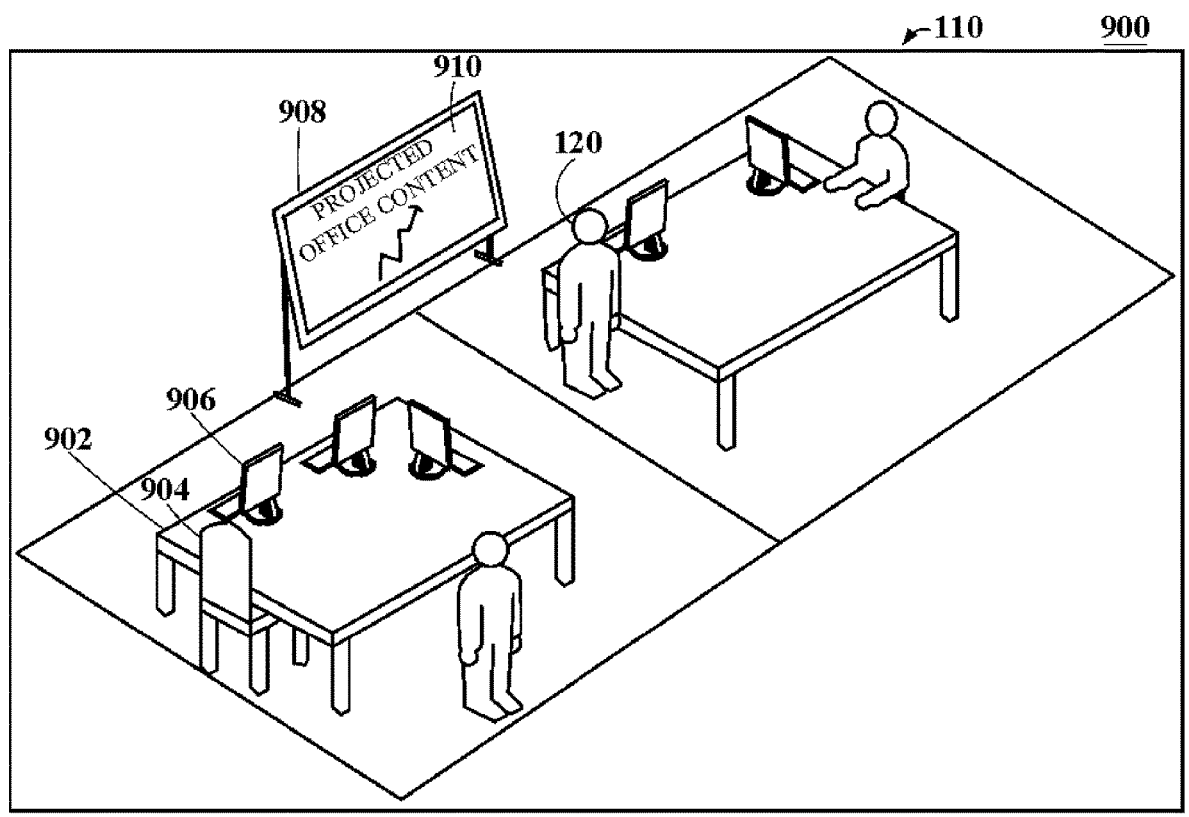
FIG. 9 depicts a schematic representation of a third-person viewing perspective of an office virtual environment, according to an embodiment.

FIG. 9 depicts a schematic representation of a third-person viewing perspective 900 of a virtual environment 110 through a user graphical representation 120 wherein the virtual environment 110 is a virtual office.

The virtual office comprises one or more office desks 902, office chairs 904, office computers 906, a projecting surface 908 for projecting content 910, and a plurality of user graphical representations 120 representing corresponding users accessing the virtual environment 110 through their client devices.

The user graphical representations 120 may initially be a user 3D virtual cutout and may, after an invitation approval process, transition into a user real-time 3D virtual cutout comprising the real-time video stream of the user with a removed background generated based on the real-time 2D or 3D live video stream data feed obtained from a camera, or a video with removed background, or video without removed background. The process may include, as described with reference to FIG. 5, opening up a communication channel enabling a plurality of interactions within a live session, as described with reference to FIG. 4. For example, a user may initially be seated in an office chair 904 working on a corresponding office computer 906, which may be representing the actual action being performed by the user in real life. Other users may be able to view (e.g., through remote sensing 414 of FIG. 4) the current user status, such as whether the user is away, busy, available, offline, in a conference call, or in a meeting. If the user is available, another user graphical representation may approach the user in question and send an invitation to engage in a conversation. Both users may, for example, decide to move to a private conference room of the virtual office and start a live session enabling a plurality of interactions. Users may also be able to project desired content (e.g., through screen sharing) on the projecting surface 908.

In some embodiments, the virtual office further comprises virtual computers including virtual resources from the one or more cloud computer resources that are accessed through the client device and are assigned with administrative tools to said virtual computer resources. The virtual computers may be associated with the office computers 906. However, the virtual computers may also be associated with a personal home computer, or computers from any other location that may access cloud-computer-based virtual computing resources. The resources may comprise memory, network and processing power required to perform various tasks. Further in the example of an office space, the virtual computers associated with the virtual office computers 906 may, in turn, be coupled to the real office computer of the user so that, for example, data stored in the virtual office computer 906 may be available from the real office computer at the physical office or any other space with a physical computer as the user logs in onto such virtual computer. A virtual infrastructure including all of the virtual computers associated to the virtual office computers 906 may be managed through the virtual environment platform by using administrator options based on exclusive administrator rights (e.g., provided to an IT team of the organization using the virtual environment 110). Thus, the virtual environment platform of the current disclosure enables a virtual office management and provides a plurality of options that that expand the possibilities of typical virtual meeting and conferencing applications, increasing realism of collaborations and interactions and streamlining the way that collaborations take place.

Figure 10A:
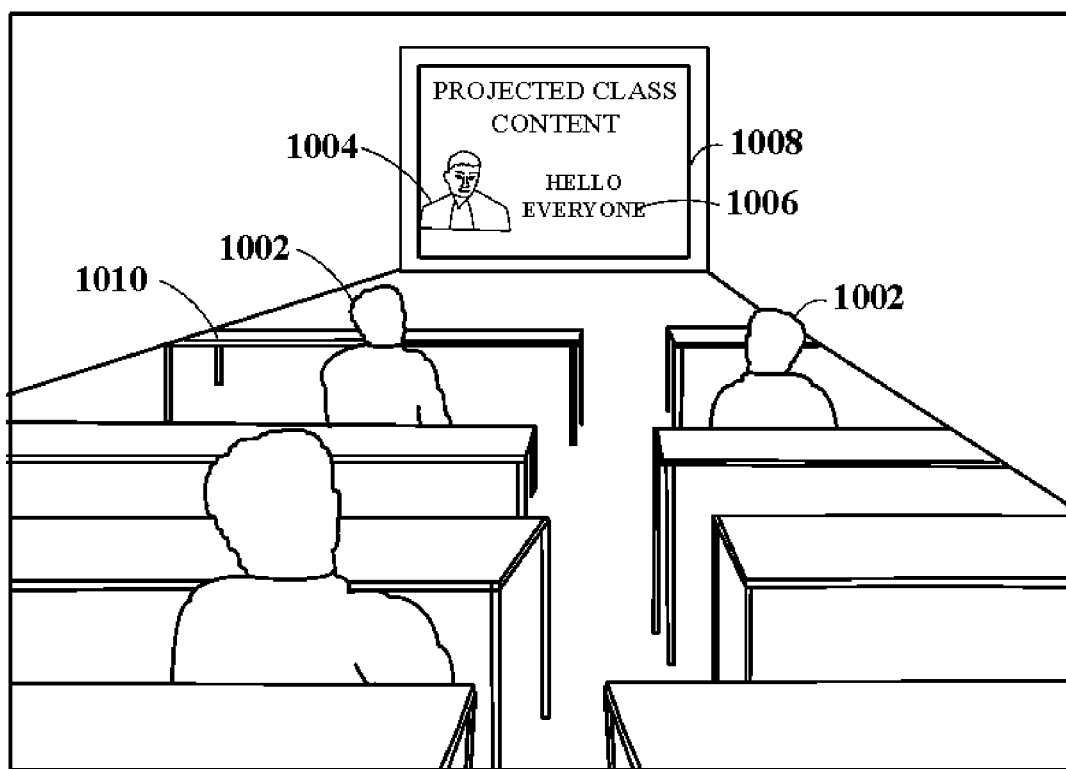
FIGS. 10A-10B depict schematic representations of a classroom virtual environment, according to an embodiment.
Figure 10B:
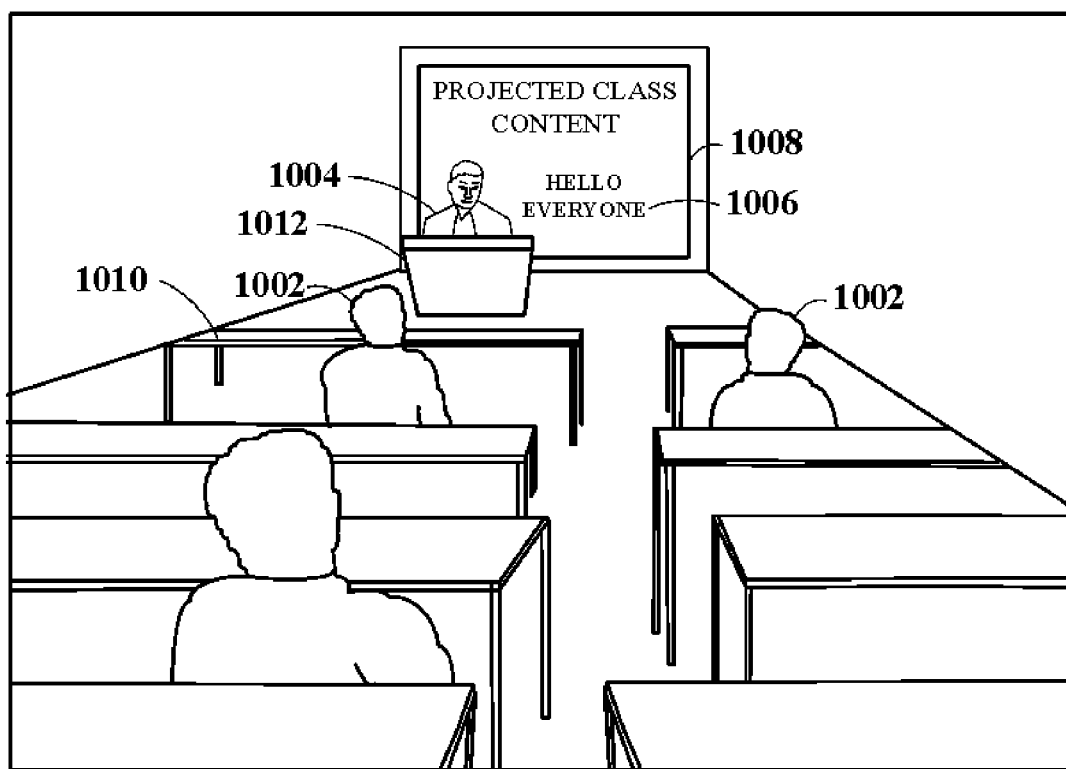

FIGS. 10A-10B depicts a schematic representation of a virtual environment viewed through corresponding user graphical representations, wherein the virtual environment is a virtual classroom 1000, according to an embodiment. The user graphical representations of students and the teacher in FIGS. 10A-10B may be any of a user 3D virtual cutout constructed from a user-uploaded or third-party-source photo, or a user real-time 3D virtual cutout with a removed background generated based on the real-time 2D or 3D live video stream data feed obtained from the camera, or a video with removed background, or video without removed background.

In FIG. 10A, a plurality of user graphical representations of students 1002 are attending a class lecture remotely provided by the user graphical representation of a teacher 1004. The teacher 1004 may project class content 1006 on one or more projecting surfaces 1008, such as on a virtual classroom whiteboard. The virtual classroom 1000 may further comprise a plurality of virtual classroom desks 1010 where users may be supported for studying. Students 1002 may be provided with a plurality of interaction options, as disclosed with reference to FIG. 4, such as hand-raising, screen sharing (e.g., on the projecting surface 1008), laser-pointing at specific content, etc., as appropriate for the situation. In FIG. 10A, the user graphical representation of the teacher 1004 is graphically projected on the projecting surface.

FIG. 10B depicts a similar embodiment to FIG. 10A, with the difference being that the user graphical representation of the teacher 1004 is sitting behind a virtual desk 1012 while only the content 1006 is shared or projected on the virtual classroom whiteboard projecting surface 1008. As the teacher 1004 shares the same virtual space with the students 1002 and may move around in the classroom 1000, creating a more realistic and interactive experience for students 1002 and the teacher 1004.

Figure 11:
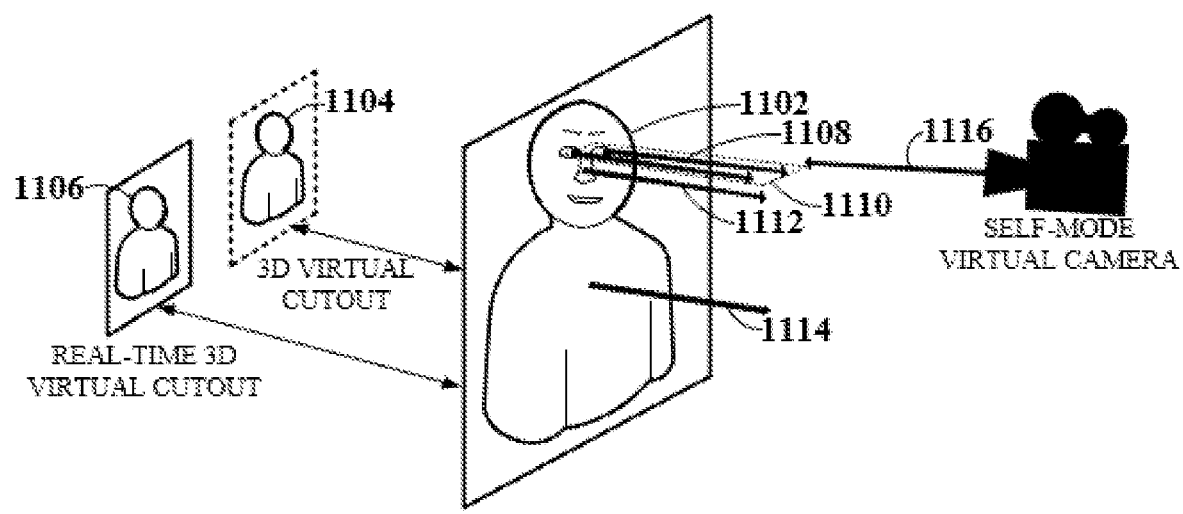
FIG. 11 depicts a schematic representation of a plurality of virtual camera positions, according to an embodiment.

FIG. 11 depicts a schematic representation of a plurality of virtual camera positions 1100, according to an embodiment.

In FIG. 11, two user graphical representations 1102, a user 3D virtual cutout 1104 and a user real-time 3D virtual cutout 1106 have one or more virtual camera positions 1100 for one or more virtual cameras, each of them comprising a viewing direction, angle and field of view that generate a viewing perspective for the user graphical representation.

In one embodiment, the one or more virtual cameras may positioned, at eye-level 1108, pointing outward from the eye-level of the user graphical representation 1102. In another embodiment, two virtual cameras, one per eye, may point outward from the two-eye-level 1110 of the user graphical representation 1102. In yet another embodiment, the one or more virtual cameras may point outward from the center of the head-position 1112 of the user graphical representation 1102. In yet another embodiment, the one or more virtual cameras may point outward from the center 1114 of the user graphical representation 1102. In yet another embodiment, the one or more virtual cameras may be placed in front of the user graphical representation 1102 at, e.g., the head level of the user graphical representation 1102, pointing toward the user graphical representation 1102 when in the self-viewing perspective 1116. The one or more virtual cameras may be created during the insertion into and combination of the user graphical representation with the virtual environment, as explained with reference to FIGS. 6A-7C.

In an embodiment, the viewing perspective of the user captured by the camera is associated to the viewing perspective of the user graphical representation and the associated virtual camera(s) using computer vision, accordingly steering the virtual camera(s). Furthermore, the virtual camera may be updated automatically by, e.g., tracking and analyzing user eye-and-head-tilting data, or head-rotation data, or a combination thereof.

Figure 12:
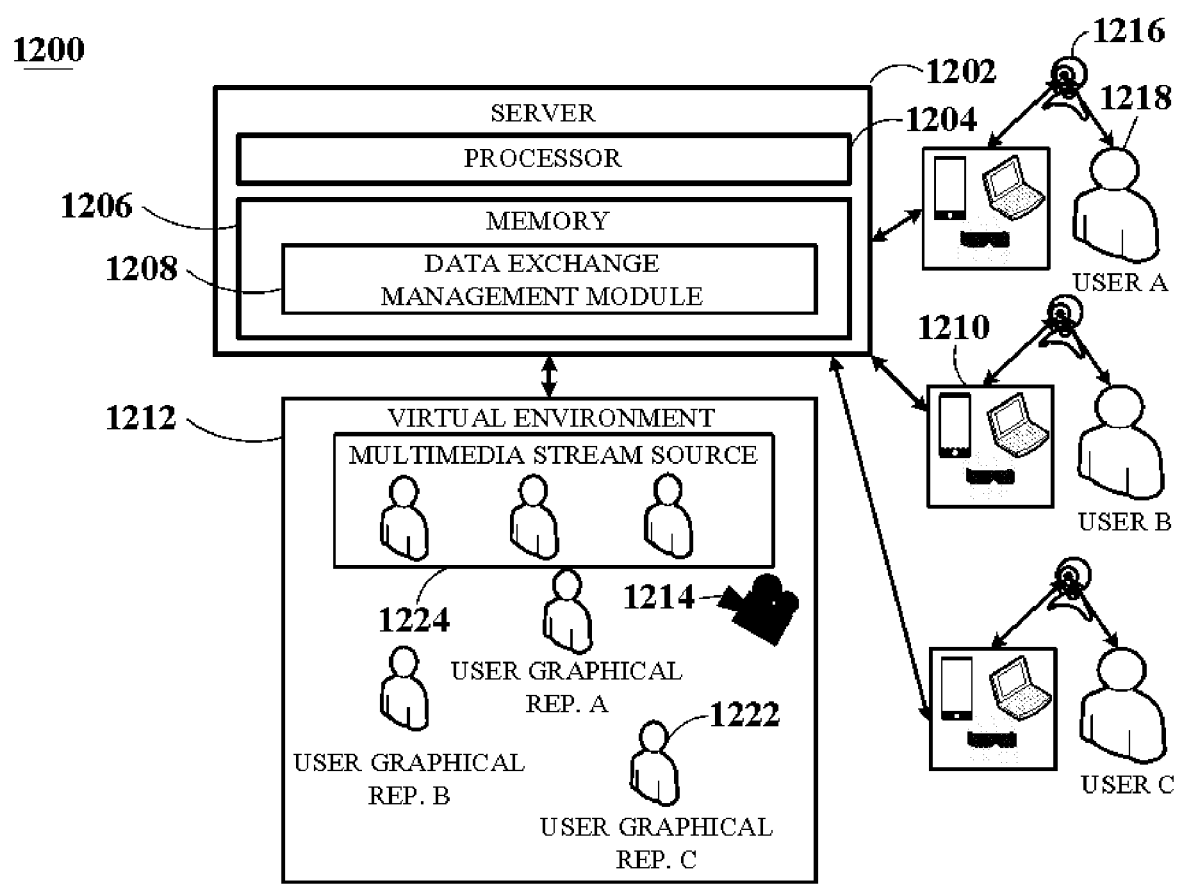
FIG. 12 depicts schematic representation of a system for virtually broadcasting from within a virtual environment.

FIG. 12 depicts schematic representation of a system 1200 for virtually broadcasting from within a virtual environment.

The system 1200 may include one or more server computers. The illustrative system 1200 shown in FIG. 12 comprises at least one media server computer 1202 comprising at least one processor 1204 and memory 1206 including data and instructions implementing a data exchange management module 1208 managing data exchange between client devices 1210. The system 1200 further comprises at least one virtual environment 1212 connected to the at least one media server computer 1202 comprising a virtual broadcasting camera 1214 positioned within the at least one virtual environment 1212 and being configured to capture multimedia streams from within the at least one virtual environment 1212. The at least one virtual environment 1212 may be hosted by at least one dedicated server computer connected via a network to the at least one media server computer 1202, or may be hosted in a peer-to-peer infrastructure and relayed through the at least one media server computer 1202. The multimedia streams are sent to the at least one media server computer 1202 for broadcasting to at least one client device 1210. The system 1200 further comprises at least one camera 1216 obtaining live feed data from a user 1218 of the at least one client device 1210 and sending the live feed data from the user to the at least one media computer 1202 via the at least one client device 1210. The live feed data received by the at least one media computer 1202 may be generated through a plurality of image processing combinations, as disclosed with reference to FIGS. 6A-7C.

The at least one virtual broadcasting camera 1214 sends the multimedia streams to the at least one media server computer 1202 for broadcasting corresponding multimedia streams to receiving client devices 1210 based on the data exchange management from the at least one media server computer 1202. The multimedia streams are displayed to corresponding user graphical representations 1220 of users 1218 of the at least one client device 1210 through corresponding displays. The data exchange management between client devices 1210 by the data exchange management module 1208 comprises analyzing the incoming multimedia streams and assessing and forwarding the outbound multimedia streams.

In some embodiments, the at least one media server computer 1202, when forwarding the outbound multimedia streams, utilizes a routing topology comprising a Selective Forwarding Unit (SFU), a Traversal Using Relay NAT (TURN), a Spatially Analyzed Media Server (SAMS), or other suitable multimedia server routing topologies, or a media processing and forwarding server topology, or other suitable server topologies. In yet further embodiments, the at least one media server computer 1202, when utilizing a media processing topology, is configured for decoding, combining, improving, mixing, enhancing, augmenting, computing, manipulating, and encoding multimedia streams. In yet further embodiments, the at least one media server computer 1202, when utilizing a forwarding server topology, utilizes one or more of Multipoint Control Units (MCUs), cloud media mixers, and cloud 3D renderers.

In some embodiments, the incoming multimedia streams comprise user priority data and distance relationship data, and the user priority data comprises a higher priority score to user graphical representations closer to an incoming multimedia stream's source and a lower priority score to user graphical representations farther from the incoming multimedia stream's source. In an embodiment, the multimedia streams sent by the at least one client device 1210 and/or broadcasting camera 1214 to the at least one media server comprise data related to user priority and the distance relationship between the corresponding user graphical representation 1202 and multimedia streams, comprising meta-data, or priority data, or data classes, or spatial structure data, or three dimensional positional, or orientation or locomotion information, or image data, or media data, and scalable video codec based video data, or a combination thereof. In yet further embodiments, the priority data comprises a higher priority score to users closer to a virtual multimedia streams source 1224 and a lower priority score to users farther from the virtual multimedia streams source 1224. In yet further embodiments, the forwarding of the outbound multimedia streams is based on the user priority data and the distance relationship data. In an embodiment, the forwarding of the outbound multimedia streams implemented by the media server based on the user priority and distance relationship data comprises optimizing bandwidth and computing resource utilization for the one or more receiving client devices.

In some embodiments, the at least one virtual broadcasting camera 1214 is viewed virtually in the at least one virtual environment 1212 as a virtual broadcasting camera 1214 configured to broadcast the multimedia streams within the at least one virtual environment 1212. The virtual broadcasting camera 1214 may be positioned close to the virtual multimedia streams source 1224 and may also move around within the virtual environment 1212. In further embodiments, the virtual broadcasting camera 1214 may managed through a client device 1210 accessing the virtual environment, may be configured to steer the point of view of the camera that is updated in the virtual environment, broadcasting the updated point of view to the at least one client device associated to the virtual broadcasting camera 1214.

In some embodiments, the virtual multimedia streams source 1224 comprises a live virtual event including one or more of a panel, speech, conference, presentation, webinar, entertainment show, sports event, and performance, wherein a plurality of user graphical representations of real speakers speaking remotely (e.g., from their home while being recorded to their corresponding camera 1216) is placed within the virtual environment 1212

In some embodiments, the multimedia streams are viewed either as a real-time 3D view in a web browser that is client-or-cloud computer rendered, or may be streamed to be watched live in suitable video platforms (e.g., YouTube™ live, Twitter™, Facebook™ live, Zoom™, etc.).

In the example illustrated in FIG. 12, users A-C access the virtual environment 1212 through their corresponding client devices, wherein each user A-C has a camera 1216 sending multimedia streams corresponding to each user A-C, which may be used in the generation of the user graphical representations A-C and insertion into and combination with the virtual environment 1212, as described with respect to embodiments of the current disclosure. Thus, in the virtual environment 1212, each user A-C has a corresponding user graphical representation A-C. The multimedia streams sent by the at least one camera 1216 through the at least one client device 1210, and the multimedia streams sent by the at least one broadcasting camera 1214 to the at least one media server 1202 comprise data related to user priority and the distance relationship between the corresponding user graphical representation and multimedia streams. This data comprises, e.g., meta-data, priority data, data classes, spatial structure data, three dimensional positional, orientation or locomotion information, image data, media data, scalable video codec based video data, amongst others. The data may be used by the data exchange management module 1208 to manage the data exchange between the client devices 1210, comprising analyzing and optimizing the incoming multimedia streams and assessing and optimizing the forwarding of the outbound multimedia streams.

Thus, for example, as the user graphical representation A is closer in the virtual environment 1212 to the virtual multimedia streams source 1224, the forwarding of the outbound media streams may be optimized to comprise, for example, images with higher resolution for the user graphical representation A than those provided to user graphical representations B and C. The multimedia streams may be viewed, e.g., in first person within the virtual environment 1212 by the users through their user graphical representations 1222 via their client devices 1210. In some examples, the multimedia streams are viewed either as a real-time 3D view in a web browser that is client-or-cloud computer rendered. The users may watch the multimedia streams of an event (e.g., a webinar, conference, panel, speech, etc.) as a real-time 3D view in a web browser that is client-or-cloud computer rendered, or may be streamed to be watched live in suitable video platforms and/or social media.

Figure 13:
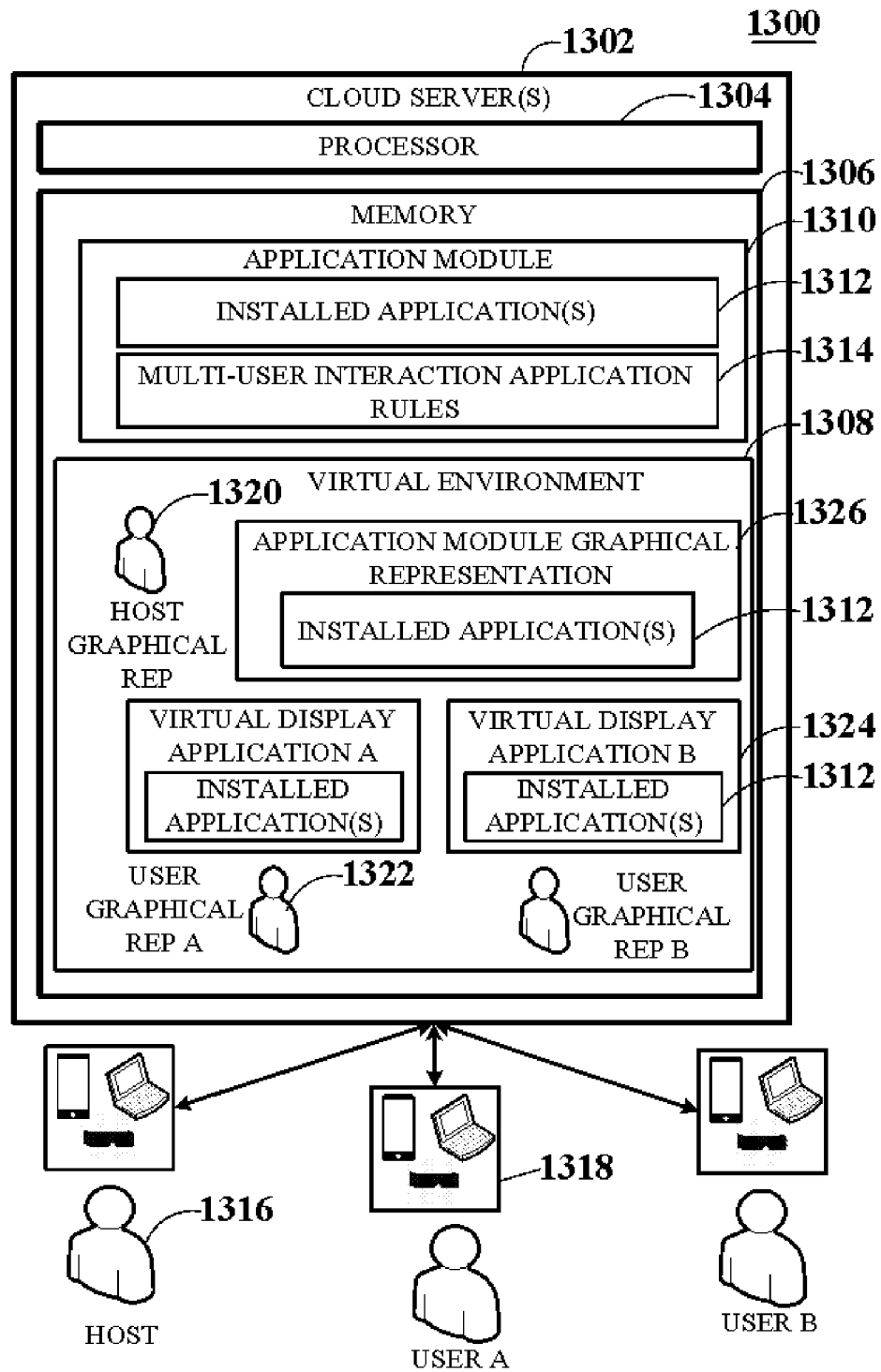
FIG. 13 depicts a schematic representation of a system for delivering applications within a virtual environment.

FIG. 13 depicts a schematic representation of a system 1300 for delivering applications within a virtual environment.

The system 1300 comprises at least one cloud server computer 1302 including at least one processor 1304 and memory 1306 comprising data and instructions implementing at least one virtual environment 1308 linked to an application module 1310. The application module 1310 comprises one or more installed applications 1312 and corresponding application rules for multi-user interactions 1314. Responsive to selection by a virtual environment host 1316 through a client device 1318, the one or more installed applications 1312 are displayed and activated during a session of the virtual environment 1302, enabling a virtual environment host user graphical representation 1320 and any participant user graphical representations 1322 within the virtual environment 1308 to interact with the one or more installed applications 1312 through corresponding client devices 1318. The at least one cloud server computer 1302 manages and processes received user interactions with the one or more installed applications 1312 according to the application rules for multi-user interactions 1314 in the application module 1310. The at least one cloud server computer 1302 further forwards the processed interactions accordingly to each client device 1318 to establish a multi-user session in the virtual environment 1308, enabling shared experiences according to the multi-user interaction application rules 1314.

In some embodiments, multi-user interaction application rules 1314 are stored and managed in one or more separate application servers, which may connect to the at least one cloud server computer 1302 through a network.

In some embodiments, the one or more applications are installed from an application installation package available from an application library, provisioning the application services through corresponding application programming interfaces. In yet further embodiments, the application library is contextually filtered. In an embodiment, the contextual filtering is designed to provide only relevant applications for particular contexts. For example, the host 1316 may contextually filter the application library (e.g., an application store) to look for applications related to a specific context (e.g., learning, entertainment, sports, reading, buying, weather, working, etc.), and may select one application of interest for being installed within the application module 1310. In yet further embodiments, the application library is hosted at one or more third-party server computers or is hosted at the at least one cloud server computer 1302.

In some embodiments, the one or more installed applications are shared with and viewed through virtual display applications installed in the corresponding client devices. In an embodiment, upon installation and activation, the one or more installed applications 1312 are shared with and viewed through virtual display applications 1324 installed in the corresponding client devices 1318. The virtual display applications 1324 may be configured to receive the one or more installed applications 1312 from the application library and to publish the one or more selected installed applications 1312 to display to the meeting host user graphical representation 1320 and other participant user graphical representations 1322 in the virtual environment 1308 through their corresponding client devices 1318. The virtual display applications 1324 may be a type of online or installed file viewer application that may be configured to receive and display the installed applications 1312.

In some embodiments, the application module 1310 is represented as a 2D screen or 3D volume application module graphical representation 1326 within the virtual environment displaying content from the installed application 1312 to the user graphical representations 1322 in the virtual environment. In further embodiments, the virtual display applications 1324 are represented as 2D screens or 3D volumes displaying content from the installed application to the user graphical representations in the virtual environment 1308.

In some embodiments, the one or more applications 1312 are installed directly inside the virtual environment 1308 previously or at the same time as the multi-user session is taking place. In other embodiments, the one or more applications 1312 are installed through the use of a virtual environment setup tool prior to starting the multi-user session.

In some embodiments, some of the application rules for multi-user interactions may define synchronous interactions, or asynchronous interactions, or a combination thereof, accordingly updating user interactions and the respective updated view of the one or more applications. Both the synchronous and asynchronous interactions may be configured through the multi-user interaction application rules 1314, and may be enabled through parallel processing through the at least one server computer 1302, or through separate server computers dedicated to processing individual user interactions with the at least one installed application 1312.

For example, if the host 1316 is a teacher, the teacher may select a workbook application displaying book content to users. The teacher may edit the workbook, while the students may view, through their virtual display applications 1324, the same workbook with the edits from the teacher when choosing to use synchronous interactions and respective updated view, or without the edits from the teacher when choosing a synchronous interactions. In another example, in a presentation application comprising a presentation file with a plurality of slides, the asynchronous interactions may enable each user to watch an individual slide asynchronously. In another example, in a case of an education application, a heart-anatomy is presented while a student is tested, wherein the student's interaction is synchronous for other students to witness and observe the interaction that the student performs. In another example, a teacher may write on a whiteboard, allowing the students to synchronously view the text written on the whiteboard through their virtual display applications. In another example, a video player application may display a video synchronously to all students.

In some example embodiments, the virtual environment 1308 is a classroom, or an office space, or a conference room, or a meeting room, or an auditorium, or a theater.

Figure 14:
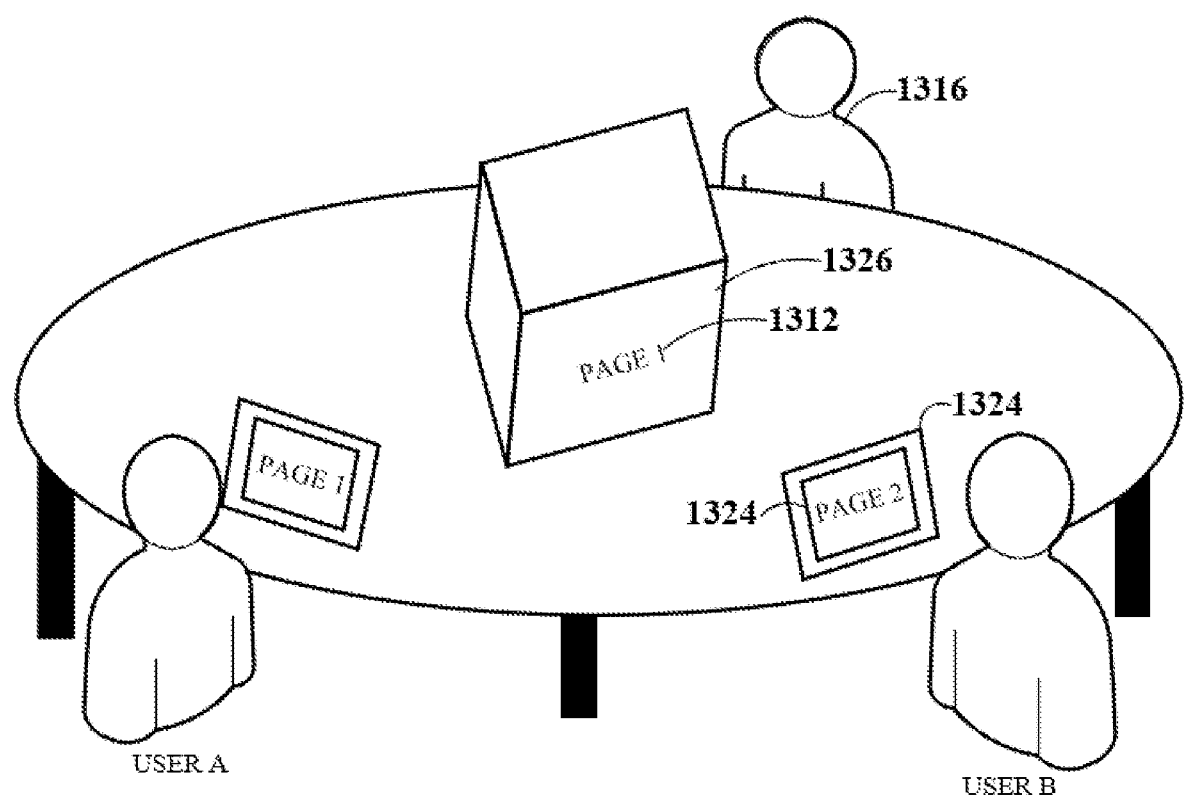
FIG. 14 depicts a schematic representation of a virtual environment based on the system for delivering applications within a virtual environment depicted in FIG. 13, according to an embodiment.

FIG. 14 depicts a schematic representation of a virtual environment 1308 based on the system 1300 for delivering applications within a virtual environment depicted in FIG. 13, according to an embodiment.

The virtual environment 1308 comprises an application module graphical representation 1326 comprising at least one installed application 1312 selected by a host 1316 of the virtual environment 1308, and two users A-B viewing and interacting with the installed application 1312 through their corresponding virtual display applications 1324. As may be appreciated, user A may view a certain page (e.g., page 1) of a book application through the virtual display application 1324, which may be the same as the one selected by host 1316 through the application module graphical representation 1326, representing a synchronous interaction and management of the installed application 1312. On the other hand, user B may view a different page than both the host 1316 and user A through an asynchronous interaction and management of the installed application 1312 through the virtual display application 1324.

Figure 15:
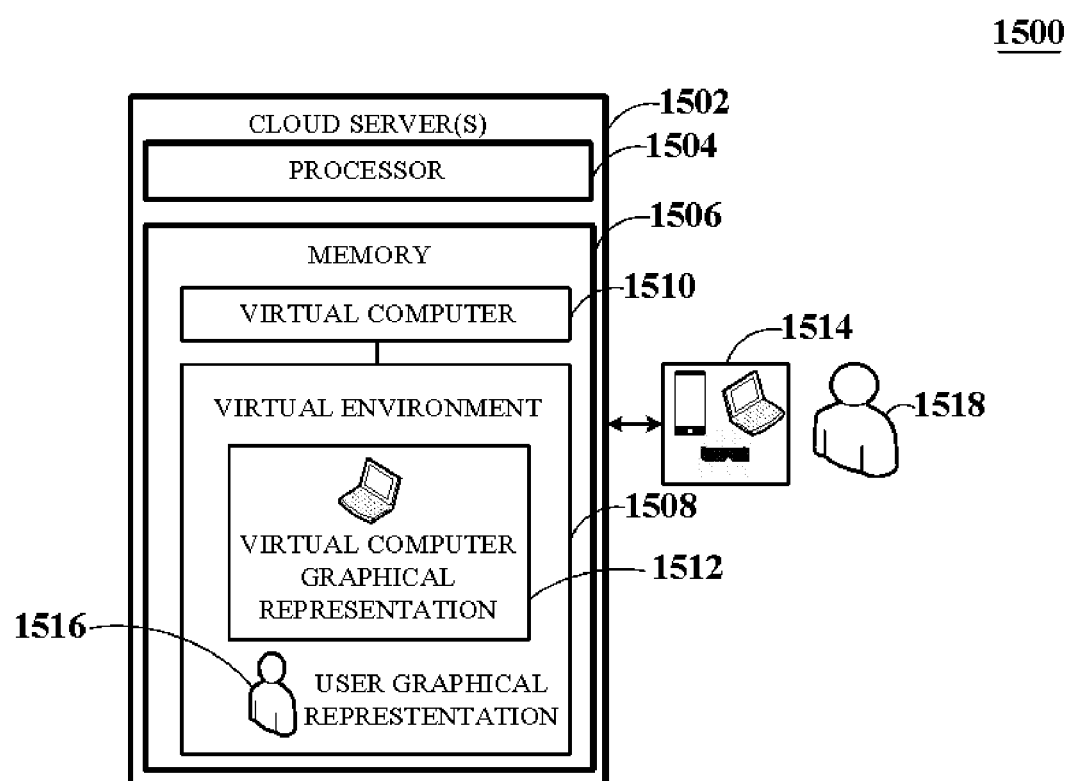
FIG. 15 depicts a schematic representation of a system to provision virtual computing resources within a virtual environment, according to an embodiment.

FIG. 15 depicts a schematic representation of a system 1500 to provision virtual computing resources within a virtual environment, according to an embodiment.

The system 1500 comprises a server computer system comprising one or more server computers, including at least one cloud server computer 1502 comprising at least one processor 1504 and memory 1506 including data and instructions implementing at least one virtual environment 1508, and at least one virtual computer 1510 associated with the at least one virtual environment 1508. The at least one virtual computer 1510 receives virtual computing resources from the server computer system. In an embodiment, the at least one virtual computer has a corresponding graphical representation 1512 in the virtual environment 1508. The graphical representation 1512 may provide further benefits such as facilitating the interaction of a user with the virtual computer and increasing the realism of the user experience (e.g., for a home office experience). Thus, in an embodiment, the at least one virtual computer comprises at least one corresponding associated graphical representation 1512 positioned within the virtual environment 1508, wherein the at least one virtual computer 1510 receives virtual computing resources from the at least one cloud server computer 1502. The system 1500 further comprises at least one client device 1514 connecting to the at least one server computer 1510 through a network. Responsive to the at least one client device 1514 accessing the one or more virtual computers 1510 (e.g., by interacting with corresponding graphical representations), the at least one cloud server computer 1502 provisions the at least one client device 1514 with at least one portion of the available virtual computing resources.

In some embodiments, the virtual computing resources are accessed by a user graphical representation 1516 of a user 1518 accessing (e.g., interacting with) the one or more graphical representations of the virtual computers 1512 within the at least one virtual environment 1508 through the corresponding client device 1514 and are thereby provisioned to the corresponding client device 1514.

In some embodiments, the virtual computer graphical representation 1512 is spatially positioned within the virtual environment for access by the user graphical representation. In an embodiment, the arrangement of the virtual environment 1508 is associated with a contextual theme of the virtual environment 1508, with may include arrangements of virtual items, furniture, floorplans, or the like, for use in education, meeting, working, shopping, servicing, socializing and entertainment, respectively. In yet further embodiments, he one or more virtual computer graphical representations are positioned within the arrangement of the virtual environment 1508 for access by the one or more user graphical representations 1516. For example, a virtual computer may be positioned in a virtual room that a user graphical representation 1516 will access when engaging in an activity (such as working on a project in a virtual classroom, laboratory, or office) that may require or benefit from an ability to use resources associated with the virtual computer.

In some embodiments, the server computer system is configured to provision the at least one client device with the at least one portion of the virtual computing resources responsive to a user accessing the at least one cloud server computer by logging into the at least one client device without accessing the virtual environment. In an illustrative scenario, the virtual computing resources are accessed by a user 1518 accessing the at least one cloud server computer 1502 by physically logging into the client device 1514 connecting through the network to the at least one cloud server computer 1502, triggering the provisioning of the virtual computing resources to the client device 1514 without accessing the virtual environment. For example, a user 1518 may log into the cloud server computer 1502 from his or her home computer and access the virtual computer 1510 to accordingly receive the virtual computing resources. In another example, the user 1518 may log into the cloud server computer 1502 from his or her work computer to access the virtual computer 1510 and accordingly receive the virtual computing resources.

In some embodiments, the at least one portion of virtual computing resources is assigned with administrative tools to the client devices. Thus, a virtual infrastructure including all of the virtual computers associated may be managed by using administrator options based on exclusive administrator rights (e.g., provided to an IT team of the organization using the virtual environment).

In some embodiments, the provisioning of virtual computing resources is performed based on a stored user profile. In an embodiment, the assignment of virtual computing resources is performed based on a stored user profile comprising one or more of parameters associated with and assigned to the user profile, comprising priority data, security data, QOS, bandwidth, memory space, or computing power, or a combination thereof. For example, the user accessing the working virtual computer from home may have a personal profile configured to provide the user with specific virtual computing resources associated to the profile.

In some embodiments, each virtual computer is a downloadable application available from an application library.

Figure 16:
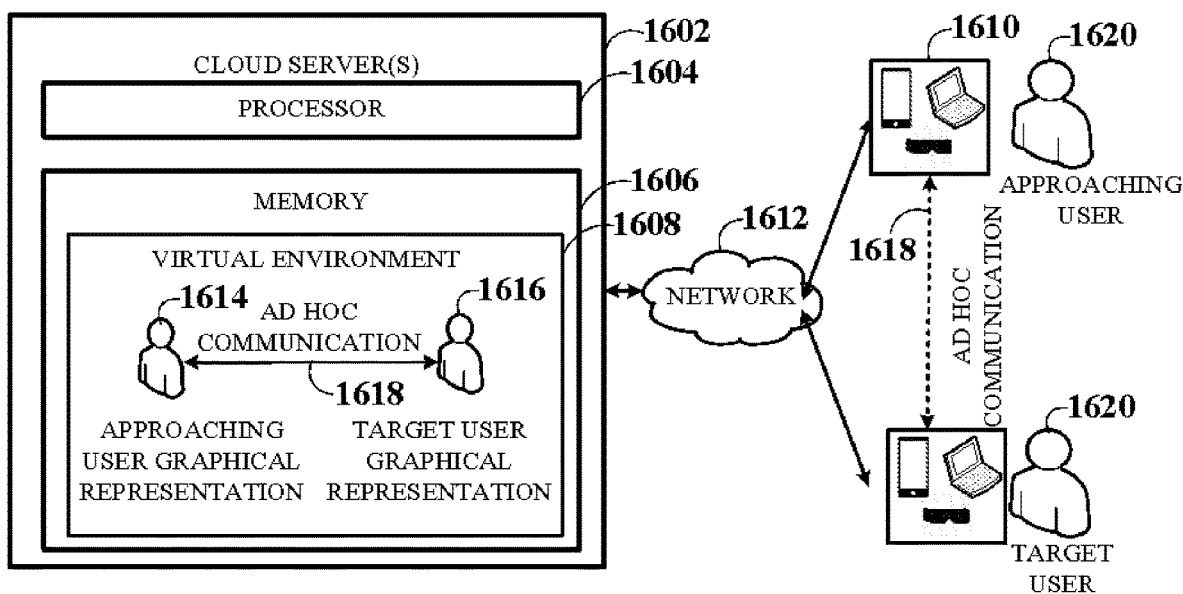
FIG. 16 depicts a schematic representation of a system enabling ad hoc virtual communications between user graphical representations, according to an embodiment.

FIG. 16 depicts a schematic representation of a system 1600 enabling ad hoc virtual communications between user graphical representations, according to an embodiment.

The system 1600 comprises one or more cloud server computers 1602 comprising at least one processor 1604 and memory 1606 storing data and instructions implementing a virtual environment 1608. The virtual environment 1608 is configured to enable at least one approaching user graphical representation and at least one target user graphical representation in the virtual environment 1608 to open an ad hoc communication channel, and to enable an ad hoc conversation via the ad hoc communication channel between the user graphical representations within the virtual environment 1608. In the example shown in FIG. 16, the system further comprises two or more client devices 1610 accessing the at least one virtual environment through corresponding user graphical representations and being connected to the one or more cloud server computers 1602 via a network 1612. The virtual environment 1608 enables at least one approaching user graphical representation 1614 and at least one target user graphical representation 1616 to open an ad hoc communication channel 1618 from corresponding users 1620, enabling an ad hoc conversation between the user graphical representations within the virtual environment 1608.

In some embodiments, opening the ad hoc communication channel 1618 is performed based on distance, position and orientation between the user graphical representations, or current availability status, privacy settings, or status configuration for the ad hoc communications, or combinations thereof.

In some embodiments, the ad hoc conversation is performed at the place within the virtual environment 1608 where both user graphical representations area located. For example, if an approaching user graphical representation 1614 meets a target user graphical representation 1614 in a specific area of a lounge room or office space, the ad hoc communication may open up to enable both users to hold the conversation within the specific are of the lounge room or office space without needing to change location. In yet further embodiments, the ad hoc conversation is performed using the current viewing perspective in the virtual environment. In the example above, the ad hoc communication may open up to enable both users to hold the conversation without changing the viewing perspective. In other embodiments, the ad hoc conversation enables an optional change of viewing perspective, location, or combinations thereof within the same or another connected virtual environment where the ad hoc conversation takes place.

In some embodiments, the one or more cloud server computers are further configured to generate visual feedback in the virtual environment signaling that an ad hoc communication is possible. In an embodiment, the user graphical representations receive a visual feedback signaling that an ad hoc communication is possible, thereby triggering the opening of the ad hoc communication channel, signaling the onset of the ad hoc conversation between the user graphical representations.

In some embodiments, the ad hoc conversation comprises sending and receiving real-time audio and video displayed from the user graphical representations.

In some embodiments, the user corresponding to an approaching user graphical representation 1614 selects and clicks on the target user graphical representation 1616 before opening the ad hoc communication channel 1618.

In some embodiments, the one or more cloud server computers are further configured to open the ad hoc communication channel in response to an accepted invitation. For example, the user corresponding to an approaching user graphical representation 1614 further sends an ad hoc communication engagement invitation to the target user graphical representation 1616, and receives an invitation approval from the target user graphical representation 1614 before opening the ad hoc communication channel 1618.

In some embodiments, the ad hoc communication channel 1618 is enabled through the at least one cloud server computer or as a P2P communication channel.

Figure 17:
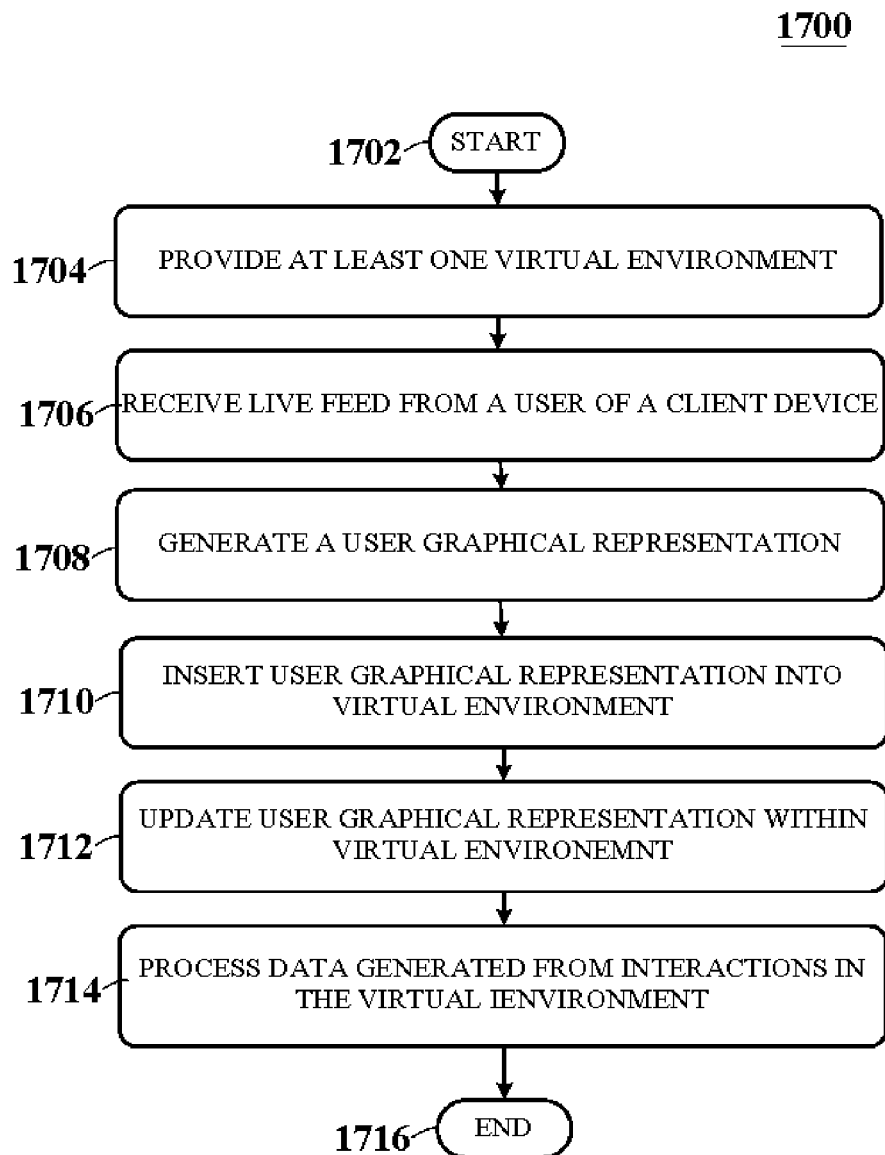
FIG. 17 depicts an embodiment of a method enabling interactions in virtual environments, according to an embodiment.

FIG. 17 depicts an embodiment of a method 1700 enabling interactions in virtual environments, according to an embodiment.

The method 1700 enabling interactions in virtual environments according to the current disclosure starts in steps 1702 and 1704 by providing a virtual environment platform comprising at least one virtual environment in memory of one or more cloud server computers comprising at least one processor.

The method receives, from at least one camera, live data feed from a user of a client device and then generates, from the live data feed, a user graphical representation, as viewed in steps 1706 and 1708. The method 1700 then inserts the user graphical representation into a three-dimensional coordinate of the virtual environment, as viewed in step 1710.

Subsequently, in step 1712, the method updates, from the live data feed, the user graphical representation within the virtual environment. Finally, in step 1714, the method processes data generated from interactions in the at least one virtual environment through corresponding graphical representations located within the virtual environment, ending in step 1716.

Figure 18:
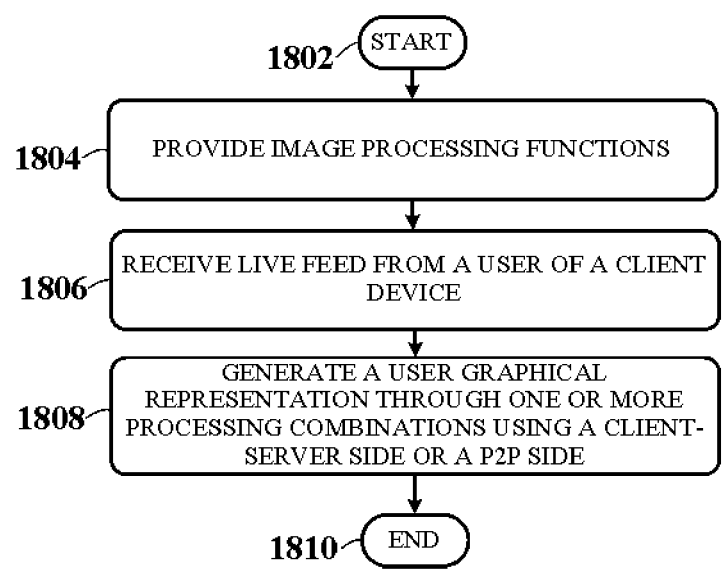
FIG. 18 depicts an embodiment of an image processing method, according to an embodiment.

FIG. 18 depicts an embodiment of an image processing method 1800, according to an embodiment.

Method 1800 begins in steps 1802 and 1804 by providing in memory of at least one cloud server computer data and instructions implementing image processing functions. In step 1806, the method 1800 continues by obtaining, from at least one camera, live data feed from at least one user of at least one corresponding client devices. Then in step 1808, the method 1800 proceeds by generating, by one or more image processing combinations (e.g., image processing combinations of FIGS. 6A-7C) of the one or more cloud server computers and at least one client devices, a user graphical representation, before the process may end in step 1810. The one or more cloud server computers and at least one client device may interact through a hybrid system architecture (e.g., hybrid system architecture 300 of FIG. 3) from the current disclosure comprising a P2P side and a client-server side.

Figure 19:
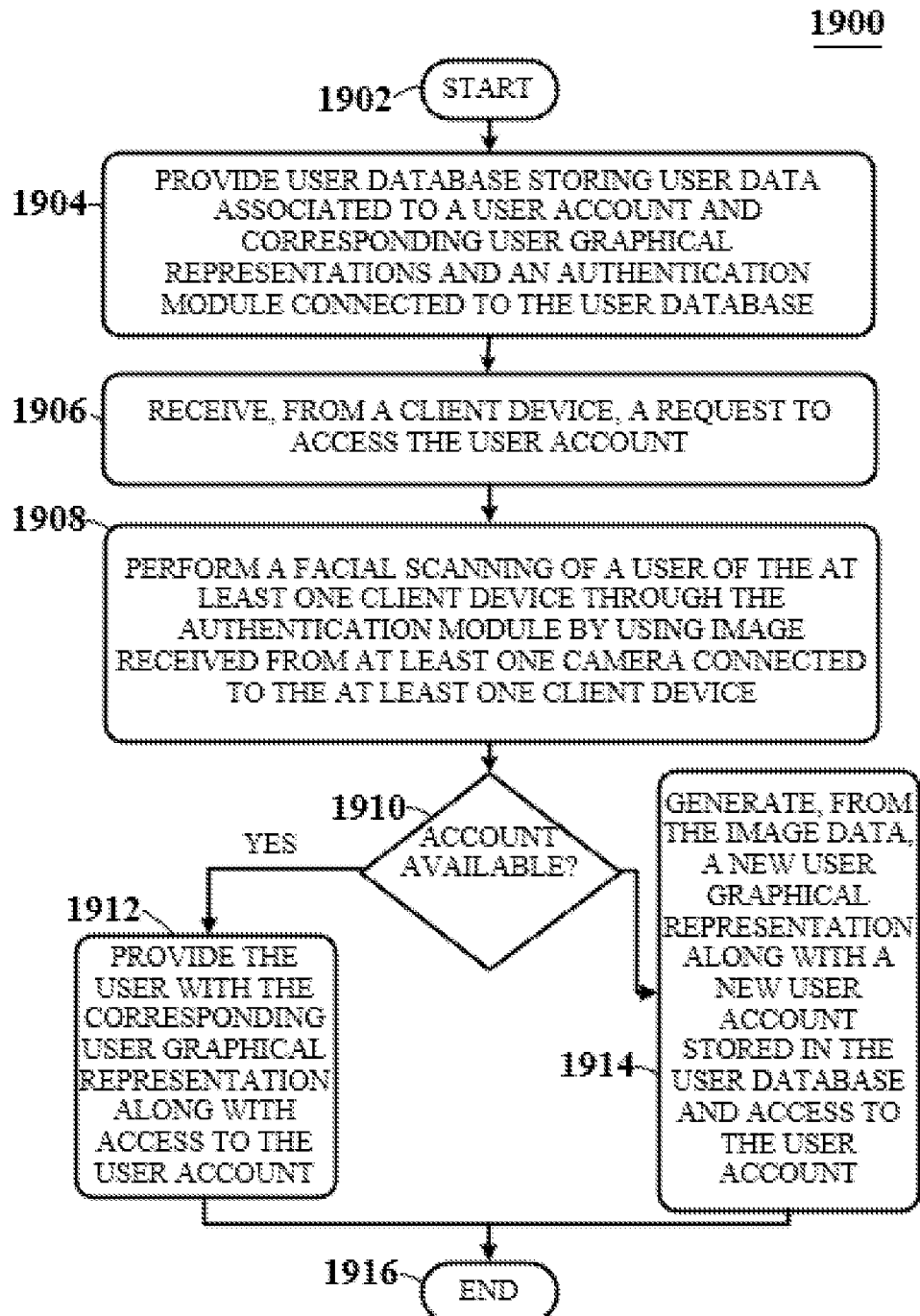
FIG. 19 depicts a user graphical representation-based user authentication method 1900, according to an embodiment.

FIG. 19 depicts a user graphical representation-based user authentication method 1900, according to an embodiment.

Method 1900 begins in steps 1902 and 1904 by providing in memory of one or more cloud server computers a user database storing user data associated to a user account and corresponding user graphical representations and a facial scanning and authentication module connected to the user database. Method 1900 continues in step 1906 by receiving, from a client device, a request to access the user account, and then, in step 1908, by performing a facial scanning of a user of the at least one client device through the facial scanning and authentication module by using image received from at least one camera, which may be connected to the at least one client device and/or one or more cloud server computers. In check 1910, method 1900 proceeds by checking the user database for a match of the user data associated to the user account. If a user account is available, method 1900 proceeds in step 1912 by providing the user with the corresponding user graphical representation along with access to the user account. In negative case, if a user account is not available, method 1900 may proceed in step 1914 by generating, from the data, a new user graphical representation along with a new user account stored in the user database and access to the user account. The process may end in step 1916.

Figure 20:
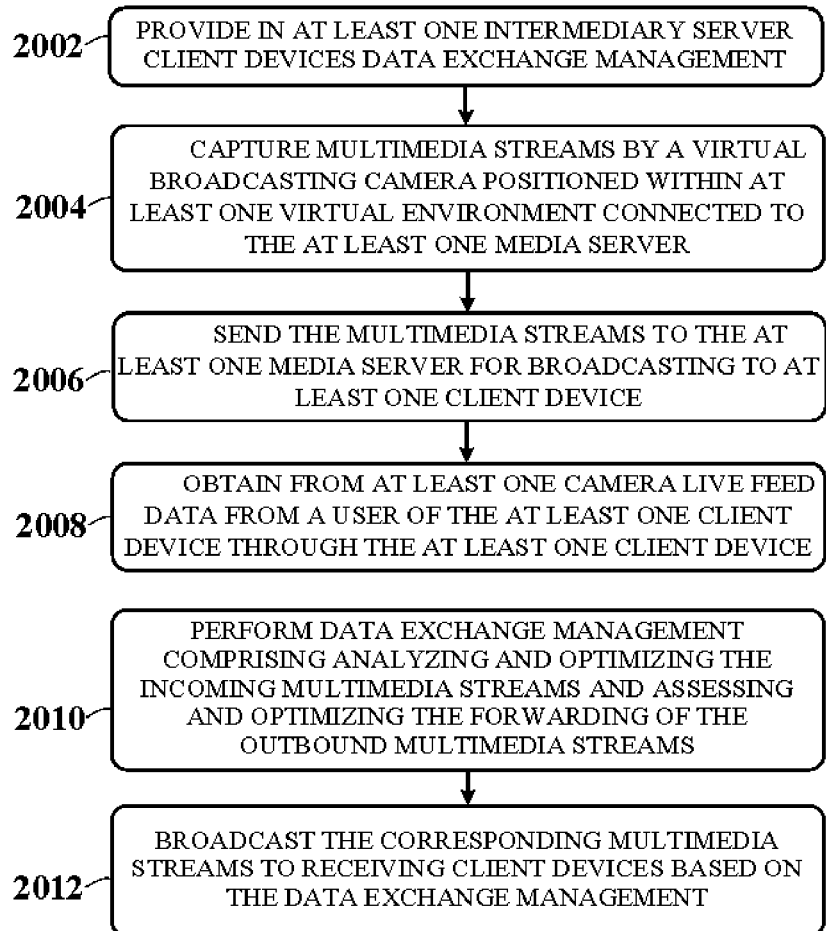
FIG. 20 shows a block diagram of method for virtually broadcasting from within a virtual environment, according to an embodiment.

FIG. 20 shows a block diagram of method 2000 for virtually broadcasting from within a virtual environment, according to an embodiment.

The method 2000 begins in step 2002 by providing, in memory of at least one media server, data and instructions implementing a client devices data exchange management module managing data exchange between client devices. The method 2000 continues in step 2004 by capturing multimedia streams by a virtual broadcasting camera positioned within the at least one virtual environment connected to the at least one media server.

In step 2006, the method 2000 proceeds by sending the multimedia streams to the at least one media server for broadcasting to at least one client device. In step 2008 the method 2000 continues by obtaining from at least one camera, live feed data from a user of at least one client device through the at least one client device.

In step 2010, the method continues by performing data exchange management comprising analyzing and optimizing the incoming multimedia streams from within the at least one virtual environment and live feed data from the users and assessing and optimizing the forwarding of the outbound multimedia streams. Finally, in step 2012, the method 2000 ends by broadcasting the corresponding multimedia streams to client devices based on the data exchange management, wherein the multimedia streams are displayed to user graphical representations of users of the at least one client device.

Figure 21:
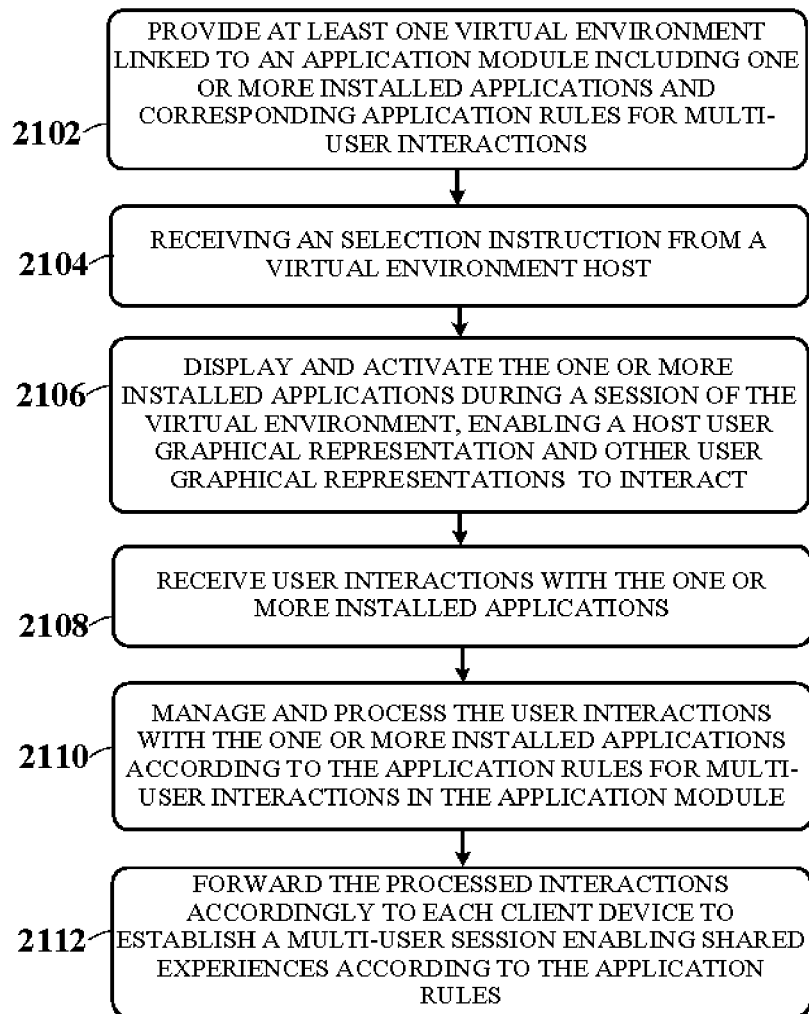
FIG. 21 shows a block diagram of method for delivering applications within a virtual environment, according to an embodiment.

FIG. 21 shows a block diagram of method 2100 for delivering applications within a virtual environment, according to an embodiment.

The method 2100 begins in step 2102 by providing in memory of at least one cloud server computer at least one virtual environment, and an application module including one or more installed applications and corresponding application rules for multi-user interactions, wherein the application module is linked to and visible within the virtual environment. In step 2104, the method 2100 proceeds by receiving a selection instruction from a virtual environment host. Then, in step 2106, the method 2100 continues by displaying and activating the one or more installed applications during a session of the virtual environment, enabling a user graphical representation of the virtual environment host and any participant user graphical representations within the virtual environment to interact with through corresponding client devices.

In step 2108, the method 2100 proceeds by receiving user interactions with the one or more installed applications. Subsequently, the method 2100 continues by managing and processing the user interactions with the one or more installed applications according to the application rules for multi-user interactions in the application module, as viewed in step 2110. Finally, the method 2100 ends in step 2112 by forwarding the processed interactions accordingly to each client device to establish a multi-user session enabling shared experiences according to the application rules.

Figure 22:
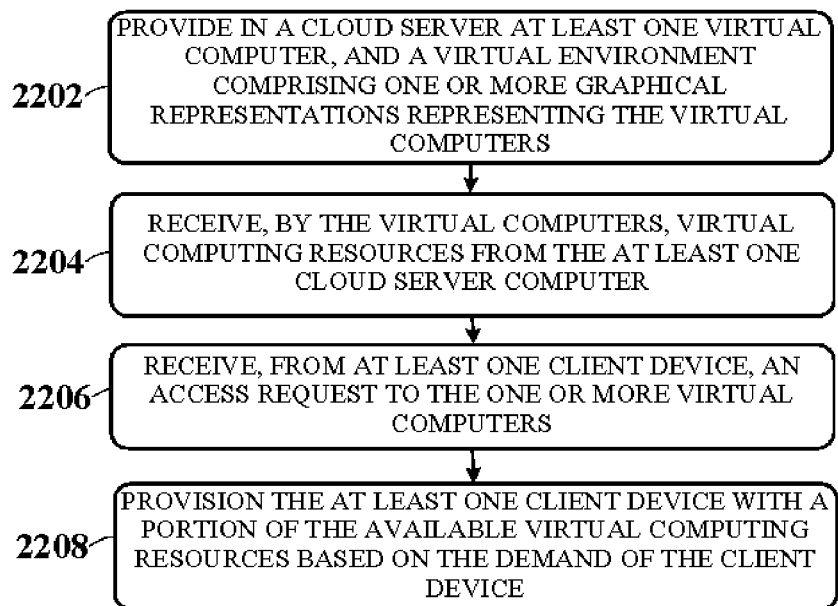
FIG. 22 shows a block diagram of a method to provision virtual computing resources within a virtual environment, according to an embodiment.

FIG. 22 shows a block diagram of a method 2200 to provision virtual computing resources within a virtual environment, according to an embodiment.

The method 2200 begins in step 2202 by providing in memory of at least one cloud server computer at least one virtual computer, and a virtual environment comprising one or more graphical representations representing the virtual computers. The method continues in step 2204 by receiving, by the virtual computers, virtual computing resources from the at least one cloud server computer. Then, in step 2206, the method proceeds by receiving, from at least one client device, an access request to the one or more virtual computers. Finally, in step 2208, the method ends by provisioning the at least one client device with a portion of the available virtual computing resources based on the demand of the client device.

Figure 23:
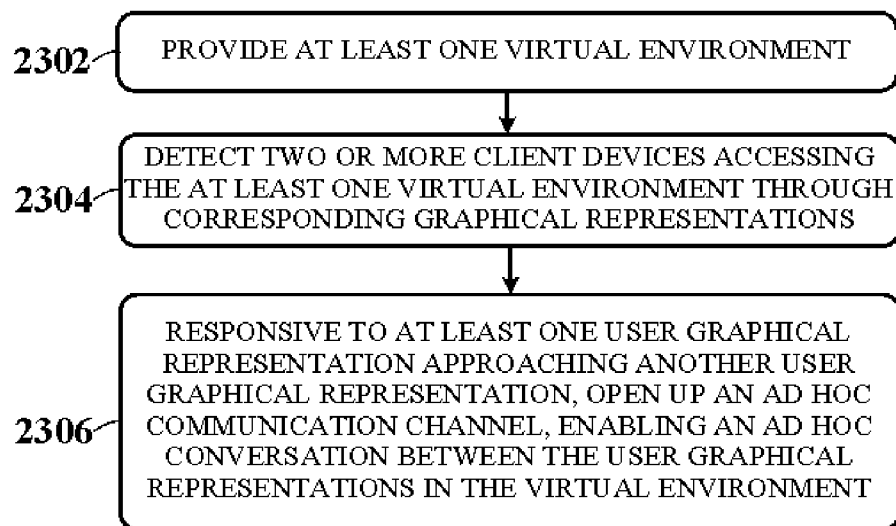
FIG. 23 shows a block diagram of a method enabling ad hoc virtual communications between user graphical representations.

FIG. 23 shows a block diagram of a method 2300 enabling ad hoc virtual communications between user graphical representations.

The method 2300 begins in step 2302 by providing a virtual environment in memory of one or more cloud server computers comprising at least one processor. Then, in step 2304, the method continues by detecting two or more client devices accessing the at least one virtual environment through corresponding graphical representations, wherein the client devices are connected to the one or more cloud server computers via a network. Finally, in step 2306, the method 2300, responsive to at least one user graphical representation approaching another user graphical representation, ends by opening up an ad hoc communication channel, enabling an ad hoc conversation between the user graphical representations in the virtual environment.

Computer-readable media having stored thereon instructions configured to cause one or more computers to perform any of the methods described herein are also described. As used herein, the term "computer readable medium" includes volatile and nonvolatile and removable and nonremovable media implemented in any method or technology capable of storing information, such as computer readable instructions, data structures, program modules, or other data. In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A data processing system comprising:
one or more computing devices comprising at least one processor and memory storing data and instructions implementing image processing functions, wherein the one or more computing devices include at least one cloud server computer;
wherein the one or more computing devices of the data processing system are configured to generate a user graphical representation from a live camera feed by using one or more of a plurality of available image processing combinations, wherein the plurality of available image processing combinations each use a different combination of the at least one cloud server computer and at least one client device in a hybrid system architecture to perform image processing tasks for generating the user graphical representation including background removal and insertion of the user graphical representation into a virtual environment;
wherein the hybrid system architecture comprises a peer-to-peer (P2P) side and a client server side, and wherein the one or more computing devices of the data processing system are further configured to, in the client-server side:
generate, by the at least one client device, the user graphical representation by processing and analyzing the live camera feed, including background removal;
send, by the at least one client device, the user graphical representation with removed background to the at least one cloud server computer;
perform, by the at least one cloud server computer, further processing to generate an enhanced user graphical representation with removed background; and
send the enhanced user graphical representation to a receiving client device.

2. The system of claim 1, wherein the user graphical representation comprises a user 3D virtual cutout with a removed background, or a user real-time 3D virtual cutout with a removed background, or a video with removed background.

3. The system of claim 1, wherein the one or more computing devices are further configured to insert the user graphical representation on a third-party source linked to the virtual environment.

4. The system of claim 1, wherein:
the client-server side comprises web or application servers, wherein the web or application servers are configured to receive client requests employing secure communication protocols and process the client requests by requesting micro-services or data corresponding to the requests from a database; and the P2P side comprises a P2P communication protocol enabling real-time communication between client devices in a virtual environment and a rendering engine configured to enable the client devices to perform real-time 3D rendering of a live session in the virtual environment.

5. The system of claim 1, wherein:
the P2P side is used for the image processing tasks and synchronization between the client devices, streaming and rendering; or
the P2P side is used for streaming, rendering and synchronization between the client devices while the client-server side is used for the image processing tasks; or
the client-server side is used for video streaming along with the image processing tasks while the P2P side is used for video rendering and synchronization between the client devices; or
the client-server side is used for video streaming, rendering and the image processing tasks and synchronization between the client devices.

6. The system of claim 1, wherein:
the at least one cloud server is configured as a Traversal Using Relay NAT (TURN) server, or
the at least one cloud server is configured as a Session Traversal Utilities for NAT (STUN) server or as a signaling server.

7. The system of claim 1, wherein the insertion of the user graphical representation into the virtual environment includes generating a virtual camera, wherein generating the virtual camera comprises associating captured viewing perspective data with a viewing perspective of the user graphical representation within the virtual environment.

8. An image processing method comprising:
providing in memory of at least one cloud server computer data and instructions implementing image processing functions; and
generating, by one or more of a plurality of available image processing combinations of the at least one cloud server computer and at least one client device, a user graphical representation in a virtual environment based on a live camera feed from the at least one client device, wherein the plurality of available image processing combinations each use a different combination of the at least one cloud server computer and the at least one client device to perform image processing tasks for generating the user graphical representation including background removal and insertion of the user graphical representation into the virtual environment, and wherein the at least one cloud server computer interacts with the at least one client device through a hybrid system architecture;
wherein the hybrid system architecture comprises a peer-to-peer (P2P) side and a client-server side, the method further comprising in the client-server side:
generating, by the at least one client device, the user graphical representation by processing and analyzing the live camera feed, including background removal;
sending, by the at least one client device, the user graphical representation with removed background to the at least one cloud server;
performing, by the at least one cloud server, further processing to generate an enhanced user graphical representation with removed background; and
sending the enhanced user graphical representation to a receiving client device.

9. The method of claim 8, wherein:
the client-server side comprises web or application servers, wherein the web or application servers are configured to receive client requests employing secure communication protocols and process the client requests by requesting micro-services or data corresponding to the requests from a database; and
the P2P side comprises a P2P communication protocol enabling real-time communication between client devices in a virtual environment and a rendering engine configured to enable the at least one client device to perform real-time 3D rendering of a live session in the virtual environment.

10. The method of claim 8, the method further comprising:
performing, by the P2P side, the image processing tasks and synchronization between client devices, streaming and rendering; or
performing, by the P2P side, video streaming, rendering and synchronization between client devices while the client-server side is used for the image processing tasks; or
performing, by the client-server side, video streaming along with the image processing tasks while the P2P side is used for video rendering and synchronization between client devices; or
performing, by the client-server side, video streaming, rendering and the image processing tasks and synchronization.

11. The method of claim 8, wherein inserting the user graphical representation into the virtual environment comprises generating a virtual camera, wherein generating the virtual camera comprises associating captured viewing perspective data with a viewing perspective of the user graphical representation within the virtual environment.

12. A non-transitory computer readable medium having stored thereon instructions configured to cause one or more computing devices comprising a processor and memory to perform steps comprising:
generating, by one or more of a plurality of available image processing combinations of one or more cloud server computers and at least one client device, a user graphical representation in a virtual environment based on a live data feed captured by at least one camera of at least one user of the at least one client device, wherein the plurality of available image processing combinations each use a different combination of the one or more cloud server computers and the at least one client device to perform image processing tasks for generating the user graphical representation including background removal and insertion of the user graphical representation into the virtual environment, and wherein the one or more cloud server computers and the at least one client device are configured to interact with each other through a hybrid system architecture;
wherein the hybrid system architecture comprises a P2P side and a client-server side, the steps further comprising in the client-server side:
generating, by the at least one client device, the user graphical representation by processing and analyzing the live data feed captured by the at least one camera, including background removal;
sending, by the at least one client device, the user graphical representation with removed background to the one or more cloud server computers;
performing, by the one or more cloud server computers, further processing to generate an enhanced user graphical representation with removed background; and sending the enhanced user graphical representation to a receiving client device.

13. The non-transitory computer readable medium of claim 12, the steps further comprising:
performing, by the P2P side, the image processing tasks and synchronization between client devices, streaming and rendering; or
performing, by the P2P side, video streaming, rendering and synchronization between client devices while the client-server side is used for the image processing tasks; or
performing, by the client-server side, video streaming along with the image processing tasks while the P2P side is used for video rendering and synchronization between client devices; or
performing, by the client-server side, video streaming, rendering and the image processing tasks and synchronization.

14. The non-transitory computer readable medium of claim 12, wherein inserting the user graphical representation into the virtual environment comprises generating a virtual camera, wherein generating the virtual camera comprises associating captured viewing perspective data with a viewing perspective of the user graphical representation within the virtual environment.

* * * * *